United States Patent
Marandi et al.

(10) Patent No.: US 12,541,701 B2
(45) Date of Patent: Feb. 3, 2026

(54) NANOPHOTONIC PARAMETRIC QUANTUM INFORMATION PROCESSOR

(71) Applicant: California Institute of Technology, Pasadena, CA (US)

(72) Inventors: Alireza Marandi, Pasadena, CA (US); Rajveer Nehra, Pasadena, CA (US); Ryoto Sekine, Pasadena, CA (US); Luis M. Ledezma, La Crescenta, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 475 days.

(21) Appl. No.: 18/155,444

(22) Filed: Jan. 17, 2023

(65) Prior Publication Data

US 2024/0005196 A1 Jan. 4, 2024

Related U.S. Application Data

(60) Provisional application No. 63/299,762, filed on Jan. 14, 2022.

(51) Int. Cl.
*G06N 10/70* (2022.01)
*G06N 10/40* (2022.01)

(52) U.S. Cl.
CPC ............ *G06N 10/70* (2022.01); *G06N 10/40* (2022.01)

(58) Field of Classification Search
CPC ........ G06N 10/70; G06N 10/40; G06N 10/60; G06N 10/20; B82Y 10/00
See application file for complete search history.

(56) References Cited

U.S. PATENT DOCUMENTS

| | | | | |
|---|---|---|---|---|
| 4,859,876 | A * | 8/1989 | Dirk | G02F 1/065 252/582 |
| 6,344,921 | B1 * | 2/2002 | Galvanauskas | H04B 10/291 359/332 |
| 11,226,538 | B2 | 1/2022 | Marandi et al. | |
| 2011/0032532 | A1 * | 2/2011 | Hirano | B82Y 10/00 359/328 |
| 2020/0076149 | A1 | 3/2020 | Papp et al. | |
| 2020/0301244 | A1 * | 9/2020 | Wang | G01J 1/0488 |
| 2021/0272007 | A1 | 9/2021 | Fatemi et al. | |
| 2023/0163737 | A1 * | 5/2023 | Vesterinen | H03F 19/00 330/4.6 |

OTHER PUBLICATIONS

Werner et al., "Ultrashort pulsed squeezing by optical parametric amplification". Phys. Rev. A 52, 4202-4213 (1995). Abstract.

(Continued)

*Primary Examiner* — Collin X Beatty
(74) *Attorney, Agent, or Firm* — GATES & COOPER LLP

(57) ABSTRACT

A photonic integrated circuit comprising one or more waveguides comprising a second order non-linearity configured to operate on optical pulses each having a pulse length shorter than 1000 optical cycles, as measured at their full width at half maximum. The circuit is configured to generate one or more quantum states carried by one or more of the optical pulses, manipulate one or more of the quantum states, and/or measure one or more of the quantum states.

22 Claims, 40 Drawing Sheets

(56) References Cited

OTHER PUBLICATIONS

PCT International Search Report and Written Opinion dated Nov. 6, 2023 for PCT Application No. PCT/US2023/060754.
Onodera et al., "Nonlinear Quantum Behavior of Ultrashort-Pulse Optical Parametric Oscillators", arXiv:1811.10583v2, Feb. 2019, 14 pages.
Ladd et al., "Quantum computers". Nature 464, 45-53 (2010).
O'Brien et al., "Photonic quantum technologies". Nature Photonics | vol. 3 | Dec. 2009, pp. 687-695.
Yu et al., "Quantum correlations between light and the kilogram-mass mirrors of LIGO". Nature, vol. 583, Jul. 2, 2020, pp. 43-54.
Casacio et al., "Quantum-enhanced nonlinear microscopy". Nature 594, pp. 201-206 (2021).
Furusawa et al., "Unconditional Quantum Teleportation". Science 282, 706-709 (1998).
Asavanant et al., "Generation of time-domain-multiplexed two-dimensional cluster state". Science 366, 373-376 (2019).
Chen et al., "Experimentalrealizationofmultipartiteentanglementof 60modesofaquantum optical frequencycomb". Phys. Rev. Lett. 112 , pp. 1-19 (2014).
Kanter et al., "Squeezing in a LiNbO3 integrated optical waveguide circuit". Opt. Express 10, 177-182 (2002).
Roslund et al., "Wavelength-multiplexed quantum networks with ultrafast frequency combs". Nat. Photonics 8, 109-112 (2014).
Vaidya et al., "Broadband quadrature-squeezed vacuum and non-classical photon number correlations from a nanophotonic device". Sci. Adv. 6, eaba9186, pp. 1-8 (2020).
Vigliar et al., Error-protected qubits in a silicon photonic chip:. Nat. Phys. 17, 1137-1143 (2021).
Arrazola et al., "Quantum circuits with many photons on a programmable nanophotonic chip". Nature 591, 54-60 (2021).
Tasker et al., "Silicon photonics interfaced with integrated electronics for 9 GHz measurement of squeezed light". Nat. Photonics 15, 11-15 (2021).
Javid et al., "Ultrabroadband Entangled Photons on a Nanophotonic Chip". Phys. Rev. Lett. 127, 183601 (2021).
Chen et al., "Ultra-broadband quadrature squeezing with thin-film lithium niobate nanophotonics". Opt. Lett. 47, 1506-1509 (2022).
Peace et al., "Picosecond Pulsed Squeezing in Thin-Film Lithium Niobate Strip-Loaded Waveguides at Telecommunication Wavelengths". arXiv:2204.05694, pp. 1-6 [quant-ph] (2022).
Caves, "Quantum limits on noise in linear amplifiers". Phys. Rev. D 26, 1817-1839 (1982).
Shaked et al., "Lifting the bandwidth limit of optical homodyne measurement with broadband parametric amplification". Nat. Commun. 9, 609, pp. 1-13 (2018).
Takanashi et al., "All-optical phase-sensitive detection for ultra-fast quantum computation". Opt. Express 28, 34916-34926 (2020).
Frascella et al., "Overcoming detection loss and noise in squeezing-based optical sensing". NPJ Quantum Inf. 7, 72 (2021), 6 pages.
Ye et al., "Overcoming the quantum limit of optical amplification in monolithic waveguides". Sci. Adv. 7, 6 pages (2021).
Zhu et al., "Integrated photonics on thin-film lithium niobate". Adv. Opt. Photonics 13,242 (2021), 118 pages.
Ledezma et al., "Intense optical parametric amplification in dispersion-engineered nanophotonic lithium niobate waveguides". Optica 9, 303 (2022), 6 pages.
Jankowski et al., "Ultrabroadband nonlinear optics in nanophotonic periodically poled lithium niobate waveguides". Optica 7, 40 (2020) pp. 053904-1-053904-5.
Hu et al., "On-chip electro-optic frequency shifters and beam splitters". Nature 599, pp. 587-593 (2021).
Bourassa et al., "Blueprint for a Scalable Photonic Fault-Tolerant Quantum Computer". Quantum 5, 392, pp. 1-38 (2021).
Horoshko et al., "Towards single-cycle squeezing in chirped quasi-phase-matched optical parametric down- conversion". Phys. Rev. A 88, pp. 033806-1-033806-5 (2013).
Kizmann et al., "Subcycle squeezing of light from a time flow perspective". Nat. Phys. 15, pp. 960-966 (2019).
Nehra et al., "Few-cycle vacuum squeezing in nanophotonics". Figshare (2022), pp. 1-8; https://doi.org/10.6084/m9.figshare. 20100140.v1.
Jankowski et al., "Temporal simultons in optical parametric oscillators". Phys. Rev. Lett. 120, pp. 053904-1-053904-5 (2018).
Marandi et al., "Coherence properties of a broadband femtosecond mid-IR optical parametric oscillator operating at degeneracy". Opt. Express 20, 7255-7262 (2012).
Luda et al., "Compact embedded device for lock-in measurements and experiment active control". Rev. Sci. Instrum. 90, pp. 023106-1-023106-14 (2019).
Phillips et al., "Supercontinuum generation in quasi-phasematched waveguides". Opt. Express 19, pp. 18754-18773 (2011).
Guo et al., "Parametric down-conversion photon-pair source on a nanophotonic chip". Light Sci. Appl. 6, e16249 (2017), 8 pages.
Wasilewski et al., "Pulsed squeezed light: Simultaneous squeezing of multiple modes". Phys. Rev. A 73, 063819-1 to 063819-12 (2006).
Caves et al., New formalism for two-photon quantum optics. I.Quadrature phases and squeezed states. Phys. Rev. A 31, pp. 3068-3092 (1985).
Christ et al., "Probing multimode squeezing with correlation functions". New J. Phys. 13, 033027 (2011), 21 pages.
Van Loock et al., "Detecting genuine multipartite continuous-variable entanglement". Phys. Rev. A 67, 052315-1 to 052315-13 (2003).
Bello et al., "Broadband complex two-mode quadratures for quantum optics". Opt. Express 29, 41282 (2021), 21 pages.
Li et al., "All-optical ultrafast ReLU function for energy-efficient nanophotonic deep learning". Nanophotonics 10.1515/nanoph-2022-0137 (2022).
Inoue et al., "43-GHz bandwidth real-time amplitude measurement of 5-dB squeezed light using modularized optical parametric amplifier with 5G technology". arXiv:2205.14061 [quant-ph] (2022), 18 pages.
Guo et al., "Femtojoule femtosecond all-optical switching in lithium niobate nanophotonics". Nat. Photonics 16, 625-631 (2022).
Dutt et al., "On-chip optical squeezing". Phys. Rev. Appl. 3, pp. 044005-1 to 044005-7 (2015).
Zhao et al., "Near-Degenerate Quadrature-Squeezed Vacuum Generation on a Silicon-Nitride Chip". Phys. Rev. Lett 124, 193601 (2020), pp. 193601-1 to 193601-7.
Zhang et al., "Squeezed light from a nanophotonic molecule". Nat. Commun. 12, 2233 (2021), pp. 1-6.
Cernansky et al., "Nanophotonic source of quadrature squeezing vi self-phase modulation". APL Photonics 5, 101303 (2020), 6 pgs.
Yang et al., "A squeezed quantum microcomb on a chip". Nat. Commun. 12, 4781 (2021).
Ralph, "All-optical quantum teleportation". Opt. Lett. 24, pp. 348-350 (1999).
Spirit et al., "Optical time division multiplexing: systems and networks". Journals & Magazines >IEEE Communications Magazine >vol. 32 Issue: 12, pp. 54-62.

\* cited by examiner

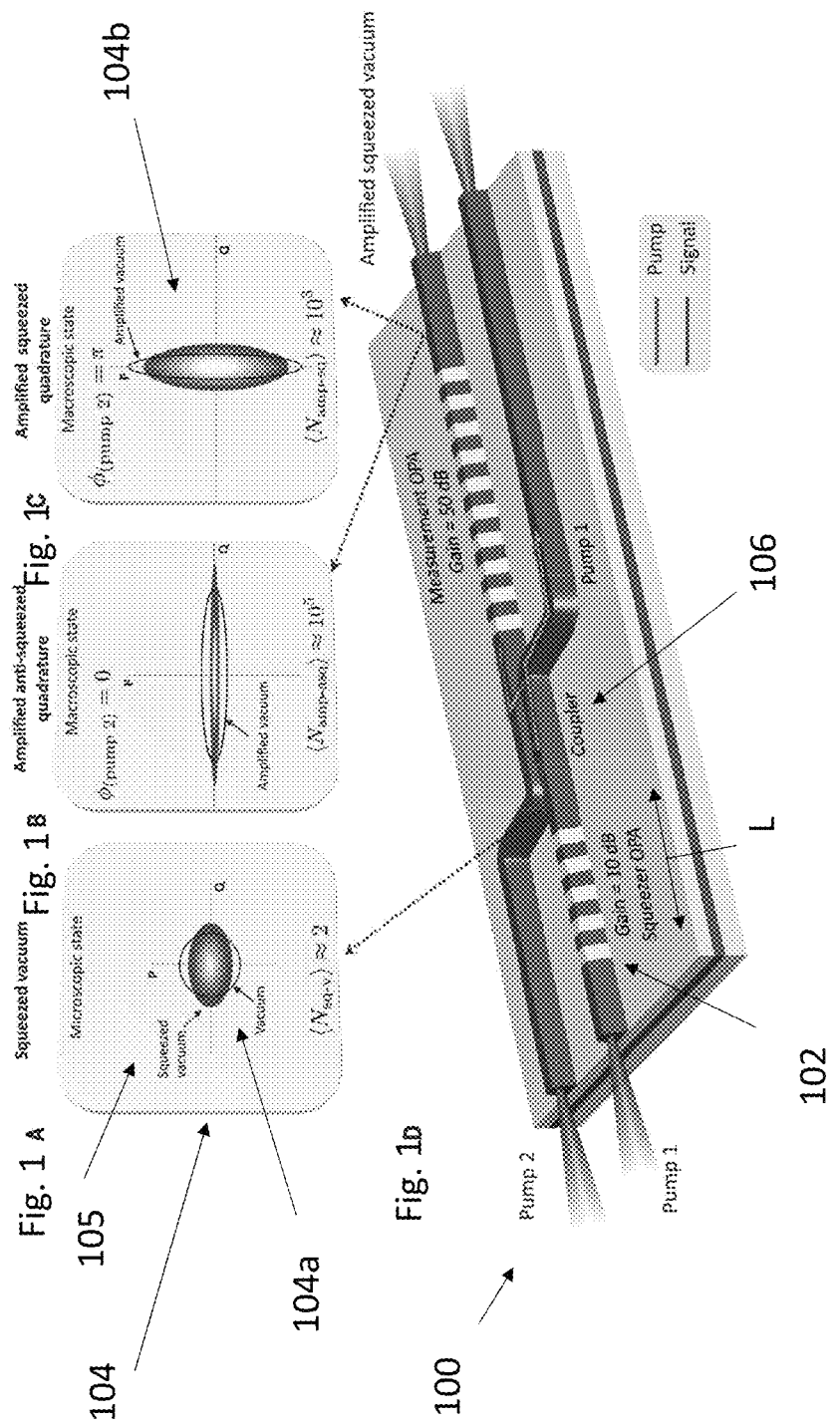

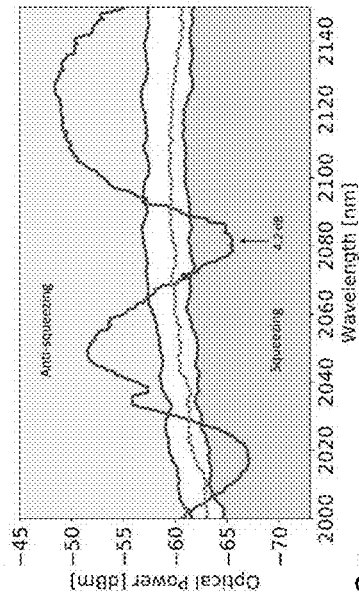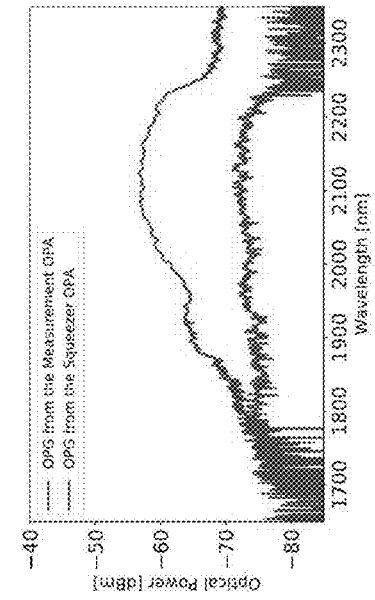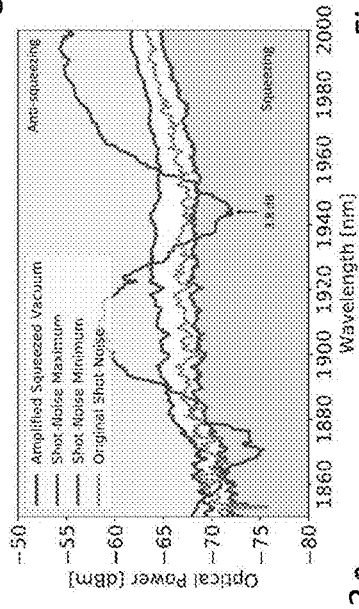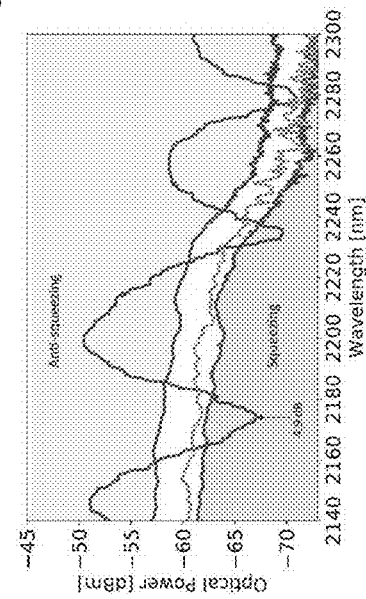
Fig. 3 A    Fig. 3 B    Fig. 3 C    Fig. 3 D

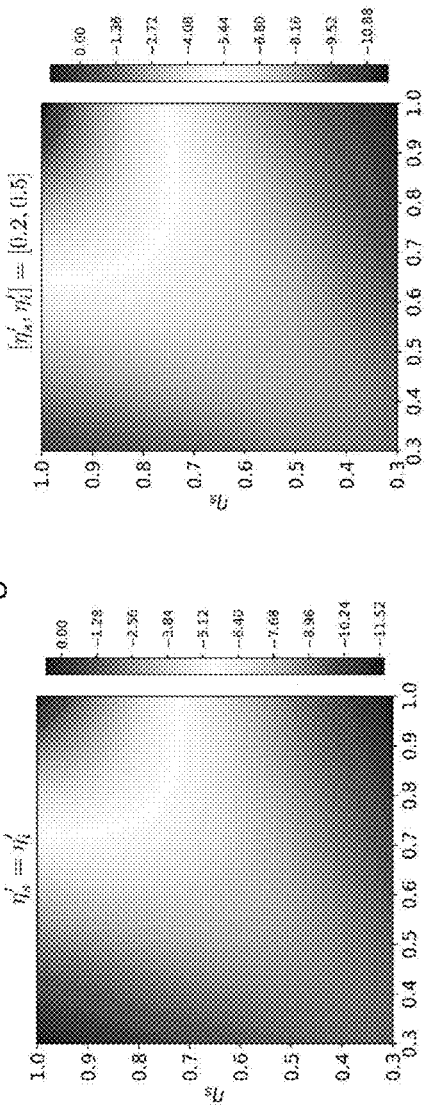
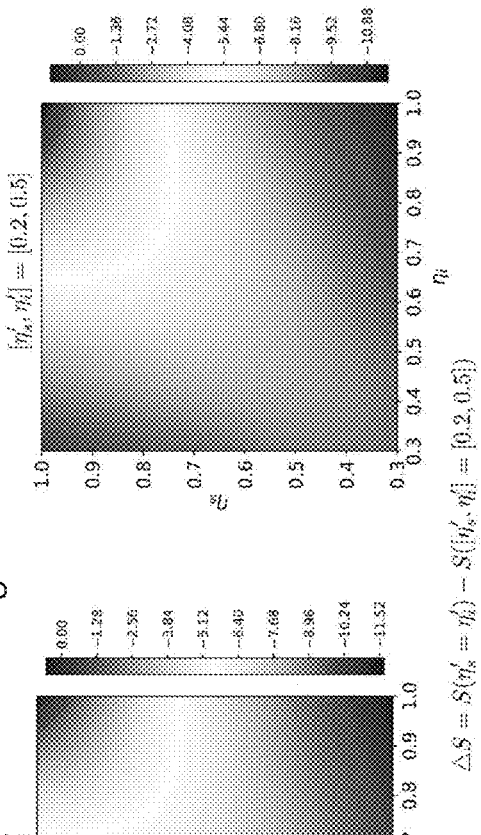
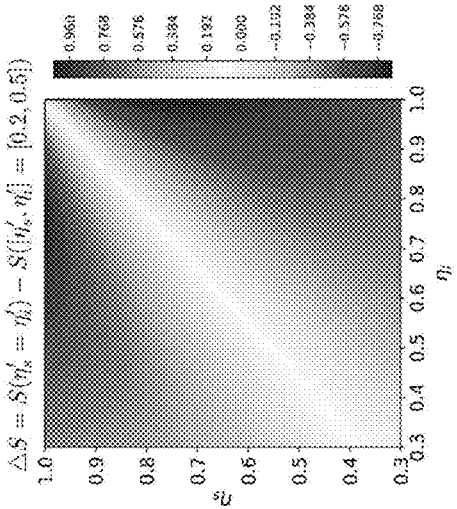
Fig. 12A
Fig. 12B
Fig. 12C

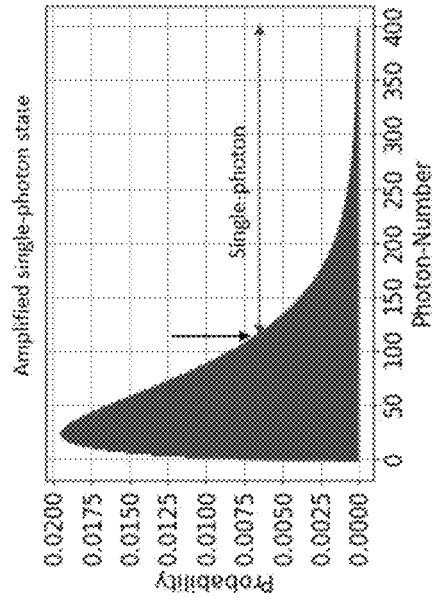
Fig. 20A
Fig. 20B
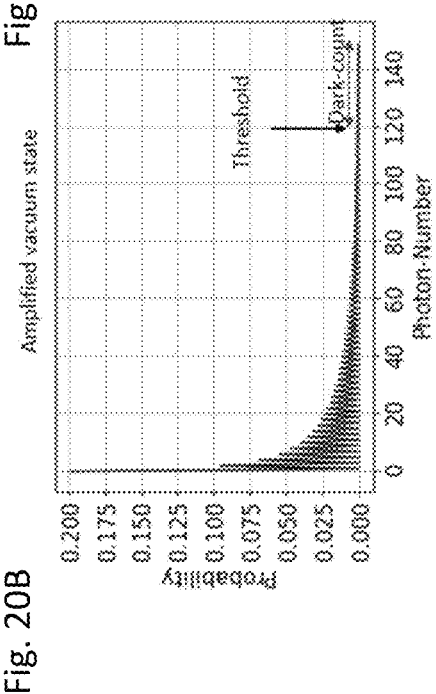
Fig. 20C

NANOPHOTONIC PARAMETRIC QUANTUM INFORMATION PROCESSOR

CROSS REFERENCE TO RELATED APPLICATIONS

This application claims the benefit under 35 U.S.C. Section 119(e) of commonly-assigned U.S. provisional patent application Ser. No. 63/299,762 filed on Jan. 14, 2022, by Alireza Marandi, Rajveer Nehra, Ryoto Sekine, and Luis Ledezma, entitled "NANOPHOTONIC PARAMETRIC QUANTUM INFORMATION PROCESSOR" client reference CIT-8775-P, which application is incorporated by reference herein.

STATEMENT REGARDING FEDERALLY SPONSORED RESEARCH AND DEVELOPMENT

This invention was made with government support under Grant No. ECCS1846273 & CCF1918549 awarded by the National Science Foundation and under Grant No. FA9550-20-1-0040 awarded by the Air Force and under grant No. W911NF-18-1-0285 awarded by the Army and under grant No. 80NMO0018D0004 awarded by NASA. The government has certain rights in the invention.

BACKGROUND OF THE INVENTION

1. Field of the Invention

This invention relates to photonic integrated circuits utilizing second order non linearity of waveguides to generate, manipulate, and/or measure quantum states, and methods and systems utilizing the same.

2. Description of the Related Art

Quantum information processing offers great promise for computation, secure communication, metrology, and sensing. Many physical platforms such as nuclear spins, superconducting circuits, photonics, trapped ions, quantum dots, and neutral atoms have widely been explored in the pursuit to build quantum information processors (1). Among these, photonics stands out because of its potential for scalability, room-temperature logical operations, and ease of encoding quantum information in both discrete and continuous variables. However, it remains challenging to generate, manipulate, and measure quantum states in photonic systems with the performance required for a wide range of scalable quantum information systems. The present disclosure satisfies this need.

SUMMARY OF THE INVENTION

Example methods, devices and systems according to embodiments described herein include, but are not limited to, the following:

1. A photonic integrated circuit, comprising:
   one or more waveguides comprising a second order non-linearity configured to operate on classical and/or quantum optical pulses each having a pulse length shorter than 1000 optical cycles, as measured at their full width at half maximum of their classical field values or their quantum wave functions, so as to at least:
   generate one or more quantum states carried by one or more of the optical pulses,
   manipulate one or more of the quantum states, or measure one or more of the quantum states.

2. The circuit of example 1, wherein the waveguides each have a width and height of less than 5 micrometers and/or the waveguides have a phase matching and/or dispersion engineering for nonlinear interactions of the optical pulses having a bandwidth in a range of 0.1-100 Terahertz.

3. The circuit of example 1 or 2, wherein:
   the one or more waveguides comprise an optical parametric amplifier and/or
   the circuit comprises an optical parametric oscillator comprising one of the waveguides,
   and the OPAs or OPOs generate the quantum states comprising signal and/or idler pulses in response to a pump pulse using a second order parametric process, and
   the waveguides each have dimensions including the height, the width, and the length minimizing group velocity mismatch (GVM) between the pump and signal pulses and/or idler pulses so as to provide temporal overlap of the pump and signal pulses and/or idler pulses, and
   the pump pulses, signal pulses, and/or idler pulses each comprise an electromagnetic wave confined in and waveguided by the waveguides. In one or more examples, these waveguide dimensions also minimize group velocity dispersion (GVD) of interacting pulses, leading to high nonlinear efficiency.

4. The circuit of any of the examples 1-3, wherein the quantum states comprise Gaussian states comprising one or more squeezed vacuum states having one or more modes.

5. The circuit of example 4, wherein the waveguides comprise at least:
   an optical parametric amplifier comprising a phase-matching and a dispersion engineering for a second order parametric amplification process involving a first pump pulse and a signal vacuum field, wherein the second order parametric amplification process amplifies the signal vacuum field in a first quadrature and attenuates the signal vacuum field in a second quadrature orthogonal to the first quadrature, thereby generating one or more signal pulses carrying a first one of the quantum states comprising a squeezed vacuum state.

6. The circuit of example 5, wherein at least one of an intensity of the first pump pulse, the phase matching, the dispersion engineering, or a length of the optical parametric amplifier are tailored for the second order parametric amplification process comprising non-degenerate parametric amplification so that the signal pulses, carrying the squeezed vacuum state, comprise at least two modes.

7. The circuit of example 5 or 6, wherein the circuit further comprises a second OPA having at least one of a second phase matching, a second dispersion engineering, or a second length tailored for an additional second order nonlinear interaction involving a second pump pulse and the signal pulses comprising the first one of the quantum states, wherein the second pump pulse can have a phase difference relative to the first pump pulse and an intensity so that the additional second order nonlinear interaction comprises the parametric amplification in a linear (non-saturated) regime amplifying one of the quadratures of the first one of the quantum states, so as to form a second quantum state in the macroscopic regime, in which the average number of photons for the state is larger than 10 but less than 10^9, and thereby enabling a loss-tolerant (de-coherence tolerant) quantum measurement of the first one of the quantum states.

8. The circuit of any of the examples 1-3, wherein the quantum states comprise non-Gaussian states comprising one or more cat states, one or more binomial states, one or more Gottesman-Kitaev-Preskill (GKP) states, or one or more photon pair states.

9. The circuit of any of the examples 1-8, wherein the circuit comprises a modulator driven by a driving signal allowing control of a phase or an intensity of the optical pulses comprising one or more pump pulses or one or more quantum state pulses.

10. The circuit of any of the examples 1-3, 8 or 9, wherein:
   the circuit comprises an optical parametric amplifier having a phase matching, dispersion engineering, and length tailored for a second order parametric interaction involving a pump pulse, having the pulse length, and a vacuum field, and
   the second order nonlinear interaction comprises a parametric amplification in a saturated regime characterized by the pump energy of the pump pulse being suppressed by more than 10% through the parametric amplification, and
   so as to form a signal pulse carrying at least one of the quantum states comprising negativity in its Wigner function.

11. The circuit of any of the examples 1-3, 4, 8, 9, or 10 wherein the circuit comprises one or more components for manipulating the one or more quantum states, the one or more components comprising at least one of:
   one or more modulators for manipulating an intensity or phase of the quantum states,
   one or more couplers for combining a plurality of the quantum states, or
   one or more spectral filters, one or more spectral-dependent splitters, one or more polarization rotators, one or more wavelength convertors, or one or more Mach-Zehnder interferometers.

12. The circuit of any of the examples 1-3, 4, 8, 9, or 10, wherein the circuit further comprises one or more single-photon detectors, one or more photon number resolving detectors, and/or one or more homodyne detectors configured to at least:
   engineer or detect the quantum states, or
   enable quantum computing tasks using the quantum states.

13. The circuit of any of the examples 1-12, further comprising:
   one or more inputs connected to the waveguides, and
   one or more outputs connected to the waveguides, wherein the optical pulses comprise one or more input pulses and one or more output pulses outputted at the outputs in response to the input pulses received at the inputs, and
   the waveguides are configured to at least generate, manipulate, or measure one or more of the optical pulses carrying a different one of the quantum states representing a different bit of information according to a time division multiplexing scheme wherein:
   the optical pulses are distributed among different equally spaced time bins,
   the different equally spaced time bins can be routed to different ones of the waveguides using one or more first modulators and one or more first couplers connected to each other via one or more first delay lines, the one or more first modulators configured to modulate the optical pulses, and
   the different equally spaced time bins can be combined using one or more second couplers and one or more second delay lines so that the quantum states in the different time bins can be combined.

14. The circuit of any of the examples 1-13, wherein the pulse lengths are in a range of 1-1000 femtoseconds so that the optical pulses can be routed into the different equally spaced time bins of longer than 1-1000 femtosecond duration and containing the different bits.

15. The circuit of any of the examples 1-14, configured:
   as a processor for performing one or more quantum computations on the one or more quantum states, or
   as a quantum sensor for performing quantum sensing by a measurement of the one or more quantum states, or
   to perform quantum state tomography of the quantum states that is robust against detection losses, or
   to perform all-optical continuous-variable quantum error correction with quantum states, including binomial codes, squeezed cat codes, and GKP codes, e.g. using the quantum states, or
   to perform quantum teleportation using the quantum states, or
   perform boson sampling in time/frequency domain using the quantum states, or
   to protect the quantum coherence of the quantum states.

16. The circuit of any of the examples 1-15, wherein the waveguides comprise an optical parametric amplifier having phase matching and dispersion engineering such that parametric gain is in a non-linear saturated regime, thereby allowing at least:
   all—optical nonlinear quantum measurement of the quantum states, or
   nonlinear or non-Gaussian operations on the quantum states.

17. The circuit of any of the examples 1-16, further comprising a wavelength converter converting a wavelength of the optical pulses, carrying the quantum states, into a different frequency range.

18. A method of processing one or more quantum states, comprising:
   inputting one or more input optical pulses to one or more waveguides; and
   generating, manipulating, or measuring one or more quantum states using one or more of the waveguides comprising a second order non-linearity configured to operate on optical pulses including the input pulses, wherein the waveguides each have a width and height of less than 5 micrometers and/or the waveguides have a phase matching and dispersion engineering for the optical pulses having a bandwidth in a range of 0.1-100 Terahertz.

19. The method of example 18, further comprising implementing a time division multiplexing scheme, comprising:
   distributing the optical pulses among equally spaced time bins;
   routing each of the time bins to different ones of the waveguides using one or more modulators and one or more first couplers connected to each other via one or more first delay lines; and
   combining the different time bins using one or more second couplers and one or more second delay lines so that the quantum states in the different time bins are combined; and wherein the waveguides comprise one or more optical parametric amplifiers and/or the waveguides are disposed in one or more optical parametric oscillators.

20. The method of example 18 or 19, wherein the generating, manipulating, and/or measuring comprises at least one of:

performing one or more quantum computations on the one or more quantum states, or quantum sensing by a measurement of the one or more quantum states, or performing quantum state tomography of the quantum states that is robust against detection losses, or performing all-optical continuous-variable quantum error correction with Binomial and squeezed Cat codes using the quantum states, or performing quantum teleportation using the quantum states, or performing boson sampling in time/frequency domain using the quantum states, or protecting a quantum coherence of the quantum states.

BRIEF DESCRIPTION OF THE DRAWINGS

Referring now to the drawings in which like reference numbers represent corresponding parts throughout:

FIGS. 1A-1D. Illustration of the generation of a squeezed vacuum and its all-optical measurement in nanophotonics. Phase-space distributions (filled ellipses) of (FIG. 1A) phase-quadrature squeezed vacuum, and its amplification in the (FIG. 1B) anti-squeezed and (FIG. 1C) squeezed quadratures. The black circle in (FIG. 1A) represents the microscopic vacuum state, and black ellipses in (FIG. 1B) and (FIG. 1C) correspond to the macroscopic vacuum state amplified in Q and P quadratures, respectively. (FIG. 1D) Sketch of our nanophotonic device consisting of the squeezer OPA, tapered adiabatic coupler, and measurement OPA. When pumped, the squeezer OPA generates a squeezed vacuum state, which is selectively coupled into an adjacent waveguide. It is subsequently amplified by the measurement OPA to macroscopic power levels. The measurement OPA amplifies the quadrature under measurement to sufficiently above the vacuum noise, thereby making the measurement insensitive to losses due to off-chip coupling and imperfect detection. For (FIG. 1A), (FIG. 1B), and (FIG. 1C), we consider 1.0 dB of squeezing with mean photon number $\langle N_{sq-v} \rangle \approx 2$, and a 50 dB phase-sensitive gain in the measurement OPA, thereby amplifying the few-photon squeezed state to a macroscopic power level.

(FIG. 2A) Experimental setup. A mode-locked laser (MLL) is used to pump the squeezer (pump 1) and measurement (pump 2) OPAs. At the output of the nanophotonic chip, the amplified squeezed signal (red) and residual pump 2 (green) are separated using a dichroic mirror (DM) and measured by two different OSAs. Bottom row shows the following: (i) a false-colored SEM image of our nanophotonic circuit, (ii) a zoomed-in SEM image of the coupler region, and (iii) a false-colored second harmonic microscope image of the periodically poled region before etching the waveguides. (FIG. 2B) Squeezing measurement by an OSA in the zero-span mode at 2090 nm. (FIG. 2C) The squeezing measured at 2090 nm for several values of pump 1 while keeping pump 2 constant. (FIG. 2D) Loss analysis of the squeezing measurements. The solid (dashed) curves show the degradation of anti-squeezing (squeezing) as the photon loss increases, and the solid data points correspond to measured values of minimum and maximum squeezing. (FIG. 2E) The squeezer gain dependence on the energy of pump 1. Blue points are measured from anti-squeezing, and red points are directly obtained from optical parametric generation (OPG) measurements. Error bars are obtained from the statistics of the measurements. PBS, polarized beam splitter; BS, beam splitter; HWP, half-wave plate; Obj., reflective objective; VND, variable neutral-density filter; FC, fiber coupler; TEC, thermoelectric cooler.

FIGS. 3A-3D. Broadband squeezing measurements. (FIGS. 3A to 3C) Three measurements over different selected bandwidths of the OSA when the PZT is modulated with a 300 mHz ramp signal. The shot noise traces (blue, gray, and red) were acquired with pump 1 blocked. (FIG. 3D) Optical parametric generation from the squeezer OPA (green) and measurement amplifier OPA (blue). Both traces are acquired at ~6 pJ of pulse energy.

(FIG. 4A) The green trace shows the interference fringe between Pump 1 and Pump 2, measured from the Measurement OPA. The red and blue traces correspond to the minimum and maximum power levels of Pump 2 when Pump 1 is blocked. (FIG. 4B) Linear transmission measurements from the measurement amplifier in zero span at 1100 nm. (FIG. 4C) Input pump spectrum normalized in linear units. (FIG. 4D) Measured fringes when the Pump 1 and Pump 2 interference is created off-chip with the squeezer pump 1 blocked. (FIG. 4E) Measured amplified shot-noise levels for different Pump 2 power levels in FIG. 4D.

(FIG. 6A), Simulated Squeezer OPA gain as the signal phase is varied. (FIG. 6B), The ratio of Full Width at Half Maximum (FWHM) bandwidths of output and input signal pulses for various values of input pulse widths. (FIG. 6C), The electric fields of input (solid blue) and output (solid orange) signal pulses. Dashed lines are at $|E|^2=\frac{1}{2}$ for determining the pulse widths at FWHM. (FIG. 6D), Spectrum of the weak coherent input and amplified output pulses.

(FIG. 7A), shows the design in which we keep the gap constant and adiabatically vary the waveguide widths ($W_1$=1668 nm and $W_2$=1768 nm) along the propagation length. (FIG. 7B), Calculated fundamental TE modes at 1045 nm and 2090 nm for the measured geometry. (FIG. 7C), Measured and simulated coupling efficiency. Solid black and blue curves correspond to numerically simulated coupling efficiency and losses, respectively. Shaded regions account for the fabrication uncertainty of ±10 nm in the etching depth. Black and blue dots show the measurements for coupling efficiency with an auxiliary beam centered around 2090 nm. (FIG. 7D), An AFM image of the coupler region.

(FIG. 9A), An ideal case where the squeezed vacuum is generated by OPA 1 and amplified by OPA 2 followed by a total power measurement of the signal and idler modes. (FIG. 9B) Lossy case where linear losses experienced by squeezed vacuum and amplified squeezed vacuum are considered. The green and red arrows show the pump and signal-idler modes, respectively. Dashed arrows show the initial vacuum for the signal and idler modes.

(FIG. 11C), Experimentally measured squeezing and anti-squeezing values as the squeezer pump energy is varied.

FIGS. 12A-12C: Squeezing degradation under photon loss. (FIG. 12A), When the output coupling losses and detection efficiencies are equal, i.e., $\eta_s'=\eta_i'$. (FIG. 12B), For [$\eta_s'$, $\eta_i'$]=[0.2, 0.5] and FIG. 12C displays the difference of "a" and "b".

FIGS. 20A-20C: Detection of the single-photon levels fields. FIG. 20A, Input quantum state, ρ, is first amplified with a high-gain OPA, then the macroscopic photon number is measured with a classical detector. FIGS. 20B and 20C, Photon-number distributions of an amplified vacuum state and single-photon state, respectively.

FIG. 21A Schematic of experimental setup. FIG. 21B Photocurrent vs. probability density of amplified vacuum and amplified and de-amplified coherent states with ⟨N⟩=4.86 and 1.72. The photocurrent is proportional to the photon number of the amplified state. The gray line denotes the threshold above which 2.5% of vacuum instances will result in a click. Amp.: Amplification. De-amp.: de-amplification.

FIG. 23A, The unknown quantum state, p is mixed with a coherent state (used as a local oscillator) at a highly unbalanced beamsplitter, i.e., the reflection r→1. The displaced state is first amplified by an OPA and then is detected by a "click" detector with overall quantum efficiency of η=0.10. FIG. 23B, The reconstructed Wigner function of a cat state when OPA gain G=0. FIG. 23C, The reconstructed Wigner function of a cat state when OPA gain G=5 dB. FIG. 23D, The state reconstruction fidelity as the OPA gain is varied.

FIG. 25A Gottesman-KitaevPreskill state with squeezing parameter Δ=0.3 FIG. 25B Cat state with amplitude α=2.

DETAILED DESCRIPTION OF THE INVENTION

Figure 2A:
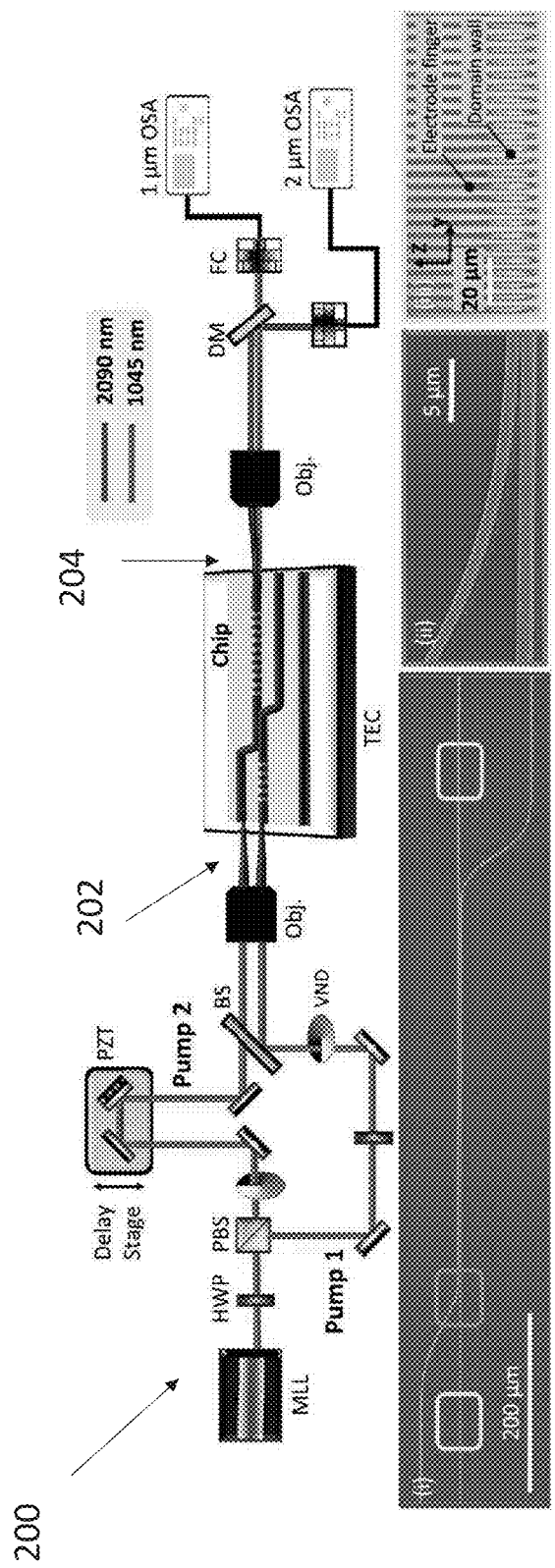
FIGS. 2A-2E. Generation and measurement of squeezed light in the LN nanophotonic chip.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Technical Description In typical embodiments of the present invention, a photonic integrated circuit comprises one or more waveguides comprising a second order non-linearity configured to operate on optical pulses each having a pulse length shorter than 1000 optical cycles, as measured at their full width at half maximum. The waveguides are configured to:

generate one or more quantum states carried by one or more of the optical pulses, manipulate one or more of the quantum states, and/or measure one or more of the quantum states.

These functionalities (generation, manipulation, and/or measurement of quantum states) are achieved by a combination of subwavelength confinement of the optical mode, strong nonlinearity of the waveguides, high-fidelity quasi-phase-matching (e.g., by periodic poling), and dispersion engineering for longer interaction lengths. Current waveguide material platforms include, but are not limited to, lithium niobate (23, 24-26).

All these functionalities may be implemented on the same chip or different chips.

Quantum States

Example quantum states which can be generated, manipulated, and/or measured using the photonic integrated circuit include, but are not limited to, gaussian states (e.g., squeezed vacuum, and multimode squeezed states including cluster states) and non-Gaussian states (e.g., cat states). Gaussian states can be generated and measured using waveguides comprising short pulse optical parametric amplifiers, and non-gaussian states can be achieved using highly nonlinear low-loss optical parametric oscillators operating near or below threshold. OPAs operating in a highly-nonlinear low-loss regime can be used to generate non-Gaussian states with Wigner negativity required for exponential speedup and fault-tolerance.

State Manipulation and Protection

The photonic integrated circuit can be configured for a variety of linear optical operations using beam splitters, couplers, polarization controllers, polarization rotators, or spectral filters etc. A large number of tuning mechanisms (e.g., electrooptic and or thermo-optic modulators) can be employed for both fine tuning the response of the waveguides, and/or manipulating the states with an external driving signals. The quantum states can also be transferred across different spectral ranges using wavelength conversion on the same chip.

The photonic integrated circuit can be configured for non-gaussian operation by configuring networks of optical parametric oscillators and/or amplifiers in a highly-nonlinear low-loss regime to respond to input quantum states in a nonlinear manner. For example, first-order phase transitions can be effectively used as non-Gaussian operations on quantum states.

Waveguides comprising high-gain OPAs operated in the linear regime can be used to deterministically protect the quantum coherence of non-Gaussian states.

State Measurements

A gaussian state can be transferred from a macroscopic level to microscopic level using an optical parametric amplifier. A non-Gaussian measurement can be achieved using a high-gain OPA operated in the linear regime as a single-photon detector or a photon-number resolving (PNR) detector. The PNR capabilities can be further enhanced by spatial or temporal multiplexing of the high-gain OPAs within the same nanophotonic chip. Moreover, operating the OPA in a highly nonlinear saturated regime enables detection of single-photons as well as photon number resolving measurements.

A high-gain OPA allows quantum state characterization (e.g., quantum state tomography) that is robust against detection losses.

Application Architectures

In continuous-variable (CV) quantum photonics, information is encoded in continuous amplitude and phase values of the quantized electromagnetic field. The single-mode and multimode squeezed states can be widely used for various applications, including quantum enhanced interferometry (3), microscopy (4), and quantum teleportation (5). Moreover, highly entangled CV quantum states, that is, cluster states (6-8), serve as a universal resource for one-way quantum computation. Typically, such high-quality CV states are generated from a single- or two-mode squeezed vacuum produced using quadratic parametric processes either in bulk crystals or waveguides with large to mode areas (6-10). These CV quantum states can be achieved using the photonic integrated quantum circuits described herein.

In one example, the photonic integrated circuit is configured for all-optical continuous-variable quantum error correction with Binomial and squeezed Cat codes.

In another example, the photonic integrated circuit is configured for all-optical quantum teleportation (e.g., in a quantum communications network).

In yet a further example, the photonic integrated circuit is configured for on-chip boson Sampling in time/frequency domain with high-gain OPAs for state generation and photon-counting measurements.

First Example: Photonic Integrated Circuit Generating, Manipulating, and Measuring Squeezed Vacuum States (See Also Reference 51)

a. System

The first OPA generates a microscopic squeezed vacuum, which is then amplified with a high-gain OPA to macroscopic levels within the same nanophotonic chip. The resulting macroscopic field carries information about the microscopic squeezed state, which can be measured with a high tolerance to loss.

FIG. 1A illustrates the phase-space distributions for the vacuum (black circle) and the phase-quadrature squeezed vacuum (filled ellipse). The measurement (second) OPA selects a certain quadrature of the microscopic squeezed field and amplifies it to macroscopic levels, in principle without adding any noise. In FIGS. 1, B and C, the phase-space distributions (filled ellipses) corresponding to amplified anti-squeezed and amplified squeezed quadratures are shown for two particular pump phases of the measurement OPA, $\phi_{pump2}$. We set $\phi_{pump1}=0$ and use it as the phase reference for pump 2.

In the case of FIG. 1B with $\phi_{pump2}=0$, the anti-squeezed quadrature (Q) is amplified while the orthogonal phase quadrature (P) is de-amplified such that the output field is dominated entirely by the Q quadrature, and the P quadrature can be considered negligible. In such a high-gain ari_ipn regime, the total average photon number (power) of the output field is $\langle \hat{N}_+ \rangle \propto \langle \hat{Q}_{asq-amp}^2 \rangle \approx O(10^5)$, where $\langle \hat{N}_+ \rangle$ and $\langle \hat{Q}_{asp-amp} \rangle$ denote the photon number and quadrature operators, respectively, for the amplified anti-squeezed quadrature. Likewise, by changing the pump phase of the measurement OPA to $\phi_{pump2}=\pi$, the original squeezed quadrature is amplified to achieve $\langle \hat{N}_- \hat{N} \propto \langle \hat{P}_{sq-amp}^2 \rangle \approx O(10^3)$, where $\langle \hat{N}_- \rangle$ and $\langle \hat{P}_{sp-amp} \rangle$ represent the photon number and quadrature operators, respectively, for the amplified squeezed quadrature (FIG. 1C). As a result, the macroscopic output of the measurement OPA provides a direct all-optical measurement for the quadrature variances of the microscopic squeezed state.

The quadrature variances of the microscopic vacuum state can be determined by measuring the average photon number of the macroscopic amplified vacuum state when the squeezer OPA pump 1 is blocked. The phase space distributions of the amplified vacuum are represented as the black ellipses in FIGS. 1, B and C, corresponding to $\phi_{pump2}=0$ and $\phi_{pump2}=\pi$, respectively. The anti-squeezing ($S_+$) and squeezing ($S_-$) can then be determined as $S_\pm[dB]=0.10 \log_{10}[\langle\hat{N}_\pm\rangle/\langle\hat{N}_{v+}\rangle]$, where $\langle\hat{N}_{v+}\rangle \propto \langle\hat{Q}_{v-amp}^2\rangle$ and $\langle\hat{N}_{v-}\rangle \propto \langle\hat{P}_{v^2-amp}^2\rangle$ denote the average photon number of the vacuum state amplified in the amplitude and phase quadratures, respectively (FIGS. 1, B and C).

In the ideal case, the squeezing (antisqueezing) can be determined as $$S_\pm[dB] = \log_{10}\left[\frac{\sinh^2(r_2 \pm r_1)}{\sinh^2 r_2}\right]$$

where $r_1$ and $r_2$ are the gain parameters for the squeezer and measurement OPAs, respectively. Sufficient gain (>33 dB for ~11 dB of squeezer OPA gain) in the measurement OPA allows a direct measurement of the phase-squeezed vacuum generated in the squeezer OPA. The high-gain measurement OPA makes our measurement tolerant to off-chip coupling losses and photodetection inefficiencies as high as ~7 dB.

For the data presented herein, the squeezer (low-gain) and measurement (high-gain) OPAs of our circuit are periodically poled with lengths of 2.5 and 5.0 mm, respectively. The output of the squeezer OPA (microscopic squeezed vacuum) is coupled to the measurement OPA through a directional coupler. An adiabatic design was used to render the directional coupler broadband and less susceptible to fabrication imperfections. In the adiabatic design, both of the waveguides are tapered, while keeping the gap constant throughout the coupler length. The coupler directs the squeezed vacuum to the adjacent waveguide toward the measurement OPA and keeps the residual pump of the squeezer OPA in the original waveguide (FIG. 1D).

The fabricated adiabatic coupler causes ~30% loss for the squeezed vacuum and leaks ~20% of the squeezer pump to the measurement OPA. Numerical simulations suggest that the coupling performance of the adiabatic coupler can be improved to >98% for the squeezed signal and <5% for the squeezer pump with proper calibration of fabrication steps, which will lead to better measurement qualities.

FIG. 2A illustrates the experimental setup used to obtain the data in FIGS. 2B-2E and 3A-3D. The system comprises the squeezer and measurement OPAs are pumped by a mode-locked laser (Menlo Systems Orange A) generating 75-fs-long nearly transform-limited pulses at a 250-MHz repetition rate. The relative phase between pump 1 (squeezer OPA) and pump 2 (measurement OPA) pulses were modulated by a piezoelectric transducer (PZT) on the pump 2 arm. At the output of the nanophotonic chip, the amplified squeezed signal and measurement OPA pump were first separated using a dichroic mirror and then detected by two different optical spectrum analyzers (OSA). FIG. 2A illustrates (i) a false-colored scanning electron microscope (SEM) image of the nanophotonic circuit, (ii) a zoomed-in SEM image of the coupler region, and (iii) a false-colored second harmonic microscope image of the periodically poled region before etching the waveguides.

b. Characterization Results (i) Measurement of Squeezed Light

Figure 2B:
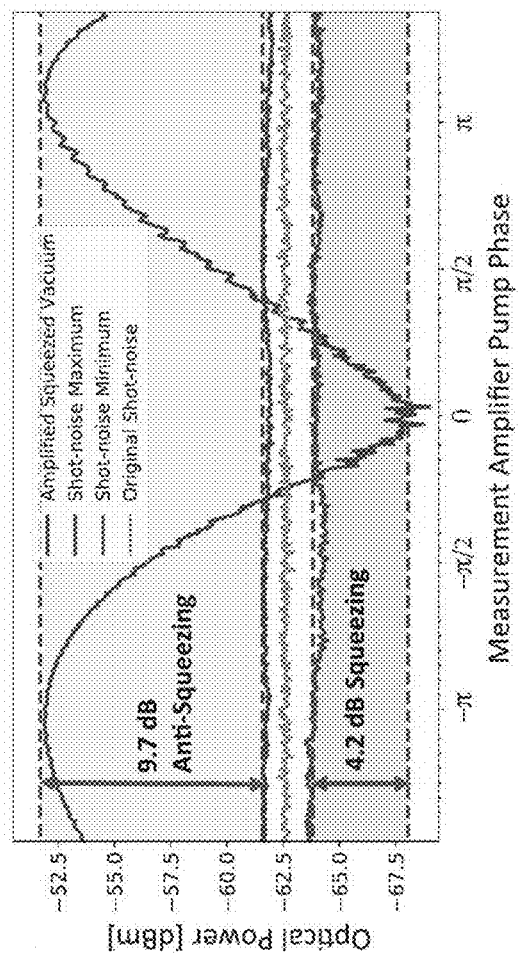

FIG. 2B shows an example measurement of the generated squeezed state. The green trace shows the output signal of the measurement OPA using an OSA in a zero-span mode at 2090 nm while keeping both pump 1 and pump 2 on and modulating the PZT by a 1-Hz ramp signal. To accurately measure the squeezing, the effect of residual interference of the two pumps was eliminated at the output of the measurement. This was achieved by determining the maximum and minimum of this residual interference and then calibrating amplified shot-noise levels by subsequently varying the power of pump 2 to these maximum and minimum pump powers while blocking pump 1. These two levels of pump 2 result in a "shot-noise maximum" and "shot noise minimum," as shown in FIG. 2B, while the "original shot-noise" corresponds to the pump 2 level during the squeezing measurement. Thus, in the squeezing measurement, the shaded area below (above) the shot-noise minimum (shot-noise maximum) corresponds to squeezing (anti-squeezing) at the input of the high-gain OPA. Squeezing and anti-squeezing levels of 4.2±0.2 dB and 9.7±0.1 dB, respectively, were measured, with 0.8 pJ of squeezer OPA pump energy. A detailed discussion on our shot-noise calibration measurements can be found in the shot noise measurement section below.

Figure 2C:
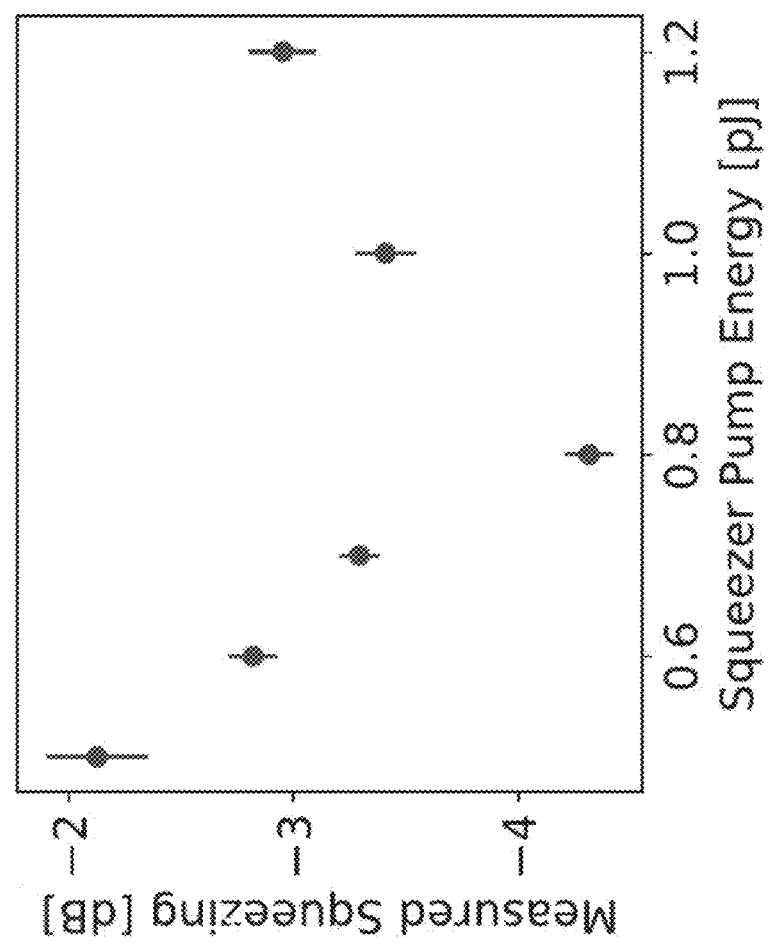

FIG. 2C illustrates characterization of the dependence of squeezing at 2090 nm on the pump power while keeping pump 2 constant and performing the shot-noise calibration for each power level. As the pump power in the squeezer OPA is increased, the level of measured squeezing increases at first. However, above 0.8 pJ of pump pulse energy, further increasing the squeezer pump decreases the level of measured squeezing. The degradation of measured squeezing at high pump powers may be due to the existence of a small phase noise and relative chirp between pump 1 and pump 2, which can mix the loss-degraded squeezed quadrature with the relatively large anti-squeezed quadrature (27). Additionally, parasitic nonlinear effects such as the photorefractive effect and nonlinear absorption mechanisms in the waveguide can also account for the degradation of squeezing at higher pump powers.

Figure 2D:
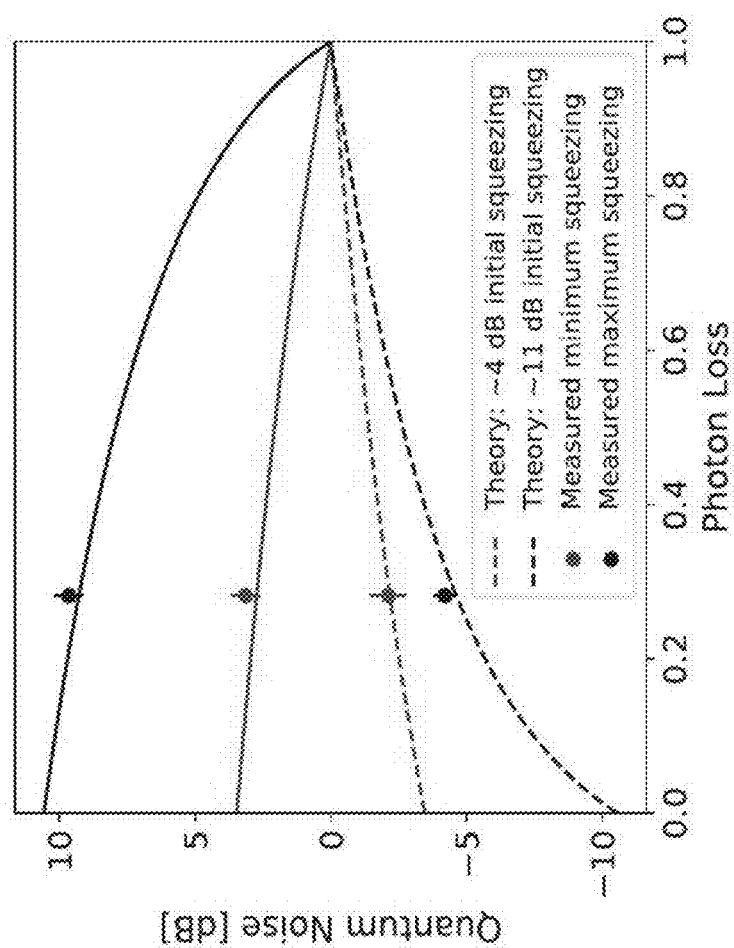

FIG. 2D shows how squeezing levels degrade in the presence of photon loss $(1-\eta)$. Analytically, $S_+^\eta[dB]=10\log[(1-\eta)+\eta e^{+1}]$, where $(1-\eta)$ determines the loss experienced by the microscopic squeezed signal and $r$ is the squeezing parameter characterizing nonlinear interaction strength. The solid dots in FIG. 2C are the experimental data points for the minimum and maximum amount of measured squeezing at 2090 nm. From these measurements, it is estimated that a total loss of $L=1-\eta \approx 0.3$ is experienced by the microscopic squeezed signal before being fully amplified by the measurement OPA. The estimated total loss is mostly dominated by the coupling efficiency of the adiabatic coupler, which was measured using an auxiliary signal centered at 2090 nm. From the squeezing and anti-squeezing measurements in FIG. 2D, the inferred squeezing (after correcting for losses) is 10.48±0.87 dB for a pump energy of <1 pJ. This paves the way for fault-tolerant CV quantum processors in LN nanophotonics, as 10.5 dB of squeezing is sufficient for many architectures, including recent proposals with Gottesman-Kitaev-Preskill qubit encodings (28).

Figure 2E:
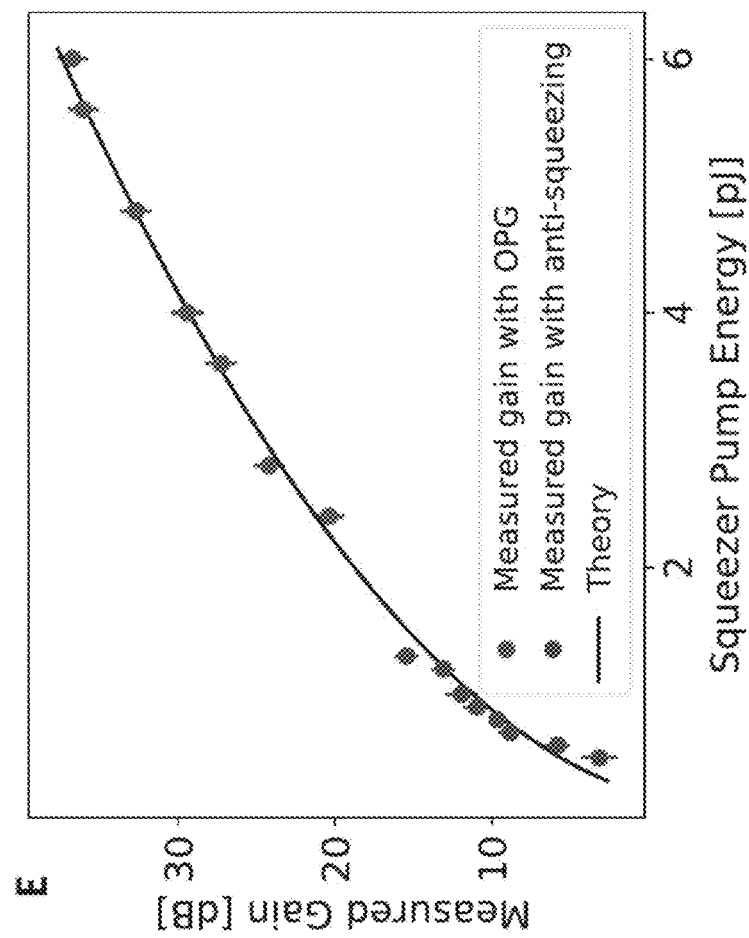

FIG. 2E depicts the gain in the squeezer OPA as a function of pump 1 pulse energy. The gain for lower pump energies (<2.4 pJ) is determined from the anti-squeezing measurements, whereas for higher pump energies (>2.4 pJ), the gain is obtained from a direct measurement of average photon number. When there is no input seed into the measurement OPA, the average number of photons in the high parametric gain regime ($\langle\hat{N}\rangle \sim G/4$) allows estimation of the gain. The solid curve is the fit that includes the overall detection efficiency (including off-chip coupling losses and imperfect detection after the measurement OPA) and the nonlinear strength as fitting parameters. The overall detection efficiency of $\eta_{overall}^{off\text{-}chip} \sim 0.20$ can be extracted from the fit. This level of linear loss puts an upper limit of <1 dB to the measurable squeezing for a standard balanced homodyne detection. This is not a limiting factor for the all-optical squeezing measurements, because of the noiseless amplification by the measurement OPA. Note that such lossy measurements are even more detrimental for highly squeezed states, as they are extremely sensitive to losses. This can be seen in FIG. 2D, where ~11 dB of initial squeezing degrades by ~10 dB in the presence of the detection losses of $L_{overall}^{off\text{-}ship} = 1 - \eta_{overall}^{off\text{-}chip} = 0.80$. However, advantageously, the all-optical measurement is not affected by $L_{overall}^{off\text{-}chip}$ losses owing to the amplification by the measurement OPA and allows measurement of the squeezing levels as high as 4.9 dB. Thus, the current measured squeezing is mostly limited by the coupling loss associated with the on-chip adiabatic coupler, which can reach with near unity coupling efficiencies through better calibration of fabrication steps, as suggested by our numerical simulations.

(ii) Broadband Measurements

FIG. 3, A to C, illustrated the measured squeezing over a broad bandwidth. The amplified shot-noise is calibrated, using the same method as discussed earlier, over the entire spectrum. Green traces correspond to measurements by the OSA over three different spectral windows when the PZT is modulated by a slow ramp signal at 300 mHz. Squeezing is present over the entire spectrum, with a slight spectral dependence. The measured squeezing is 3.8±0.4 dB around 1950 nm, 4.2±0.2 dB around 2090 nm, and 4.9±0.2 dB around 2200 nm. The spectral dependence is attributed to the wavelength dependence of the coupling efficiency of the adiabatic coupler. The squeezing bandwidth was measured to be 25.1 THz and is expected to increase to 36.4 THz, as confirmed by the optical parametric generation (OPG) from the squeezer OPA in FIG. 3D. The measured squeezing bandwidth is mostly limited by the slight mismatch of measurement OPA gain in the wings of the spectrum, as evident from its OPG signal. Because of this difference in the gain spectrum, the measurement OPA does not amplify the squeezed vacuum over its entire generation bandwidth to macroscopic levels, leading to a reduced measured squeezing bandwidth. These measurements indicate that the generated squeezed state can occupy a record-level time window of about four optical cycles. This temporal window can be shortened further by engineering the dispersion and quasi-phase matching (29) and may lead to opportunities for studying quantum fields in the extremely short-pulse regime (30). The demonstrated squeezing bandwidth allows the definition of few-optical-cycle temporal bins in time-multiplexed CV quantum information processors (6,7). As a result, such ultra-short time bins can be defined in a dense manner for which centimeter-scale on-chip delay lines can be used for large-scale cluster states on a chip.

Further Example Characterizing the First Example
(See Also Reference 51)

1. Further Details on the Experimental Setup

Figure 2F:
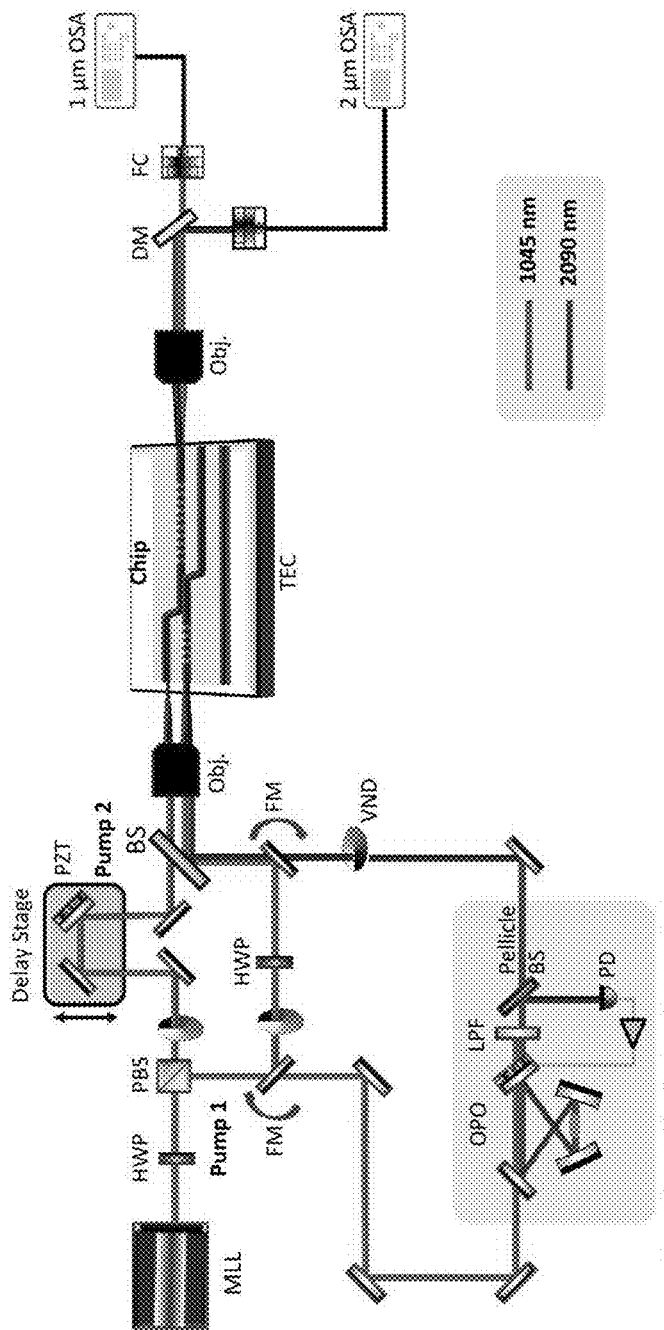
FIG. 2F: Experimental schematic for all-optical squeezing measurements. The pump laser is first split into two paths, namely Pump 1 and Pump 2, used for pumping the Squeezer OPA and Measurement OPA, respectively. The relative phase between the pumps is modulated by the PZT mounted on the delay stage in the Pump 2 arm. At the output of the nanophotonic chip, the amplified squeezed signal and Measurement OPA pump are separated using a dichroic mirror, and then are detected by optical spectrum analysers (OSAs) for spectral measurements. PBS: Polarizing beamsplitter, HWP: Half-wave plate, DM: Dichroic mirror, Obj.: Reflective objective, VND: Variable neutral-density filter, FC: Fiber Coupler, OSA: Optical spectrum analyzer, PD: Photodetector, OPO: Optical parametric oscillator, FM: Flip Mirror. (labeled as Pump 1) is either guided to the chip setup or to a synchronously pumped degenerate optical parametric oscillator (SPDOPO) used for generating pulses at 2090 nm (32). For squeezing measurements, Pump 1 and Pump 2 are first combined at a 50:50 beamsplitter (BS), and then focused on both Squeezer and Measurement OPA waveguides, respectively, using a single high NA reflective objective (Newport: 50102-02). At the output of the nanophotonic chip, we use another reflective objective (Newport: 50102-02) for collecting the light. Pump powers are controlled using two variable neural density (VND) filters mounted on both the arms. The relative phase between the Pump 1 and Pump 2 pulses is modulated by the piezoelectric transducer (PZT) mounted on the delay stage. At the output of the chip, the amplified squeezed vacuum and Measurement OPA pump are first separated using a dichroic mirror (DM) with high transmission around 1045 nm and high reflectance around 2090 nm, and then are sent to two different optical spectrum analysers (Yokogawa AQ6370D and Yokogawa AQ6375B) for spectrum measurements at 2 nm resolution.

The experimental setup for the generation and all-optical measurement of the squeezed state is shown in FIG. 2F. The Squeezer OPA and Measurement OPA are pumped by a mode-locked Yb-fiber laser (Menlo Systems Orange A) generating ~75-fs-long pulses centered at ~1045 nm at a repetition rate of 250 MHz. The pump laser is first split into two paths, namely Pump 1 and Pump 2 in FIG. 2. The first beam (labeled as Pump 2) is sent to a delay stage with a micrometer arm used for fine adjustments for temporal overlap; coarse adjustments are done by tuning the position of the delay stage. Depending on the measurement at hand, the second beam output of the nanophotonic chip, the amplified squeezed signal and Measurement OPA pump are separated using a dichroic mirror, and then are detected by optical spectrum analysers (OSAs) for spectral measurements. PBS: Polarizing beamsplitter, HWP: Half-wave plate, DM: Dichroic mirror, Obj.: Reflective objective, VND: Variable neutral-density filter, FC: Fiber Coupler, OSA: Optical spectrum analyzer, PD: Photodetector, OPO: Optical parametric oscillator, FM: Flip Mirror. (labeled as Pump 1) is either guided to the chip setup or to a synchronously pumped degenerate optical parametric oscillator (SPDOPO) used for generating pulses at 2090 nm (32). For squeezing measurements, Pump 1 and Pump 2 are first combined at a 50:50 beamsplitter (BS), and then focused on both Squeezer and Measurement OPA waveguides, respectively, using a single high NA reflective objective (Newport: 50102-02). At the output of the nanophotonic chip, we use another reflective objective (Newport: 50102-02) for collecting the light. Pump powers are controlled using two variable neural density (VND) filters mounted on both the arms. The relative phase between the Pump 1 and Pump 2 pulses is modulated by the piezoelectric transducer (PZT) mounted on the delay stage. At the output of the chip, the amplified squeezed vacuum and Measurement OPA pump are first separated using a dichroic mirror (DM) with high transmission around 1045 nm and high reflectance around 2090 nm, and then are sent to two different optical spectrum analysers (Yokogawa AQ6370D and Yokogawa AQ6375B) for spectrum measurements at 2 nm resolution. For linear characterization of our device and classical gain measurements of the OPAs, we use the SPDOPO output centered at 2090 nm (32). Pump 1 is used for pumping the SPDOPO, which is locked using a "dither and lock" technique, implemented with a Red Pitaya FPGA board (33, 34). A variable ND filter is added to the output of the OPO to control the 2090 nm power. For OPA measurements, a well-attenuated SPDOPO signal is spatially overlapped with Pump 2 at a dichroic mirror mounted in place of the 50:50 BS. A discussion on device characterization and OPA gain measurements is provided in Sections 4&7.

2. Shot Noise Characterization Measurements

Figure 4:
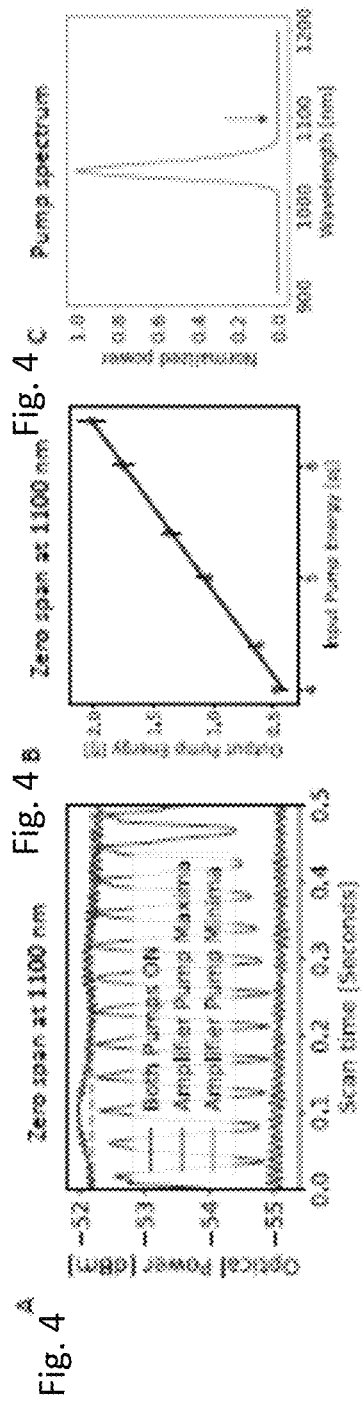
FIGS. 4A-4E: Shot-noise calibration measurements.

The design of the adiabatic coupler and its fabrication imperfections couples ~20% of the Squeezer OPA pump to the high-gain Measurement OPA waveguide, which then interferes with Pump 2, resulting in a gain modulation in the Measurement OPA. In order to accurately determine the amount of squeezing, this gain modulation is measured by characterizing the interference of the these two pumps in the Measurement OPA and removing its effect from the squeezing measurements. FIG. 4A is an example of a Pump 1 and Pump 2 interference fringe (green trace) acquired by an OSA in zero span mode at 1100 nm. While keeping the Squeezer OPA Pump 1 blocked, we increase (decrease) the Measurement OPA Pump 2 power to the maxima (minima) levels of the interference fringe, which corresponds to the blue (red) trace in FIG. 4A. These two power levels of Pump 2 result in the "shot-noise maximum" and "shot-noise minimum" shown in FIG. 2B. The pump interference is measured in zero span mode at 1100 nm (the red arrow in the pump spectrum in FIG. 4C) to calibrate the shot-noise measurements to ensure that the calibration is not affected by any nonlinear effects in the Measurement OPA. This is confirmed by the linear transmission measurements, shown in FIG. 5B, at 1100 nm for the Measurement O PA Pump 2 power levels varying in the range of power levels of the recorded interference fringe.

To further verify the shot-noise calibrations, the interference pattern seen in FIG. 4A is recreated off-chip and injected into the Measurement OPA arm while keeping the Squeezer OPA Pump 1 blocked. FIG. 4D shows the transmission measured in zero-span mode at 1100 nm. The interference fringe (green trace) is shown along with the maximum (blue) and minimum (red) power levels of Pump 2. FIG. 4E shows the OSA output for these traces when set to zero-span mode at 2090 nm. It can be seen that the maximum and minimum power levels of the green trace in FIG. 4E stays within the maximum and minimum amplified shot noise levels. This is in stark contrast with the squeezing measurements (FIG. 2A and FIG. 3) where the green trace goes below/above the shot-noise minima/maxima, which is due to the amplification of the squeezed and anti-squeezed quadratures of the original squeezed state generated in the Squeezer OPA. Mathematically, the measured quadrature variance of vacuum fields is $$\Delta^2 \hat{X}_\phi | \alpha |^2 \left( \hat{X}_\phi^2 \right)_{\rho_v} \quad \text{S1}$$

where $\rho_v$ is the vacuum state with $\left( \hat{X}_\phi^2 \right)_{\rho_v} = 1/4$. As a result, by adding the losses (i.e., $\alpha \rightarrow \sqrt{\eta}\, \alpha$ for $\eta<1$) or by increasing the strength of the LO (i.e., $\alpha \rightarrow \sqrt{k}\alpha$, for k>1), one can verify the linearity of the measured shot-noise, thereby confirming that the BHD does not add any noise during measurements and the measured noise is the shot-noise limit.

Figure 5:
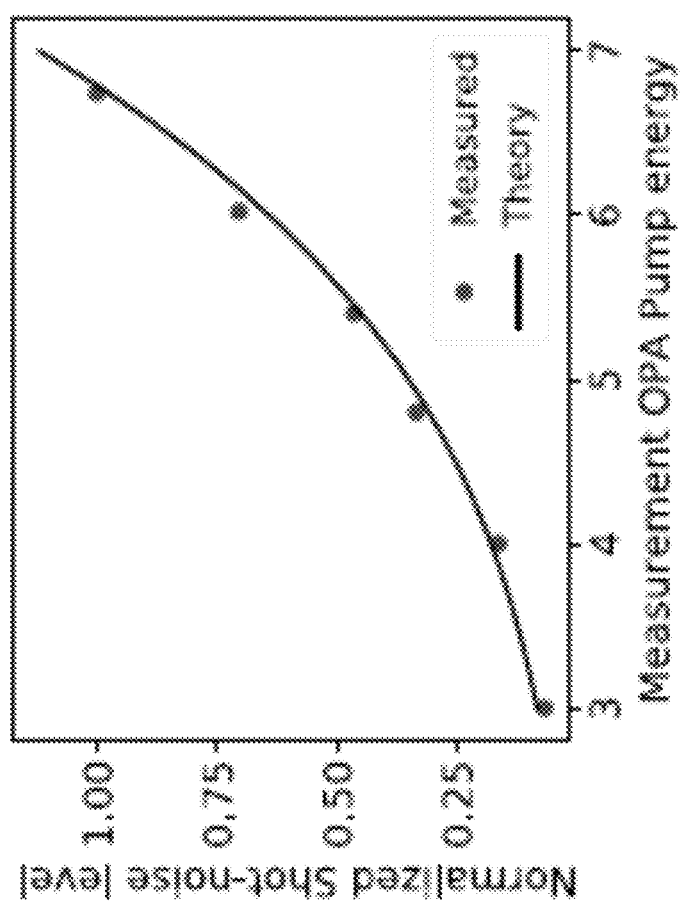
FIG. 5: Shot-noise level measurements at various values of pump energy.

Likewise, one can calibrate the shot-noise of an all-optical measurement in a similar manner as BHD. In our all-optical measurements with high-gain OPAs, the roles of the beam-splitter and LO in HD are played by the Measurement OPA and its pump (Pump 2). In this case, the measured quadrature variance of the sufficiently amplified selected vacuum quadrature is given by $$\Delta^2 \hat{X}_\phi \propto \left( \hat{X}_\phi^2 \right)_{\rho_v} \quad \text{S2}$$

where $G = e^{2L\eta\sqrt{P}}$ is the gain of the Measurement OPA; L is the length of the Measurement OPA, η is the nonlinear efficiency, and P is the Pump 2 strength. As a result, the amplified shotnoise level (i.e., the noise of the high-gain OPA) grows exponentially with the Pump 2 (LO) strength. This was verified by measuring the amplified shot-noise at various values of Pump 2 energy, as shown in FIG. 5. The measured normalized shot-noise level (red points) agrees well with the expected exponential behavior (black curve), as shown in the plot below. A good agreement with the expected amplified shot-noise solely due to the phase-sensitive amplification of the vacuum state confirms that the noise added by the Measurement OPA is negligible as compared to the amplified shot-noise. It was then ensured that the Measurement OPA has sufficient gain. For a direct squeezing measurement, it is important for the Measurement OPA to amplify the selected quadrature such that it entirely dominates the energy of the amplified field, and the attenuated quadrature can be considered negligible. The desired and experimentally measured gain levels are further discussed in following sections.

3. Numerical Simulation Methods

To simulate the shortpulse nonlinear dynamics in the devices, a nonlinear envelope equation (NEE) was solved in the frequency domain using a split-step Fourier method (35), where the nonlinear step is integrated using a fourth-order Runge-Kutta method. The NEE was obtained by ignoring counterpropagating modes, which are usually phase mismatched, and assuming a constant nonlinear coefficient across the entire simulation bandwidth. The NEE is given by:

$$\frac{\partial A}{\partial z} = -i\left[\beta(\omega) - \beta_0 - \frac{\Omega}{v_{ref}} - i\frac{\alpha}{2}\right]A - \frac{i\omega\varepsilon_0 X_0}{8}d(z)\mathcal{F}_\Omega\left\{a^2 e^{j\phi(z,t)} + 2\alpha a^* e^{-j\phi(z,t)}\right\} \quad \text{S3}$$

where $A(z,\omega)$ and $a(z,t)$ are the complex amplitude of the field during propagation in the frequency and time domain, $\phi(z,t)=\omega_0 t - (\beta_0 - \omega_0/v_{ref})z$, $\beta_0$ is the waveguide propagation constant at frequency $\omega_0$, $\Omega = \omega - \omega_0$ is the envelope frequency, α is the attenuation constant, $d(z) = \pm 1$ is the sign of the nonlinear coefficient that varies along the waveguide due to quasiphase matching, $\mathcal{F}_\Omega$ is the Fourier transform in Ω-space, and $X_0$ is the effective nonlinear coefficient. The pump and signal pulses were assumed to have a transform-limited, hyperbolicsecant profile. Commercial software (Lumerical Inc.) was used to calculate the waveguide modes and dispersion parameters used in the numerical simulations.

FIG. 5 shows the simulated squeezer OPA gain when it is seeded with a weak coherent pulse ($|\alpha|^2 \ll 1$) centered at 2090 nm and the relative phase between the pump and weak signal is varied. For the pump pulse energy of ~1 pJ, the simulated OPA gain of ~10 dB agrees well with the measured gain (anti-squeezing) at the same pump energy levels.

Figure 6B:
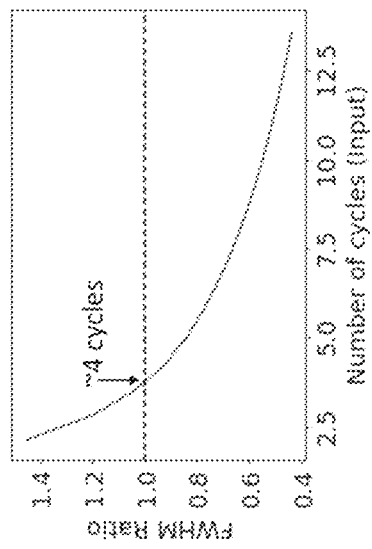
FIGS. 6A-6D: Numerical simulations.
Figure 6D:
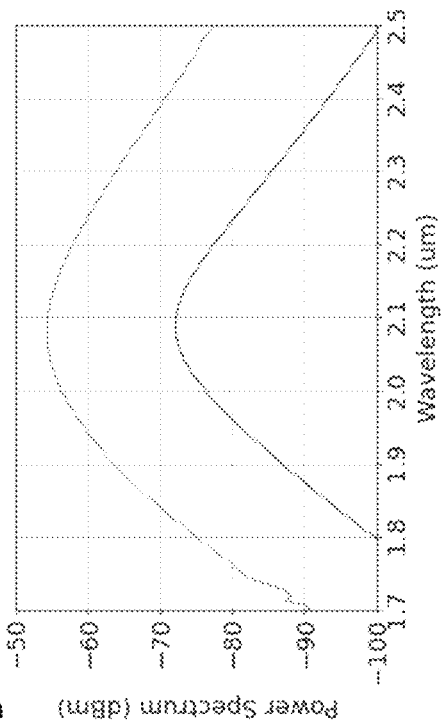
Figure 6A:
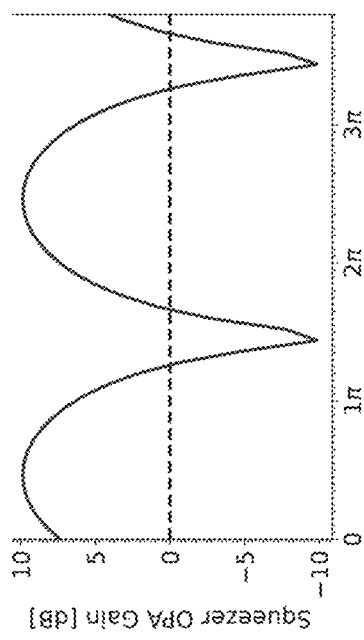
Figure 6C:
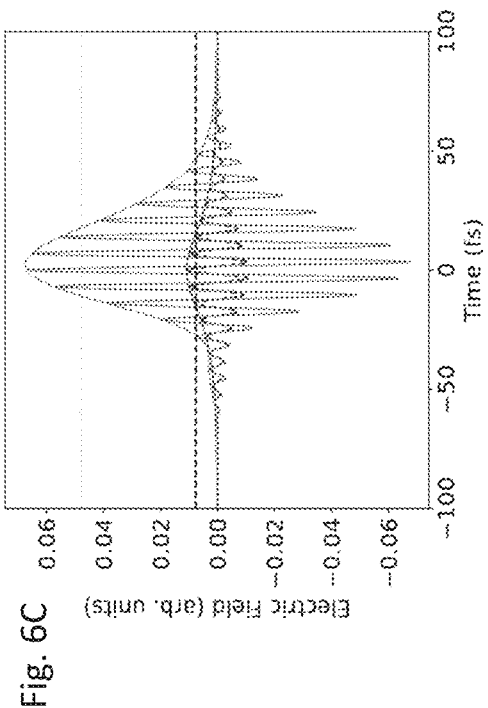

The shortest signal pulse that can be amplified by our Squeezer OPA in a phase sensitive manner can be determined by varying the pulse width of weak coherent pulse from 15 fs to 100 fs while keeping the average pulse energy constant for a given pump pulse (~75 fs) and monitoring the Squeezer OPA in the time domain. FIG. 6B shows the ratio, $R = \tau_{out}/\tau_{in}$ of the FWHM widths of output and input pulses. Numerical simulations suggest that as we keep reducing the pulse width of the input pulse from 100 fs, the amplified output pulse width remains short until the input pulse width of ~30 fs, which corresponds to ~4 optical cycles. Beyond that point the output pulse width starts to broaden in the time domain, as evident from R>1 in FIG. 6B. This may be attributed to stronger detrimental effects caused by a small group velocity dispersion (GVD) and group velocity mismatch (GVM) in our devices for shorter pulses. These effects can be minimized by a better management of GVD and GVM through dispersion engineering. As a result, it is found that the shortest pulse that the Squeezer OPA can amplify while maintaining the pulse shape and offering high gain is ~30 fs. The temporal and spectral evaluations of ~30 fs weak coherent pulse seeding the OPA are shown in FIG. 6C and FIG. 6D, respectively. The input pulses are shown in blue traces and orange traces correspond to output pulses. Dashed yellow and blue lines in FIG. 6C show the FWHM ($|E|^2 = 1/2$) for determining the number of optical cycles. It is seen that the amplified pulse retains its shape and contains ~4 cycles. FIG. 6D shows the constant gain of ~18 dB over the entire bandwidth for 4 pJ of pump energy. The simulated constant gain bandwidth agrees well with the measured bandwidth of the optical parametric generation (OPG) from the squeezer OPA. The OPG signal is produced by amplifying (anti-squeezing) a quadrature while attenuating (squeezing) the orthogonal quadrature of vacuum field. Therefore, the generated squeezed vacuum bandwidth supports only a few optical cycles. Ideally, to measure the squeezing over the entire bandwidth one needs to ensure that the Measurement OPA has the same gain bandwidth while having the sufficient gain to amplify the microscopic squeezed vacuum to macroscopic levels, which can be achieved by dispersion engineering in LN nanophotonics.

4. Coupler Design and Characterization

Figure 7A:
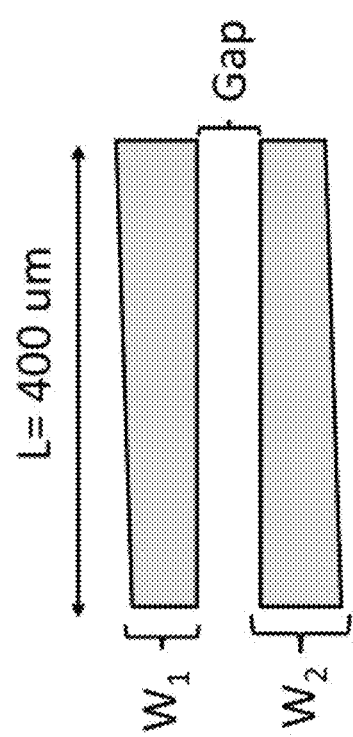
FIGS. 7A-7D: Design and characterization of adiabatically tapered coupler.

In the adiabatic design used to obtain the data presented herein, both waveguides are linearly tapered while keeping the gap constant throughout the coupling length as shown in FIG. 7A. Such a design offers a broadband coupling efficiency and is less susceptible to fabrication imperfections. Due to the adiabatic nature of the coupling process, such a coupler also relaxes the fixed beat length essential for a conventional non-tapered directional coupler and prohibits the Rabi-like oscillations of optical field between the pair of waveguides during propagation. The coupling efficiency of such a coupler given is by the Landau-Zener formula (36):

$$\eta_c = 1 - \exp\left(\frac{-2\pi g^2}{\lambda} \frac{1}{\partial n_{eff}/\partial z}\right) \quad \text{S4}$$

Figure 7B:
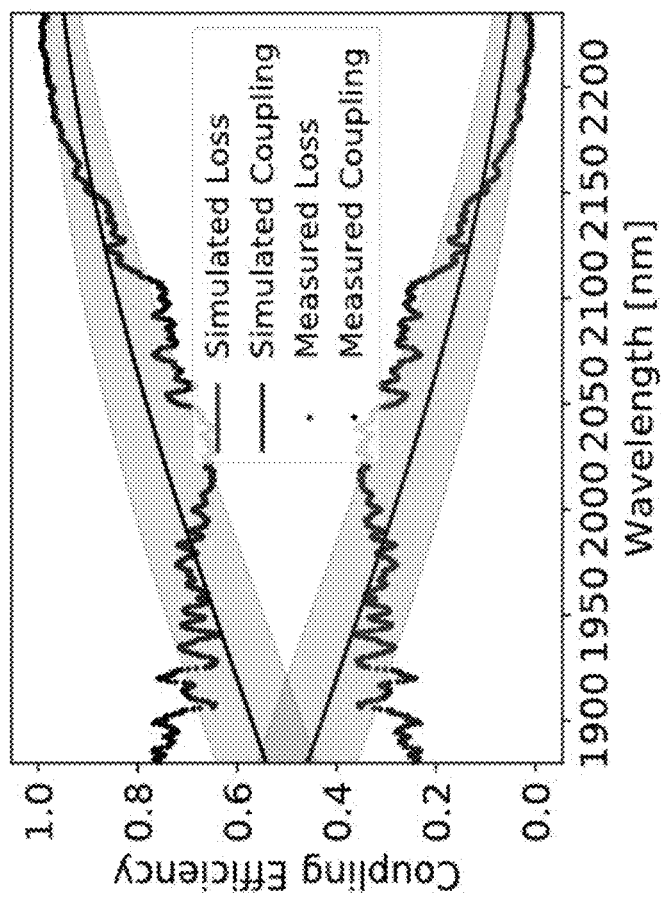
Figure 7C:
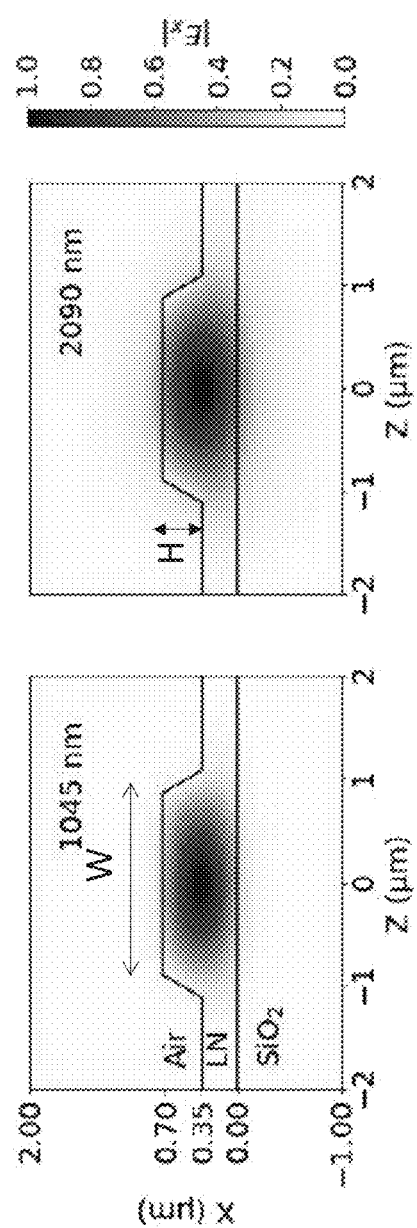
Figure 7D:
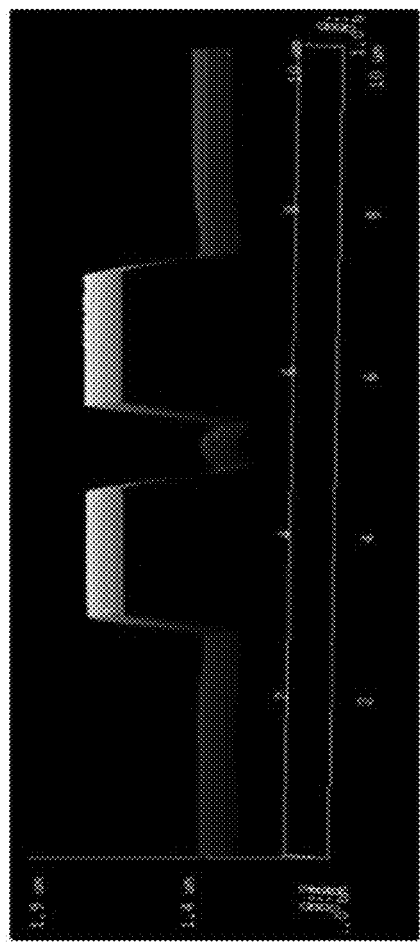

The coupling strength is $g=(n_e-n_o)/2$, where $n_e$ and $n_0$ are the refractive indices for the even and odd modes at the center of the coupler and $\partial n_{eff}/\partial z$ corresponds to the gradient in the refractive index along the propagation length. From Eq. S4, one can see that the coupling efficiency, $\eta_c$ increases as the coupling strength, g increases. Due to the large difference in the spatial mode sizes as seen in FIG. 7B, the fundamental transverse-electric (TE) modes around 2090 nm of squeezed vacuum can be efficiently coupled from the squeezer waveguide to measurement amplifier waveguide, while the fundamental TE mode around 1045 urn of the squeezer pump mostly gets rejected. The numerically simulated coupling strengths around 1045 nm and 2090 nm are $O(10^{-4})$ and $O(10^{-3})$, respectively. FIG. 7C shows the simulated (solid curves) and measured coupling efficiency and loss (dotted curves) over the measured squeezing bandwidth. The simulated coupling efficiency (solid black) and loss (solid blue) are obtained using Eq. S4, where the effective refractive indices are calculated using the eigenmode solver in Lumerical. The coupling efficiency of $\eta_c^{2090\,nm}$~0.70 is measured using an auxiliary signal centered at 2090 nm generated by the SPDOPO and $\eta_c^{1045\,nm}$~0.20 around 1045 nm using the squeezer pump. The waveguide geometry for numerical simulations was obtained using atomic force microscopy (AFM). An image for the coupler region is shown in FIG. 7D, showing measurements for the top widths of $W_1$~1668 nm and $W_2$~1768 nm, etching depth of ~380 nm, thin-film thickness of ~713 nm, and sidewall angle of ~57°.

Figure 8B:
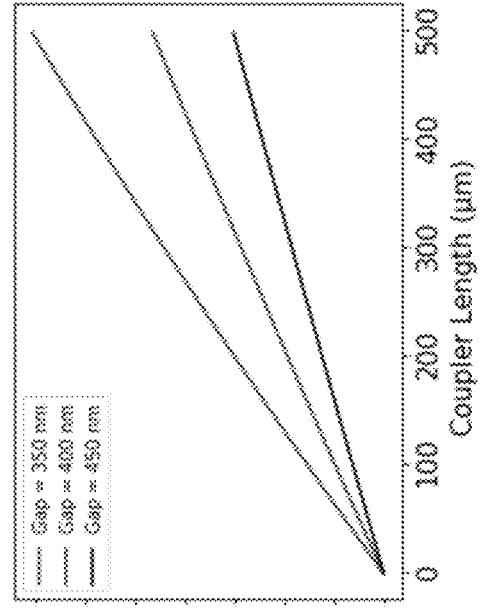
FIGS. 8A-8B: Simulated coupling efficiencies, (FIG. 8A) for the signal, (FIG. 8B) for the pump field.
Figure 8A:
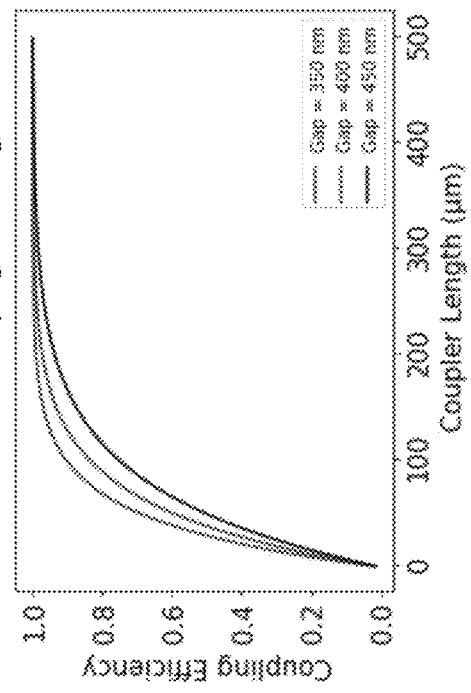

In the coupling region of L=400 µm, the measured bottom gap in the coupler region is ~400 nm. While the measured coupling efficiency around 2 µm is ~70%, it can be significantly improved to ~100%, as suggested by our simulations. FIG. 8 shows the numerically simulated coupling efficiencies for the signal at 2090 nm and pump at 1045 nm. For these simulations, a thin-film thickness of 700 nm and etching depth of 350 nm are used. Top widths of $W_1$=1750 nm and $W_2$=1850 nm and the waveguide ridge angle is ~60°. Three traces correspond to the three different values of bottom gaps of 350 nm, 400 nm, and 450 nm. For a coupler length of 300 µm, the coupling efficiencies for signal is >98% while <5% of the pump is getting coupled when the coupler gap is of 450 nm. Considering the ultra-low loss propagation in LN nanophotonics and improved linear coupling of the coupler can lead to the measurements of squeezing levels suitable for fault-tolerant quantum information processors.

5. Quantum Formalism for the Generation and all-Optical Measurement of Squeezed States The general formalism for the generation and all-optical measurement of quadrature squeezed vacuum using ultra-short-pulse phase-sensitive optical parametric amplifiers (OPAs) can be derived using a formulation wherein the single-mode field quadrature operators are defined as $\hat{Q}:=(\hat{a}+\hat{a}^\dagger)/\sqrt{2}$, $\hat{P}:=(\hat{a}-\hat{a}^\dagger)/\sqrt{2}i$, and $\hbar=1$ such that $\Delta Q \Delta P = \frac{1}{2}$ for the vacuum state. In the interaction picture, the effective Hamiltonian for a spontaneous parametric down-conversion process in a $\chi^{(2)}$ waveguide OPA excited by a pulsed pump is given as (38,39)

$$\hat{H} \propto \iint d\omega_s d\omega_i S(\omega_s,\omega_i) \hat{a}_s^\dagger(\omega_s) \hat{a}_i^\dagger(\omega_i) + h.c., \quad \text{S5}$$

where $S(\omega_s,\omega_i)$ describes the spectral correlations in signal and idler modes described by the photon creation operators $\hat{a}_s^\dagger(\omega_s)$ and $\hat{a}_i^\dagger(\omega_i)$, respectively and H.C. stands for the hermitian conjugate. By utilizing the Schmidt mode decomposition of the spectral correlation function $S(\omega_s,\omega_i)=\Sigma_m c_m\, \phi_m(\omega_s)\psi_m(\omega_i)$ with $\Sigma_m |c_m|^2 =1$, one can rewrite the Hamiltonian as $$H = \xi \sum_m \left(c_m \hat{A}_m^\dagger \hat{B}_m^\dagger + c_m^* \hat{A}_m \hat{B}_m\right) \quad \text{S6}$$

where $\xi$ determines the nonlinear interaction strength. $\hat{A}_m^\dagger$ and $\hat{B}_m^\dagger$ are broadband photon creation operators defined as (39)

$$\hat{A}_m^\dagger = \int d\omega_s \phi_m(\omega_s) \hat{a}_s^\dagger(\omega_s)$$

$$\hat{B}_m^\dagger = \int d\omega_i \psi_m(\omega_i) \hat{a}_i^\dagger(\omega_i)$$

The resultant unitary evolution operator under the Hamiltonian in Eq. S6 is then given as $$\hat{U} = \exp\left(-\frac{i\xi t}{\hbar} \sum_m \left(c_m \hat{A}_m^\dagger \hat{B}_m^\dagger + c_m^* \hat{A}_m \hat{B}_m\right)\right) \quad \text{S9}$$

For brevity, we define $r_m c = -i\xi t c_m/\hbar = |r_m|e^{i\phi_m}$, which determines the nonlinear interaction strength of the m-th pairwise broadband spectral modes. The functions $\{\phi_m(\omega_s)\}$ and $\{\psi_m(\omega_i)\}$ form a complete set of orthonormal functions, i.e., $\int \phi^*_m(\omega_s)\phi_l(\omega_s)=\delta_{l,m}$ and $\int \psi^*_m(\omega_i)\psi_l(\omega_i)=\delta_{l,m}$. As a result, the Hamiltonian in Eq. S6 can be considered as the effective Hamiltonian of an ensemble of independent broadband two-mode squeezers, which further simplifies the unitary operator since we have $[\hat{A}_l,\hat{A}_m]=0$ and $[\hat{B}_l,\hat{B}_m]=0$. Thus, we get $$\hat{U} = \bigotimes_m \exp(r_m \hat{A}_m^\dagger \hat{B}_m^\dagger - r_m^* \hat{A}_m \hat{B}_m) \quad \text{S10}$$

We now consider the m-th mode with signal and idler broadband modes described by the photon annihilation operators $\hat{A}_m$ and $\hat{B}_m$, respectively. In this case, the unitary operator is $$\hat{U} = \exp(r_m \hat{A}_m^\dagger \hat{B}_m^\dagger - r_m^* \hat{A}_m \hat{B}_m) \quad \text{S11}$$

In the Heisenberg picture, the evolution of the broadband operators is given by the Bogoliubov transformation defined as (39)

$$\hat{A}_m \to \hat{A}_m \cos h\, r_m + e^{i\phi_m} \hat{B}_m^\dagger \sin h\, r_m \quad \text{S12}$$

$$\hat{B}_m \to \hat{B}_m \cos h\, r_m + e^{i\phi_m} \hat{A}_m^\dagger \sin h\, r_m \quad \text{S13}$$

In the quadrature representation, for $\Phi_m = 0$, Eqs. S12 and S13 can be written as $$\hat{Q}_m^A \pm \hat{Q}_m^B \to (\hat{Q}_m^A \pm \hat{Q}_m^B) e^{\pm r_m} \quad \text{S14},$$

$$\hat{P}_m^A \pm \hat{P}_m^B \to (\hat{P}_m^A \pm \hat{P}_m^B) e^{\mp r_m} \quad \text{S15},$$

where we have used $\hat{Q} = (\hat{a} + \hat{a}^\dagger)/\sqrt{2}$ and $\hat{P} = (\hat{a} - \hat{a}^\dagger)/\sqrt{2}i$ for the amplitude and phase quadratures of the quantum field. From Eqs. S14 & S15, we see that the sum (difference) of phase (amplitude) quadratures is squeezed and the difference (sum) of the phase (amplitude) quadratures is anti-squeezed. We define $\hat{Q}_+ := \hat{Q}_m^A \pm \hat{Q}_m^B$ and $\hat{P}_\pm := \hat{P}_m^A \pm \hat{P}_m^B$. A simple calculation shows that $[\hat{Q}_\pm, \hat{P}_\mp] = 0$ and hence, they can be diagonalized simultaneously. Their shared eigenstate in the limit of $r_m \to \infty$ is the Einstein-Podolsky-Rosen (EPR) state with $$\hat{Q}_- |EPT\rangle = 0$$

$$\hat{P}_+ |EPR\rangle = 0. \quad \text{S16}$$

In the finite squeezing limit, the EPR state serves as a crucial building block for many applications in continuous-variable quantum information processing (5-8). From Eq. S16, one can see that the operators $\hat{Q}_-$ and $\hat{P}_+$ are the nullifiers for the EPR state and have been widely used for their entanglement verification through the van Loock-Furusawa criterion in many frequency or time-multiplexed CV cluster state experiments (40). These nullifiers for each pair of modes are typically measured using multimode balanced homodyne detectors (BHD) with local oscillators (LO) tuned for each pair of frequency modes using electro-optic modulators (EOMs) (6-8, 10). While the multimode homodyne measurements have been successful in small-scale experiments, it can be experimentally challenging when a large number of modes spanning over THz of bandwidth are involved. Moreover, the nullifier measurements are inherently limited by the electronic bandwidths of the EOMs, typically used for creating the LO sidebands to access the individual frequency modes of the quantum optical frequency comb (8).

In the photon-number basis, the two-mode squeezed state can be expressed as $$|\psi\rangle_{A,B}^m = \sum_{n=0} c_{nn} |n_A, n_B\rangle, \quad \text{S17}$$

where $c_{nn} = \tan h^n r_m / \cos h\, r_m$. As can be seen from Eq. S17, there are photon-number correlations between the signal and idler modes. The average photon-number is $$\langle \hat{N}_m^{A,B} \rangle = Tr[\rho_{A,B}(\hat{N}_m^A + \hat{N}_m^B)] = 2 \sin h^2 r_m \quad \text{S18}$$

So far, a single-mode operators was used for these derivations. A frequency agnostic two-mode complex quadrature formalism (41) is now adopted where the two-mode complex quadrature operators can be defined as $$\hat{X}_{A,B} := \hat{A} + \hat{B}^\dagger = (\hat{Q}_+ + i\hat{P}_-)/\sqrt{2}$$

$$\hat{Y}_{A,B} := i\hat{A}^\dagger - \hat{B} = (i\hat{Q}_- + \hat{P}_+)/\sqrt{2} \quad \text{S19}$$

Here, we have omitted the mode index m because the formalism is equally valid for any number of correlated frequency modes (41). Similar to single-mode case, one can then define the generalized two-mode quadrature operator as $$\hat{Z}_{A,B} = \cos \phi \hat{X}_{A,B} + \sin \phi \hat{Y}_{A,B}, \quad \text{S20}$$

where $\hat{X}_{A,B}$ and $\hat{Y}_{A,B}$ can be thought as the amplitude and phase quadratures of the two-mode field. Using Eqs. S12, S13, S19, and S20, we can conclude that a two-mode OPA amplifies the amplitude quadrature $\hat{X}_{A,B}$ while attenuating the phase quadrature $\hat{Y}_{A,B}$ without any additional noise. Mathematically, we have $$\hat{X}_{A,B} \to \hat{X}_{A,B} e^r \quad \text{S21},$$

$$\hat{Y}_{A,B} \to \hat{Y}_{A,B} e^{-r}. \quad \text{S22}$$

This is similar to a single-mode degenerate OPA where signal and idler photons are emitted into the same optical mode. In the single-mode case, the Hamiltonian can be treated as an effective Hamiltonian of an ensemble of independent broadband single-mode squeezers (39). The resulting unitary evolution can then be simplified as $$\hat{U} = \bigotimes_{m=1} \exp[(r_m \hat{A}_m^{\dagger 2} - r_m^* \hat{A}_m^2)] \quad \text{S23}$$

In the Heisenberg picture, the evolution of the broadband operators is given by the Bogoliubov transformation defined as (38)

$$\hat{A}_m \to \hat{A}_m \cos h\, r_m + e^{i\phi} \hat{A}_m^\dagger \sin h\, r_m \quad \text{S24}$$

Rewriting Eq. S24 in the quadrature representation for $\phi = 0$, we get $$\hat{Q}_m \to \hat{Q}_m e^{r_m} \quad \text{S25},$$

$$\hat{P}_m \to \hat{P}_m e^{-r_m} \quad \text{S26}$$

From Eqs. S21, S22, S25, and S26, one can see that the two-mode complex quadrature representation puts the single-mode and two-mode OPAs at equal footing. In the two-mode complex quadrature representation, the total average photon-number turns out to be $$\langle \hat{N}_{A,B} \rangle_\rho \propto e^{2r} \langle \hat{X}_{A,B}^\dagger \hat{X}_{A,B} \rangle_{\rho_{A,B}} + e^{-2r} \langle \hat{Y}_{A,B}^\dagger \hat{Y}_{A,B} \rangle_{\rho_{A,B}} \quad \text{S27}$$

where $\rho_{A,B}$ is the input state to the OPA. In the high-parametric gain regime $e^{2r} \gg 1$, the average photon-number is entirely dominated by the amplified quadrature and the attenuated quadrature can be considered negligible. The amplified quadrature power is in the macroscopic regime, i.e., it is sufficiently above the vacuum noise and can be directly measured with high tolerance to losses due to off-chip coupling, mode-mismatching, and imperfect detection. From Eq. S27, we can see that the quadrature variance of the input state can be determined from a direct measurement of the average photon-number of the amplified quadrature. For the generation and all-optical measurement of squeezed vacuum states, one can cascade two such OPAs—the first low-gain OPA can be pumped to generate squeezed vacuum, which can then be measured by the second high-gain OPA, as shown in FIG. 9.

Figures 9A, 9B:
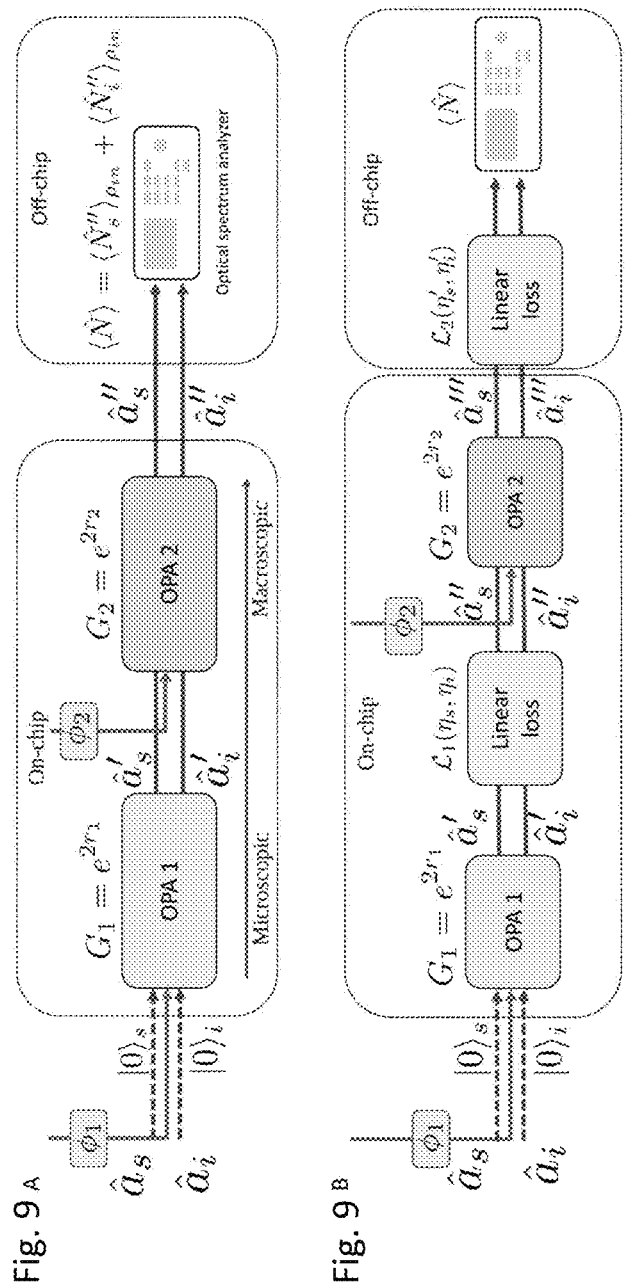
FIGS. 9A-9B: Generation and all-optical measurement of a squeezed vacuum state.

An ideal case is considered in FIG. 9a, wherein OPA 1 is used to generate a squeezed vacuum state which is then amplified with a high-gain OPA 2. From hereon, We will call OPA 1 and OPA 2 as squeezer and measurement amplifiers, respectively. The squeezer phase, $\phi_1$ is kept fixed while the measurement amplifier phase, $\phi_2$ is modulated to amplify each quadrature of the squeezed vacuum state. The squeezer (measurement amplifier) gain is $G_{1(2)} = e^{2r_{1(2)}}$. In the Heisenberg picture, we find the evolution of annihilation operators after the first and second OPA. After the OPA 1 in FIG. 9a, we get $$\hat{a}_z' = \hat{a}_z \cos h\, r_1 + e^{i\phi_1} \hat{a}_i^\dagger \sin h\, r_1$$

$$\hat{a}_i' = \hat{a}_i \cos h\, r_1 + e^{i\phi_1} \hat{a}_s^\dagger \sin h\, r_1. \qquad \text{S28}$$

Likewise, after the OPA 2

$$\hat{a}_s'' = \hat{a}_s' \cos h\, r_2 + e^{i\phi_2} \hat{a}_i'^\dagger \sin h\, r_2$$

$$\hat{a}_i'' = \hat{a}_i' \cos h\, r_2 + e^{i\phi_2} \hat{a}_s'^\dagger \sin h\, r_2. \qquad \text{S29}$$

As a result, the input operators for signal and idler modes evolve to $$\hat{a}_s \to \hat{a}_s \cos h\, r_{\mathit{eff}} + e^{i\phi_l} \hat{a}_i^\dagger \sin h\, r_{\mathit{eff}}$$

$$\hat{a}_i \to \hat{a}_i \cos h\, r_{\mathit{eff}} + e^{i\phi_k} \hat{a}_s^\dagger \sin h\, r_{\mathit{eff}} \qquad \text{S30}$$

where $r_{\mathit{eff}}$ is the effective gain parameter given as $$r_{\mathit{reff}} = \operatorname{arctanh}\left[\frac{\sinh r_1 \cosh r_2 + e^{i\Delta\phi}\sinh r_2 \cosh r_1}{\cosh r_1 \cosh r_2 + e^{i\Delta\phi}\sinh r_1 \cosh r_2}\right] \qquad \text{S31}$$

where $\Delta\phi = \phi_1 - \phi_2$. The average photon-number is $$\langle \hat{N} \rangle = Tr[|0_s, 0_i\rangle\langle 0_s, 0_i|\hat{N}] = 2 \sin h^2 |r_{\mathit{eff}}|, \qquad \text{S32}$$

In order measure the squeezing, the quadrature variances are compared with the vacuum state. To determine the vacuum variances, the squeezer (OPA 1) pump is blocked and the average photon-number of the amplified vacuum (optical parametric generation) from OPA 2 is measured. Mathematically, we can set $r_1=0$ and $\phi_1=0$ in Eq. S31. As a result, the average photon-number of amplified vacuum state is $$\langle \hat{N}_v \rangle = 2 \sin h^2 r_2. \qquad \text{S33}$$

Thus, Eq. S33 determines the amplified shot-noise level, i.e., the variance of the amplitude vacuum quadrature. It is worth emphasizing the average-photon number of the amplified vacuum does not depend on the phase of the Measurement OPA pump, as seen from Eq. S33. This is due to the uniform phase distribution of the vacuum state. However, the high-gain amplification by the Measurement OPA is performed in a phase-sensitive manner, i.e., the selected vacuum quadrature is amplified at macroscopic levels while attenuating the orthogonal quadrature, resulting in ellipse-shaped phase-space distributions shown in FIG. 1B and FIG. 1C, which are not distinguishable by power measurements.

For determining the squeezing, the amplified vacuum variance needs to be compared with the amplified squeezed quadrature variance. Thus, we set $\Delta\phi = \pi$. In this case, $r_{\mathit{eff}}$ in Eq. S31 is: $r_{\mathit{eff}} = r_- = |r_2 - r_1|$. Therefore, for average photon-number measurements both the OPAs can be treated as a single OPA with effective gain $r_-$, leading to $$\langle \hat{N}_- \rangle = 2 \sin h^2 r_- \qquad \text{S34}$$

Likewise, we set $\Delta\phi = 0$ for measuring the anti-squeezing quadrature. In this case, antisqueezed quadrature of the squeezed vacuum state from OPA 1 is being amplified by the Measurement OPA. The average photon-number in this case is $$\langle \hat{N}_+ \rangle = 2 \sin h^2 r_+, \qquad \text{S35}$$

where we define $r_+ = |r_1 + r_2|$. As a result, the anti-squeezing ($S_+$) and squeezing ($S_-$) can be calculated as $$S_\pm[\mathrm{dB}] = 10\log_{10}\left[\frac{\langle N_\pm \rangle}{\langle N_v \rangle}\right] = 10\log_{10}\left[\frac{\sinh^2 r_\pm}{\sinh^2 r_2}\right]. \qquad \text{S36}$$

For $e^{2r_2} \gg e^{2r_1} \gg 1$, $S_+[\mathrm{dB}] \to 10\log_{10}(e^{\pm 2r_1})$. It is worth emphasizing that such an all-optical measurement scheme allows one to measure the quantum fields over the entire optical bandwidths since both the generation and measurement use the same nonlinear process.

Experimental imperfections due to linear losses and non-unity detection efficiencies are included in our model. Losses are modeled by setting up fictitious beamsplitters with losses modeled with non-unity transmission coefficients. On-chip losses on squeezed vacuum are modeled by two beamsplitters denoted by $\mathcal{L}_1(\eta_s, \eta_i)$, and off-chip coupling losses and imperfect detection are modeled by $\mathcal{L}_2(\eta_s', \eta_i')$, as shown in FIG. 9b, where $(\eta_s, \eta_i)$ and $(\eta_s', \eta_i')$ determine the transmission coefficients of beamsplitters placed in the path of signal and idler modes.

Similar to ideal case, the Heisenberg picture is employed to find the evolution of input annihilation operators. Due to on-chip loss $\mathcal{L}_1(\eta_z, \eta_i)$, the operators $\hat{a}_z'$ and $\hat{a}_i'$ transform to $$\hat{a}_z'' = \sqrt{\eta_s}\hat{a}_s' + \sqrt{1-\eta_s}\hat{a}_s^v$$

$$\hat{a}_z'' = \sqrt{\eta_s}\hat{a}_s' + \sqrt{1-\eta_s}\hat{a}_s^v$$

where $\hat{a}_s^s$ and $\hat{a}_o^v$ are the vacuum modes coupled through the open ports of the beamsplitters for the signal and idler modes, respectively. After OPA 2, the operators evolve as $$\hat{a}_s''' = \hat{a}_z'' \cos h\, r_2 + e^{i\phi_2} \hat{a}_i''^\dagger \sin h\, r_2$$

$$\hat{a}_i''' = \hat{a}_i'' \cos h\, r_2 + e^{i\phi_2} \hat{a}_s''^\dagger \sin h\, r_2 \qquad \text{S38}$$

Finally, we calculate the evolution under $\mathcal{L}_2(\eta_s', \eta_i')$ $$\hat{a}_s^f = \sqrt{\eta_s'}\hat{a}_s''' + \sqrt{1-\eta_s'}\hat{a}_s^v$$

$$\hat{a}_i^f = \sqrt{\eta_i'}\hat{a}_i''' + \sqrt{1-\eta_i'}\hat{a}_i^v \qquad \text{S39}$$

The average photon-number is then given as $$\langle \hat{N} \rangle = Tr[\eta_s' \hat{a}_s^{\dagger\prime\prime\prime}\hat{a}_s''' + \eta_i' \hat{a}_i^{\dagger\prime\prime\prime}\hat{a}_i'''] \qquad \text{S40}$$

Using Eqs. S28, S37, S38, S39, and S40, we can determine the loss-degraded total average photon-number for amplified squeezed quadrature ($\Delta\phi = \pi$) and amplified anti-squeezed quadrature ($\Delta\phi = 0$) as $$\langle N_\pm \rangle = \eta_s'[(\eta_s \sin h\, r_1 \cos h\, r_1 \cos h\, r_2 \pm \sqrt{\eta_i}\cos h\, r_1 \sin h\, r_2)^2 + (1-\eta_i)\sin h^2 r_2)] + \eta_i'[(\sqrt{\eta_i} \sin h\, r_1 \cos h\, r_2 \pm \sqrt{\eta_s}\cos h\, r_1 \sin h\, r_2)^2 + (1-\eta_s)\sin h^2 r_2]. \qquad \text{S41}$$

By comparing with the average photon-number $\langle N_v \rangle = (\eta_s' + \eta_i')\sin h^2 r_2$ of the amplified vacuum, we can calculate the measurable squeezing as $$S_\pm[\text{dB}] =$$  (S42)

$$10\log_{10}\left[\frac{\eta_s'\left[(\sqrt{\eta_s}\sinh r_1 \cosh r_2 \pm \sqrt{\eta_i}\cosh r_1 \sinh r_2)^2 + (1-\eta_i)\sinh^2 r_2\right]}{(\eta_s' + \eta_i')\sinh^2 r_2}\right.$$

$$\left.+ \frac{\eta_i'\left[(\sqrt{\eta_i}\sinh r_1 \cosh r_2 \pm \sqrt{\eta_s}\cosh r_1 \sinh r_2)^2 + (1-\eta_s)\sinh^2 r_2\right]}{(\eta_s' + \eta_i')\sinh^2 r_2}\right]$$

For $\eta_s = \eta_i = \eta$ and $n_s' = \eta_i' = \eta'$, Eq. S42 can be simplified to $$S_\pm[\text{dB}] = 10\log_{10}\left[\frac{\eta\sinh^2 r_\pm + (1-\eta)\sinh^2 r_2}{\sinh^2 r_2}\right]$$  (S43)

From Eq. S43, we can see that the measured squeezing only depends on losses on microscopic squeezed vacuum, i.e., losses before the high-gain amplification by the Measurement OPA. Therefore, our all-optical measurement offers tolerance against the off-chip coupling losses and detection inefficiencies. The high-gain amplification prior to off-chip coupling makes the originally squeezed quadrature sufficiently above than the vacuum noise, thereby making it robust against the vacuum contamination due to linear losses. For $e^{2r_2} \gg e^{2r_1}$, Eq. S43 turns out to be $$S_\pm[\text{dB}] = 10\log_{10}[\eta e^{\pm 2r_1} + (1-\eta)].$$  (S44)

Figure 10A:
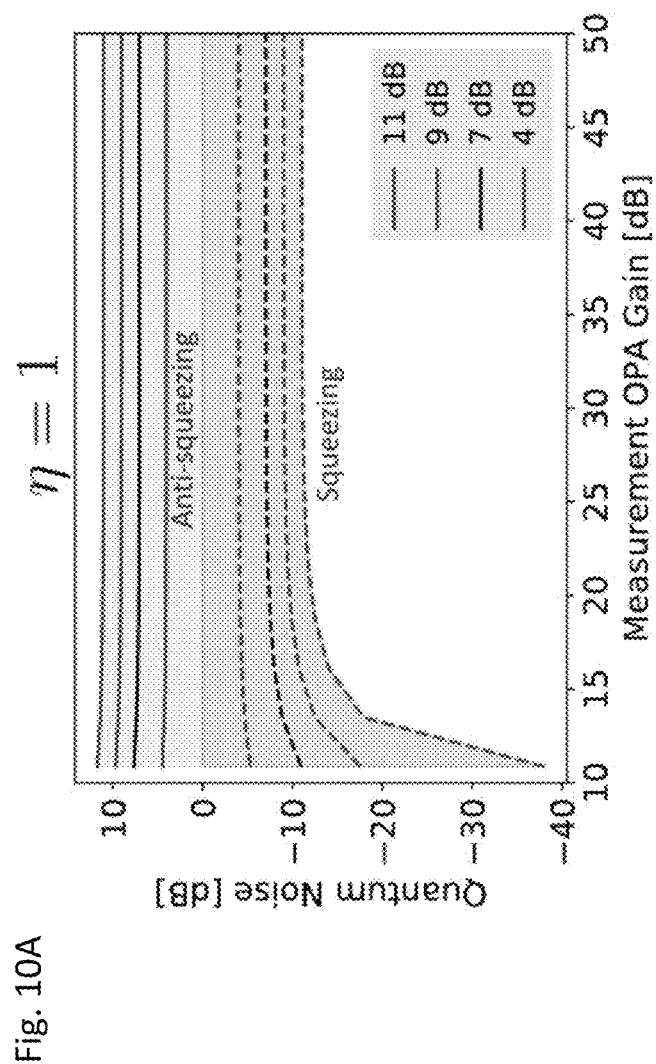
FIGS. 10A-10C: Required measurement amplifier gain for a given amount of squeezing. Measurement amplifier gain, (FIG. 11A) An ideal case without any experimental imperfections and (FIG. 11B), realistic case with L=0.30 optical losses experienced by the microscopic squeezed vacuum state.
Figure 10:
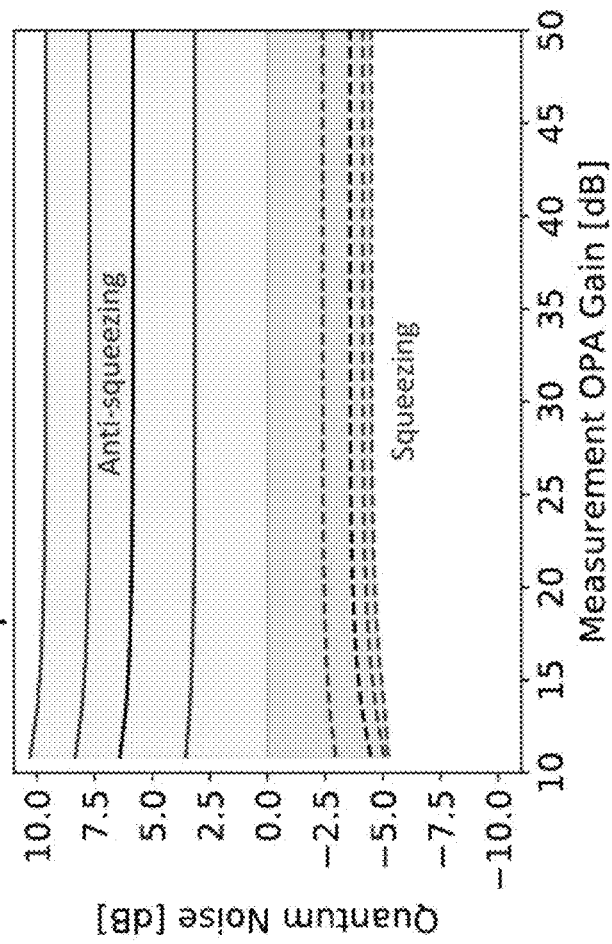

The first term in Eq. S44 amounts to reduced squeezing due to losses on squeezed vacuum and the second term is the contribution from the vacuum noise. The measured squeezing degrades with increasing amount of losses, $L=1-\eta$. However, the measured squeezing remains nonzero for $\eta>0$ and having higher initial squeezing is always advantageous no matter how much the loss is. FIG. 10A plots the required measurement amplifier gain for measuring several values of generated initial squeezing without any losses. We find that the larger amount of initial squeezing requires higher gain, and once the gain is sufficient (for instance >33 dB for ~11 dB squeezing), further increments in the gain do not have any significant effects on the measurements, as seen from the flat regions in FIGS. 10A and 10B. Sufficient gain ensures that the measured power is entirely dominated by the selected amplified quadrature and the attenuated quadrature can be considered negligible. Note that the measured anti-squeezing levels do not change as dramatically as squeezing when the Measurement OPA gain is varied. Since the anti-squeezed quadrature of microscopic squeezed field is already amplified by the Squeezer OPA, it then requires lower gain to dominate the measured power, as compared to the originally squeezed quadrature.

Figure 10C:
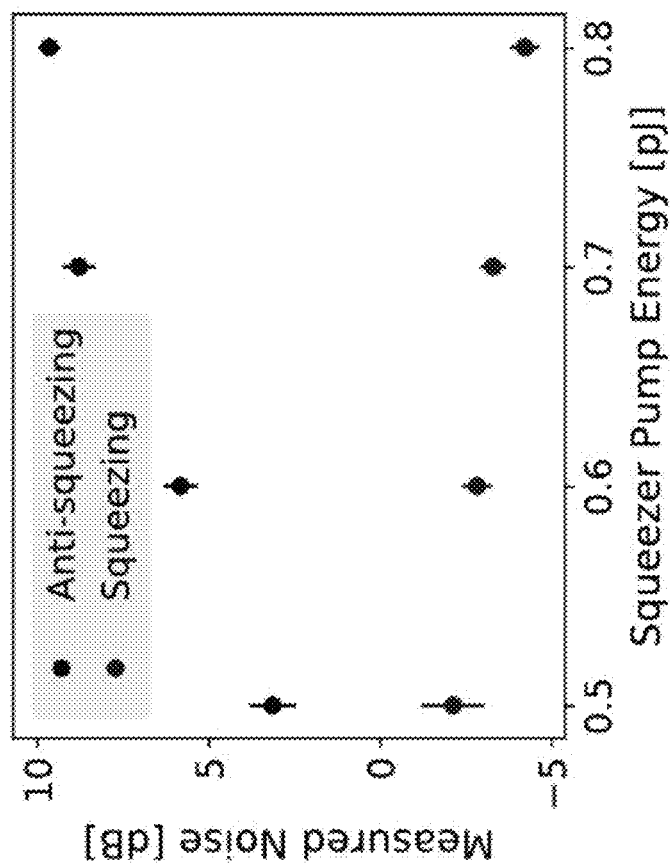
Figure 11:
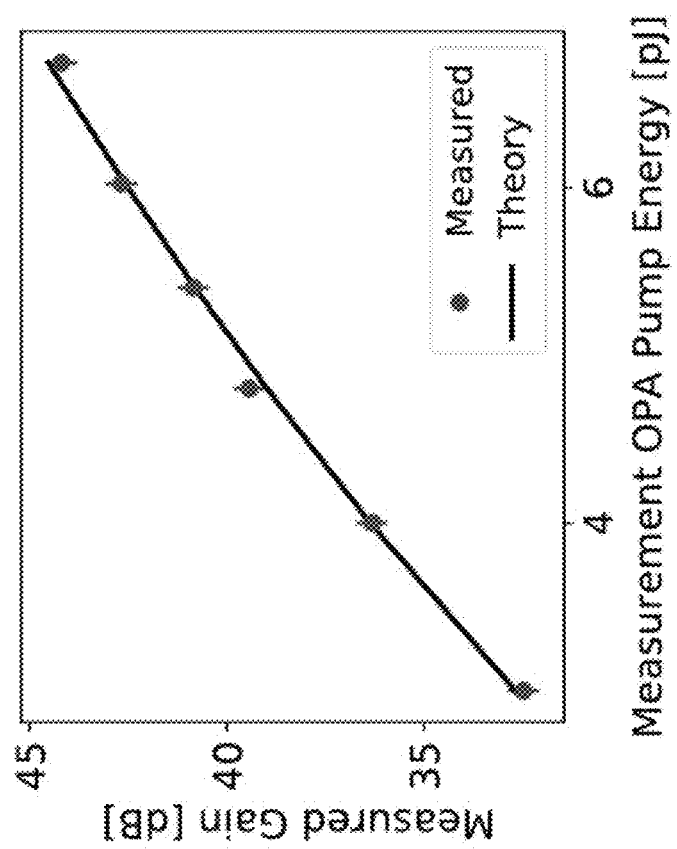
FIG. 11 Gain measurements for the Measurement amplifier at various values of pump energy. Error bars are obtained from the statistics of the measurements.

FIG. 10B shows the lossy case with the total losses of $L=1-\eta=0.30$ on microscopic squeezed signal. As expected, the measurable squeezing degrades significantly as compared to anti-squeezing in the presence of losses. FIG. 10C displays the experimentally measured (solid circles) squeezing and anti-squeezing at 2090 nm as the squeezer pump energy is varied. Our measured values agrees well with the expected amounts of squeezing and anti-squeezing levels in FIG. 10B. Finally, FIG. 11 shows the measured gain (red points) of the Measurement OPA as the pump pulse energy is increased. The black curve correspond to the expected exponential fit, which is in a good agreement with our measured gain.

FIG. 9B illustrates the generalized case. In the high-gain regime when $e^{2r_2} \gg e^{2r_1}$, Eq. S42 can be simplified to $$S_\pm[\text{dB}] = 10\log_{10}\left[\underbrace{\frac{1}{4}(\sqrt{\eta_s} + \sqrt{\eta_i})^2 e^{\pm 2r_i}}_{\text{Loss-degraded squeezing}} + \right.$$

$$\left.\underbrace{1 - \frac{\eta_s\eta_i' + \eta_i\eta_s'}{\eta_s' + \eta_i'}}_{\text{Added vacuum noise}} + \underbrace{\frac{1}{4}(\sqrt{\eta_s} - \sqrt{\eta_i})^2 e^{\mp 2r_2}}_{\text{Added noise due to asymmetric losses}}\right]$$  (S45)

In contrast to Eq. S44, Eq. S45 has an additional term proportional to $e^{\pm 2r_i}$ due to loss asymmetry in the signal and idler modes. Since this additional term mixes the anti-squeezing term $e^{2r_2}$ to the reduced squeezing term, $e^{2r_1}$, leading to a further reduction in the amount of measurable squeezing. In fact, the loss asymmetry is more detrimental at higher initial squeezing levels. Interestingly, for $\eta_s = \eta_i = \eta$, the measured squeezing is independent of $\eta_s'$ and $\eta_i'$ provided that the measurement amplifier has sufficient gain.

FIG. 12 displays the measured squeezing for a range of losses experienced by the signal and idler modes. The losses on signal and idler modes are $1-\eta_s$ and $1-\eta_i$, respectively. FIG. 12A considers the case where the off-chip coupling losses and detection efficiencies of signal and idler modes are equal, i.e., $n_s' = n_i'$ in FIG. S7. In this case, the measured squeezing levels are completely independent of $\eta_s'$ and $\eta_i'$, as seen from Eq. S45. We can see that the measured squeezing is optimal along the diagonal, i.e., for $\eta_s = \eta_i$, and it degrades quickly with increasing asymmetry in losses for signal and idler modes. In fact, the squeezing can be entirely suppressed as seen from the measured squeezing along the anti-diagonal in FIG. 12A. It is worth emphasizing that the loss asymmetry is even more detrimental at higher levels of initial squeezing due to the larger contribution from $e^{2r_1}$ term. In FIG. 12B, we consider unequal amount of losses for the signal and idler modes after the amplification. In particular, we choose $[\eta_s', \eta_i'] = [0.2, 0.5]$. Remarkably, the measured squeezing can be improved by carefully choosing $\eta_s'$ and $n_i'$ for a given amount of losses $\eta_s$ and $\eta_i$ on the squeezed vacuum state. This is evident in FIG. S9C which shows the difference of the cases "a" and "b". For $\eta_s > \eta_i$ in FIG. S9C, we have $\Delta S = S(\eta_s' = \eta_i') - S([\eta_s', \eta_i'] = [0.2, 0.5]) > 0$, thereby confirming $S([\eta_s', \eta_i'] = [0.2, 0.5]) > S(\eta_s' = \eta_i')$. Therefore, a careful selection of well calibrated losses on amplified squeezed vacuum allows one to restore the squeezing lost due to loss asymmetry in signal and idler modes. This is particularly beneficial for broadband squeezed signal where it is likely to have unequal amount of losses either due to spectral dependence of linear transmission rates or the detection efficiencies.

The overall detection efficiency is estimated, which includes the off-chip coupling efficiency and the detector efficiency, in our experimental setup. A detailed discussion is provided in (24); here we outline the essential steps. The measured average photonnumber from a vacuum-seeded OPA is given as $$\langle N \rangle_{measured} = \eta_1 \sin h^2 r$$  (S46)

where the gain parameter is: $r = 2L\sqrt{\eta_2 P}$ for a given pump power P and interaction length L. The overall detection efficiency is $\eta_1$, which includes the total optical losses due to coupling and imperfect detection experienced by the macroscopic OPG signal and $\eta_2$ quantifies the nonlinear interaction strength. In the high-gain regime, we have $\langle N \rangle_{measured}$ $$\sim \eta_1 e^{2L\sqrt{\eta_2 P}}/4.$$

We measured the macroscopic average photon-number generated from the Squeezer OPA for various levels of pump pulse energy. By fitting the data using Eq. S46, we extract the $\eta_1$ and $\eta_2$ parameters. We obtain the overall detection efficiency $\eta_1 \approx 0.20$, which agrees well with our previous estimations (24,42). The measured data and fit are shown in FIG. 2E of the main text.

Thus far we have considered the Measurement OPA to be an ideal OPA with the noise figure NF=0 dB, i.e., during the amplification process no additional noise is being added by the OPA. We now address the added noise by the Measurement OPA, characterizing the added excess noise using the phase-sensitive amplification efficiency, $\eta_{OPA}$ parameter, which combines all the imperfections such as losses and the phase noise during the amplification process (43). Since the imperfections in the Measurement OPA degrade the amount of measured squeezing, $\eta_{opa}$ can be treated as a linear loss channel, which brings in the vacuum noise, and can be modeled by a fictitious BS with transmission of $\eta_{opa}$. In this simplified model, the amplified quadrature is given by $$\hat{X} = \sqrt{G\eta_{OPA}} \hat{X}^{in} + \sqrt{G(1-\eta_{OPA})} \hat{X}_{OPA}^{v} \quad \text{S47}$$

where $\hat{X}_{OPA}^{v}$ is the quadrature operator for the added vacuum noise. We then include the losses due to off-chip coupling and detection inefficiencies after the amplification. As a result, the loss-degraded amplified field quadrature is $$\hat{X} = \sqrt{\eta_l}(\sqrt{G\eta_{OPA}} \hat{X}^{in} + \sqrt{G(1-\eta_{OPA})}) + \sqrt{(1-\eta_l)} \hat{X}_l^{v} \quad \text{S48}$$

where $\eta_l$ and $\eta_l^{v}$ correspond to the overall losses after amplification and the vacuum quadrature, respectively. From Eq. S48, one can define the effective quadrature measurement efficiency as $$\eta_{\mathit{eff}} = \frac{G\eta_{OPA}\eta_i}{G\eta_{OPA}\eta_i + G(1-\eta_{OPA})\eta_i + (1-\eta_i)} \quad \text{S49}$$

Figure 13:
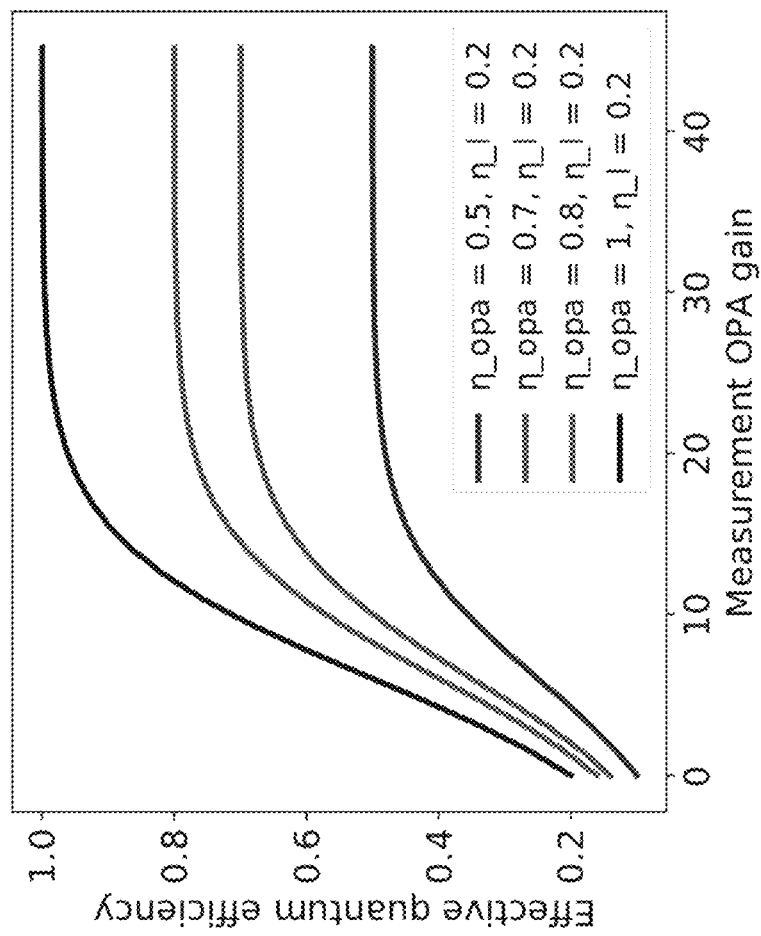
FIG. 13: Effective efficiency for various values of $\eta_{OPA}$ and $\eta_l$.

The limiting cases of the Measurement OPA gain is now considered. Firstly, when the Measurement OPA has no gain, i.e., G=1, the effective efficiency is $\eta_{\mathit{eff}} = \eta_{OPA}\eta_l$. In this case, the Measurement OPA acts as a linear loss channel with transmission $\eta_{OPA}$, resulting in the overall loss of $\eta$. Secondly, when G>>1 and $\eta_{OPA}\eta_l$, the effective detection efficiency of the quadrature measurement approaches the overall efficiency of the OPA, i.e., $\eta_{\mathit{eff}} \to \eta_{OPA}$. FIG. 13 considers the effective quantum efficiency of our all-optical measurement for many values of NFs of (0, 1, 1.5, 3)dB ($\eta_{OPA}=\{1, 0.8, 0.7, 0, 5\}$) at a given value for the overall detection efficiency of $\eta_l=0.2$ after the amplification. Here we chose $\eta_l=0.2$ because of our measured off-chip coupling efficiency. We find that the effective detection efficiency of all-optical measurement approaches to $\eta_{OPA}$ for a sufficiently large gain. FIG. 11 shows that the levels of gain were measured from our high-gain OPA.

Figure 14:
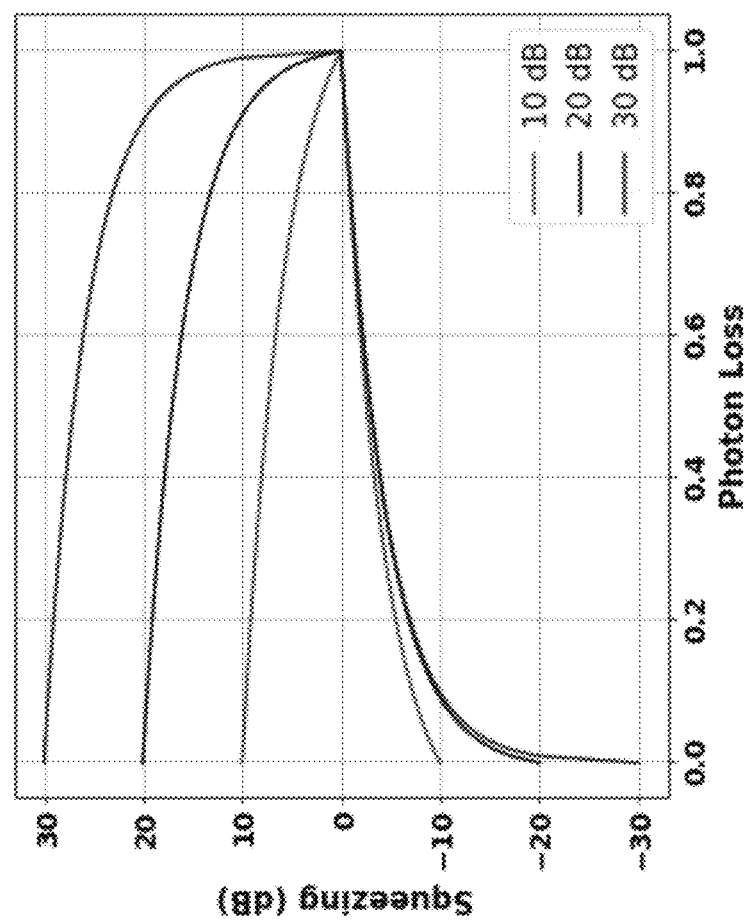
FIG. 14: Squeezing degradation with the photon loss.

As a result, we see the overall quantum efficiency of an all-optical measurement through a high-gain phase-sensitive OPA is ultimately determined by the NF of the OPA. While the measurement can be made tolerant against the losses after the high-gain amplification, the quantum efficiency is limited by the OPA NF and it is desirable to have NF→0, particularly beneficial for measuring highly squeezed states, which are extremely sensitive to photon losses. FIG. 14 plots how the squeezing and anti-squeezing degrade as the photon loss (L=1−$\eta_{\mathit{effective}}$) increases. It is seen that 30 dB (blue) of initial squeezing degrades by ~20 dB with 10% photon loss, while 10 dB (red) squeezing only degrades by ~3 dB.

6. Device Fabrication

The devices were fabricated using a wafer with 700-nm-thick X-cut MgO-doped LN (lithium niobate) on 2-μm thick $SiO_2$ from NANOLN. The fabrication process begins with periodically poling the chip. The poling electrodes (15 nmCr/55 nmAu) were patterned using e-beam lithography, e-beam evaporation and metal lift-off. Then ~300 V pulses were applied across the electrodes resulting in periodic domain inversion over the regions of 2.5 mm and 5.0 mm lengths for the Squeezer and Measurement OPAs, respectively. To account for fabrication imperfections, we varied the poling periods from 5.17 μm to 532 μm with a step size of 5 nm. The poling quality is inspected using second-harmonic microscopy, shown in FIG. 2A (iii). Next, the devices were patterned using e-beam lithography using hydrogen silsesquioxane (HSQ) as e-beam resist and 15 nm of Ti as an adhesion layer (24,44). The pattern was transferred to the LN layer by dry etching with $Ar^+$ plasma in an inductively-coupled plasma reactive-ion etcher (ICP-RIE). The remaining resists and side-wall re-deposition were removed by the buffered oxide etchant (BOE) and RCA cleaning. Finally, the waveguide facets were mechanically polished to improve the coupling efficiencies. The fabrication quality is inspected using SEM, example images are shown in FIG. 2A (i and ii).

7. Measurement of the Amplifier Gain

The parametric gain of the Measurement OPA with an auxiliary weak coherent signal generated by our 2 μm SPDOPO can be measured and optimized. The phase matching can be optimized by ensuring the maximum amplification/de-amplification experienced by the weak coherent pulse. To fine-tune the optimal phase matching, the chip temperature is tuned using a thermoelectric cooling (TEC) plate set underneath the chip, and by coating the chip with a thin layer of organic material.

Figure 15:
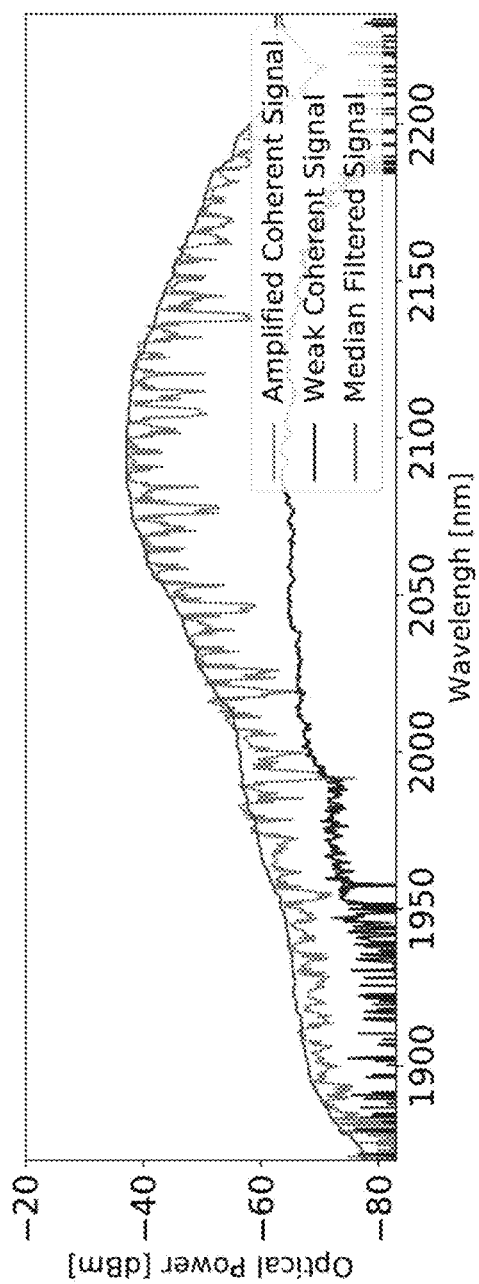
FIG. 15: Classical measurement of the Measurement OPA gain. The blue and gray traces are for weak input signal and amplified output signal, respectively. The red trace is processed amplified signal trace using a median filter. The ripples are due to phase-sensitive amplification.

FIG. 2F illustrates the experimental setup for OPA measurements, wherein pump 1 is for pumping the SPDOPO and its output signal is guided to the nanophotonic chip setup. After attenuating the OPO signal sufficiently, it is coupled to the measurement amplifier along with the Pump 2. FIG. 15 shows the measurements results. The blue trace shows the measured spectrum of input weak coherent signal (~1 fJ) and the gray trace corresponds to the amplified signal with Pump 2 pulse energy of ~6 pJ while the PZT is scanned using a ramp signal at 5 Hz. The ripples are due to phase-sensitive nature of the amplification process. For better visibility, a median filter is applied on the amplified signal trace, shown in red. The measured gain is >28 dB near 2090 nm, which is comparable to the work in (24).

8. Squeezing in Nanophotonics

Figure 16:
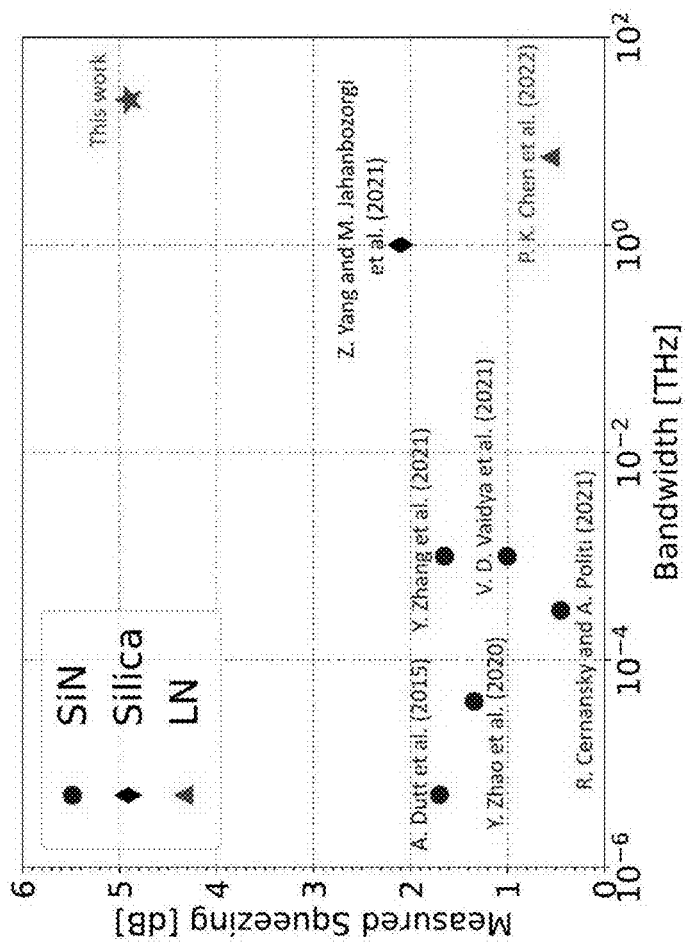
FIG. 16: Performance comparison of measured squeezing levels and squeezing bandwidths on various nanophotonic platforms.

FIG. 16 compares the measured squeezing and bandwidth with state-of-the-art demonstrations in nanophotonic platforms including SiN and silica. These experimental demonstrations utilize relatively weaker $\chi^{(3)}$ (ononlinearities and require microresonators for enhancement. Additionally, the squeezed light is typically detected using off-chip BHDs which impose limitations on the measured squeezing (due to off-chip coupling losses) and the accessible squeezing bandwidths. Our measured squeezing substantially surpasses these other works both in the magnitude and bandwidth.

Table S1 shows the references for the squeezing demonstrations in nanophotonics shown in FIG. 16.

TABLE S1 demonstrations in nanophotonics squeezing.

| Squeezing (inferred) [dB] | Platform | Bandwidth | Reference |
|---|---|---|---|
| 1.7(5) | SiN | 5 MHz | A. Dutt et al. (45) |
| 1.0(4) | SiN | 1 GHz | V. D. Vaidya et al. (11) |
| 1.34(3) | SiN | 40 MHz | Y. Zhao et al. (46) |
| 1.65(8) | SiN | 1 GHz | Y. Zhang et al. (47) |
| 0.45(1) | SiN | 300 MHz | R. Cernansky and A. Politi (48) |
| 1.6(3.1) | Silica | 1 THz | Z. Yang and M. Jahanbozorgi et al. (49) |
| 0.56(3) | LN | THz | P. K. Chen et al. (16) |
| 4.9(11) | LN | 25 THz | This work |

9. Ultrafast Quantum Information Processors Using Second Order Nonlinearity Nanophotonics The importance of our ultra-short-pulse source of a squeezed state and its all-optical measurement scheme for CV ultra-fast quantum information processing should be highlighted. Single-mode and two-mode squeezed vacuum states are used as the main building block for generating highly entangled large-scale cluster states, which serve as the quantum computing "substrate" for measurement-based quantum computing (MBQC) and have been generated using both time- and frequency-multiplexed architectures (6-8).

In time-multiplexed schemes, continuously generated squeezed vacuum states from continuous wave (CW) pumped optical parametric oscillator (OPOs) are divided into independent time bins, which are then entangled with each other using optical delays and linear optics to generate the large-scale cluster states (6,7). In such a configuration, the repetition rate of the time bins is limited by the bandwidth of the squeezer OPO, which is typically <100 MHz, resulting in few tens of nanosecond-scale temporal bins (~10 meters long). Consequently, to entangle thousands of these temporal modes, kilometer-scale optical delays are required, which are so far implemented with optical fibers in table-top experiments (6,7) and are not suitable for on-chip integration. For these reasons, it is advantageous to shorten the lengths of these time bins and consequently the optical delays, which can be achieved by using ultra-short-pulse squeezed states (spanning over THz of bandwidths). This allows the definition of femtosecondscale temporal bins, and one can entangle thousands of time bins with optical delays of few tens of centimeter-scale, which are amenable to on-chip integration.

Our demonstrated squeezing bandwidth of >25 THz and temporal confinement of few optical cycles is an important step towards realizing such large-scale cluster states in rapidly advancing LN nanophotonics. In MBQC with CV cluster states, quantum computation is typically performed with homodyne measurements and gate teleportation, which also requires homodyne measurements for feed-forward operations. Consequently, the electronic bandwidths of the homodyne detectors limit the clock rate of the quantum computation. Our high-gain OPAs can be used to perform all-optical loss-tolerant measurements and gate teleportation (50), thereby enabling ultrafast MBQC with CV cluster states.

9.1 Generation and all-Optical Measurements of Cluster States

Figure 17:
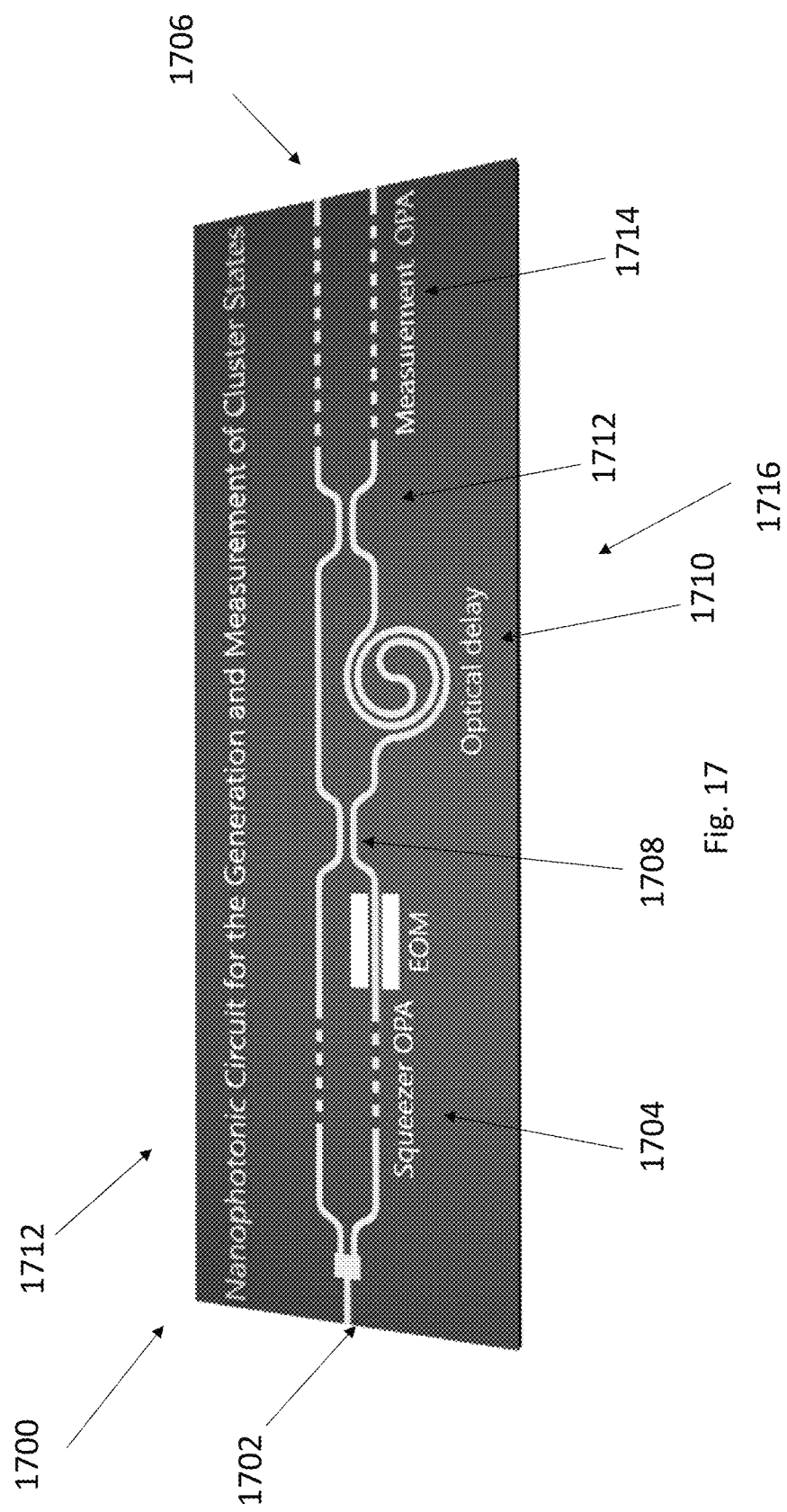
FIG. 17: Example circuit for a time-multiplexed scheme for generating and measuring CV cluster states. EOM: Electro-optic modulator; OPA: Optical Parametric Amplifier.

A quantum circuit to generate iD cluster states is depicted in FIG. 17. Squeezed states produced by the squeezer OPAs are time-multiplexed utilizing linear optics and on-chip optical delays. High-gain OPAs are then used to perform all-optical loss-tolerant quadrature measurements for computation and verifying the entanglement structure.

9.2 Non-Gaussian Quantum State Engineering

Figure 18:
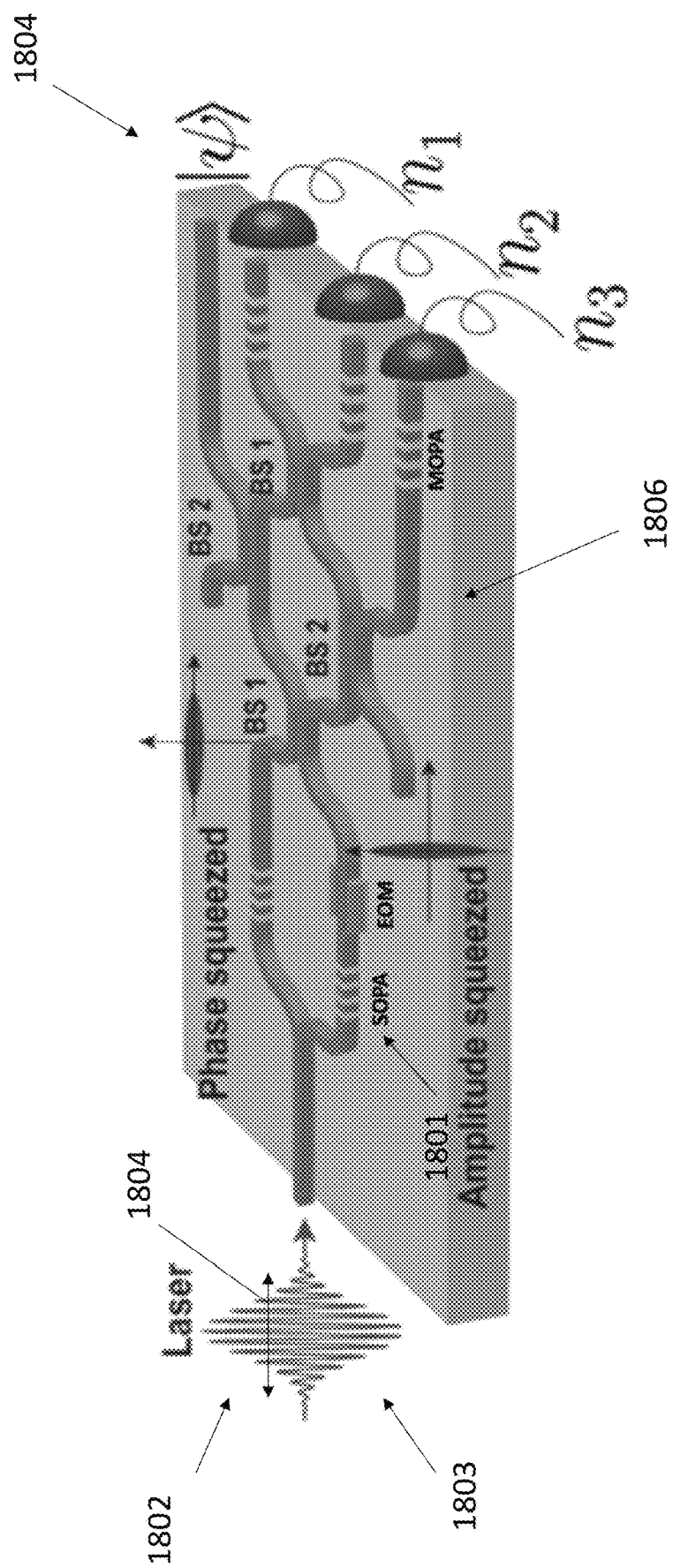
FIG. 18: Example Nanophotonic circuit to generate quantum error-correcting codes.

FIG. 18 shows a nanophotonic circuit for generating various non-Gaussian states (e.g., Binomial codes, truncated cat codes, GKP codes) using OPAs and OPA-assisted PNR measurements. A two-mode squeezed vacuum (TMSV) state is generated by combining two orthogonal singlemode squeezed vacuum (SMSV) states at the first balanced beamsplitter (BS1). The TMSV state is then fed into an interferometer, followed by high-gain OPAs and PNR measurements. By tuning the interferometer and post-selecting on specific PNR measurement outcomes, one can probabilistically produce the aforementioned non-Gaussian states.

9.3 On-Chip Quantum-Enhanced Distributed Sensors

Figure 19:
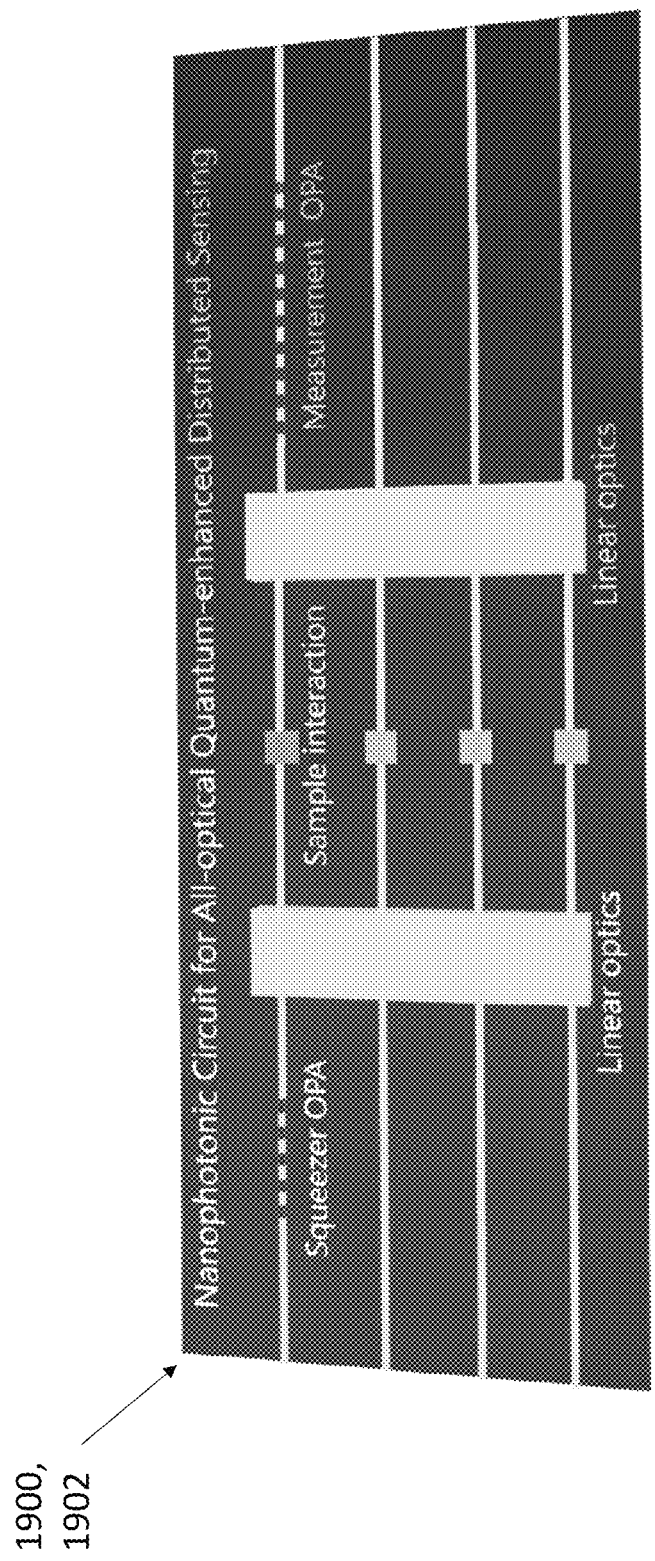
FIG. 19: All-optical quantum-enhanced distributed sensor on a nanophotonic chip. Linear optics represents a network of programmable interferometers.

FIG. 19 illustrates a nanophotonic circuit using a squeezer OPA and linear optical circuit to distribute quantum entanglement over four modes that interact with samples being characterized. After the sample interaction, all modes are combined with a linear optical circuit and measured with a high-gain measurement OPA.

10. Single Photon Detection Using Nanophotonic Parametric Amplifiers

An OPA in the high-gain regime can be used as a room temperature "click" detector for single-photon level quantum fields. As shown in FIG. 20, a weak quantum field described by the density matrix, p is amplified by an OPA (pump is not shown). After the amplification, the macroscopic average photon-number, $\langle N \rangle = Tr[\hat{N}\hat{U}(r_1)\rho\hat{U}^\dagger(r_1)]$ can be measured with a conventional photodiode. In FIGS. 20b and c, the photon-number distributions of the amplified vacuum state and single-photon are shown when the OPA gain is 20 dB. It is seen that due to the high-gain amplification the photon-number distributions for vacuum and single-photon state overlap, which increases their distinction's ambiguity. However, it can be resolved by thresholding the classical photodetector at a certain photon number. For example, in FIGS. 20b and c, the threshold is set to a photon number of 120. This means that for the input vacuum state, the total probability of having >120 photons (double-sided red arrow in FIG. 20b) in an amplified vacuum is essentially the dark-count probability, which turns out to be $P_d$=0.02. Likewise, the single-photon detection efficiency is determined by the total probability of having >120 photons (double-sided red arrow in FIG. 20c) in amplified single-photon Fock state. As a result, the method allows one to detect a single photon with the quantum efficiency of $\eta$~0.20 and dark-count probability of $P_d$=0.02.

Figure 21A:
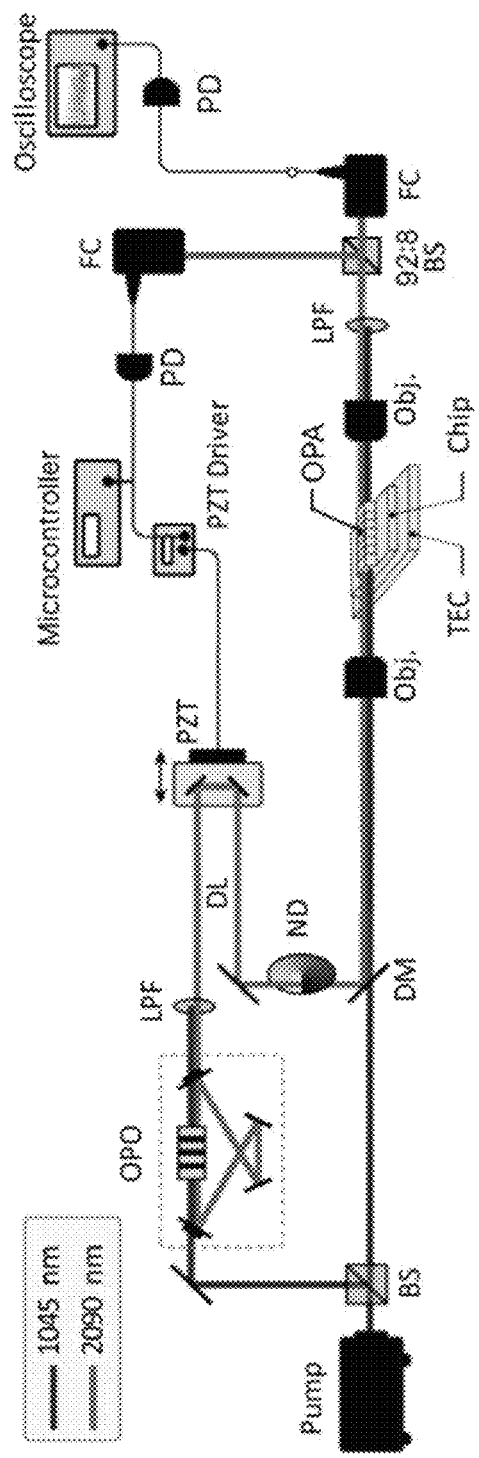
FIGS. 21A-21B: Measurement of single-photon level fields.
Figure 21B:
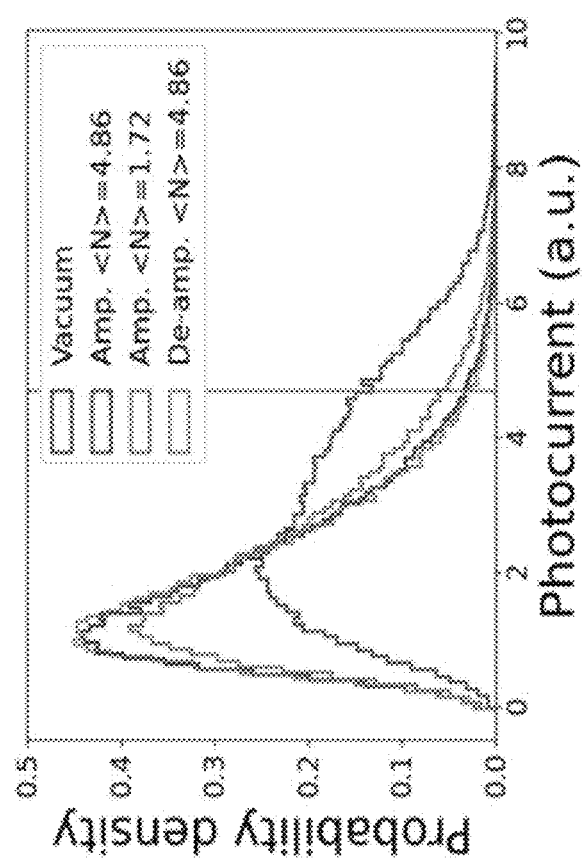

The experimental setup is depicted in FIG. 21A. The OPA is a 5-mm long periodically poled thin-film LN waveguide on a chip placed on a thermal controller for fine-tuning the phase matching. A Menlo Systems Orange mode-locked laser is used to pump the OPA and the table-top optical parametric oscillator (OPO), providing the 2 μm coherent signal. We attenuated the OPO signal to single-photon level fields. To determine the amplitude of the signal field inside the chip, we measured the output signal with the pump off using a superconducting nanowire single photon detector from ID Quantique optimized for 2 µm photons. The pump's off-chip average power was 145 mW for all measurements, which led to a measured gain of over 60 dB. Since coherent states are phase-sensitive, the amplified quadrature varies with the relative phase of the pump and signal fields. We modulated the phase with a piezoelectrically driven delay stage on the signal's path and locked it using an active feedback system (See Section 1 for more details). We used a variable attenuator to adjust the amplitude of the signal field. We measured the output signal by rejecting the pump using a long-pass filter and then coupling it into a single-mode fiber connected to an extended InGaAs photodetector with a bandwidth of 18 GHz FIG. 21B shows the measurement results. The photocurrent is proportional to the square of the amplified quadrature value, and the photon number ($1 \propto X_\phi^2 \propto N$). As expected, the distributions of amplified $\langle N \rangle =1.72$ and 4.86 are distinct from each other and amplified vacuum. In addition, the de-amplified $\langle N \rangle =4.86$ state distribution is almost identical to vacuum, indicating locking to de-amplification of the coherent state. We then implement a threshold on the detector photocurrent, which leads to a dark count probability of 2.5%, shown as a gray line in FIG. 21B. This threshold leads to a detection efficiency of coherent states with $\langle N \rangle =4.86$ of 17% and those with $\langle N \rangle =1.72$ of 5.2%.

Figure 22:
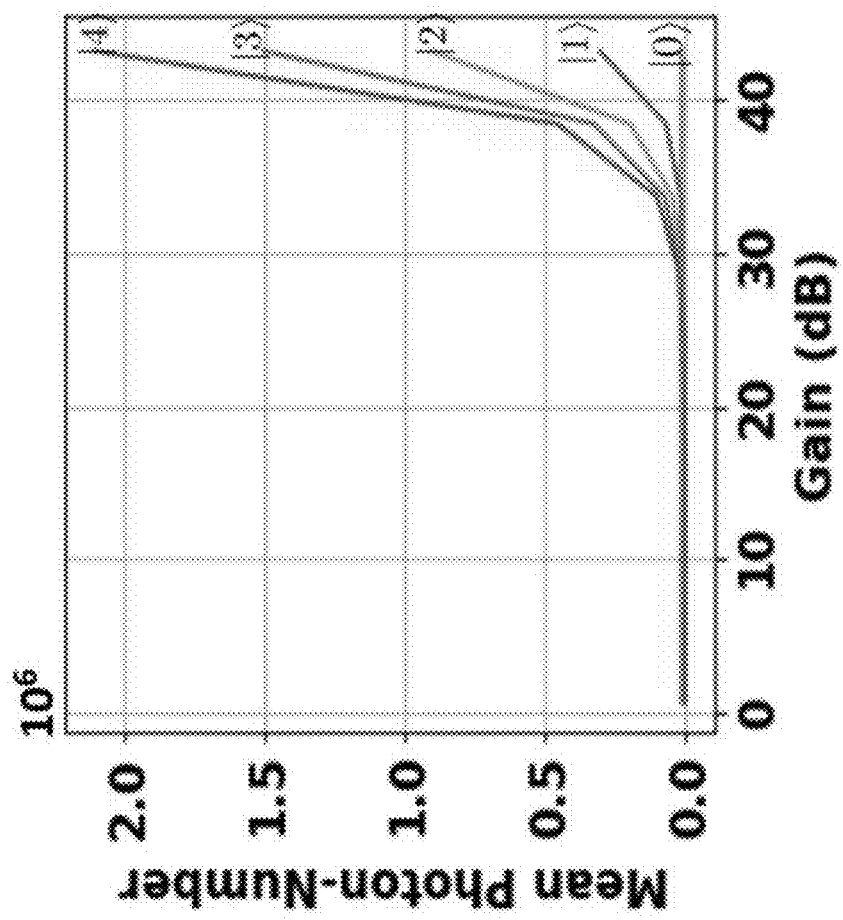
FIG. 22: The mean photon number of several amplified Fock states versus the amplification gain.

FIG. 22 shows photon-number-resolving (PNR) measurements for low photon-number Fock states. FIG. 22 plots the mean-photon number of amplified Fock states with photon-number $n \in [0,4]$ for various values of OPA gain. It is seen that the mean photonnumber $N=(n+1)\sin h^2 (r)+n \cos h^2 (r)$ grows with the OPA gain and at >40 dB gain the mean photon-number is $\mathcal{O}(10^5)$, which can be detected by a butt-coupled conventional photodiode. Furthermore, the mean-photon number is well separated for different Fock states, which provides photon number resolution (PNR) for ensemble measurements with lower quantum efficiencies.

11. Loss-Tolerant Quantum State Tomography

Figure 23A:
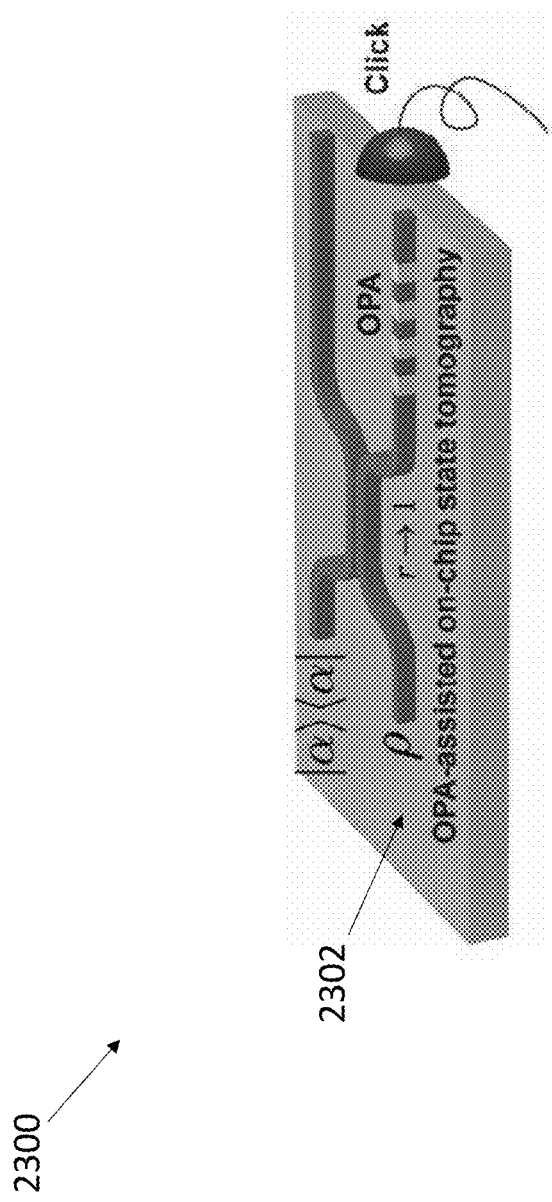
FIGS. 23A-23D: OPA assisted loss-tolerant quantum state tomography.
Figure 23C:
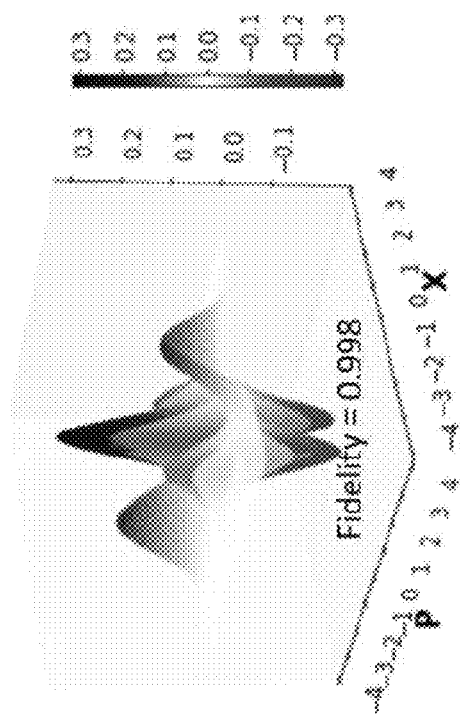
Figure 24:
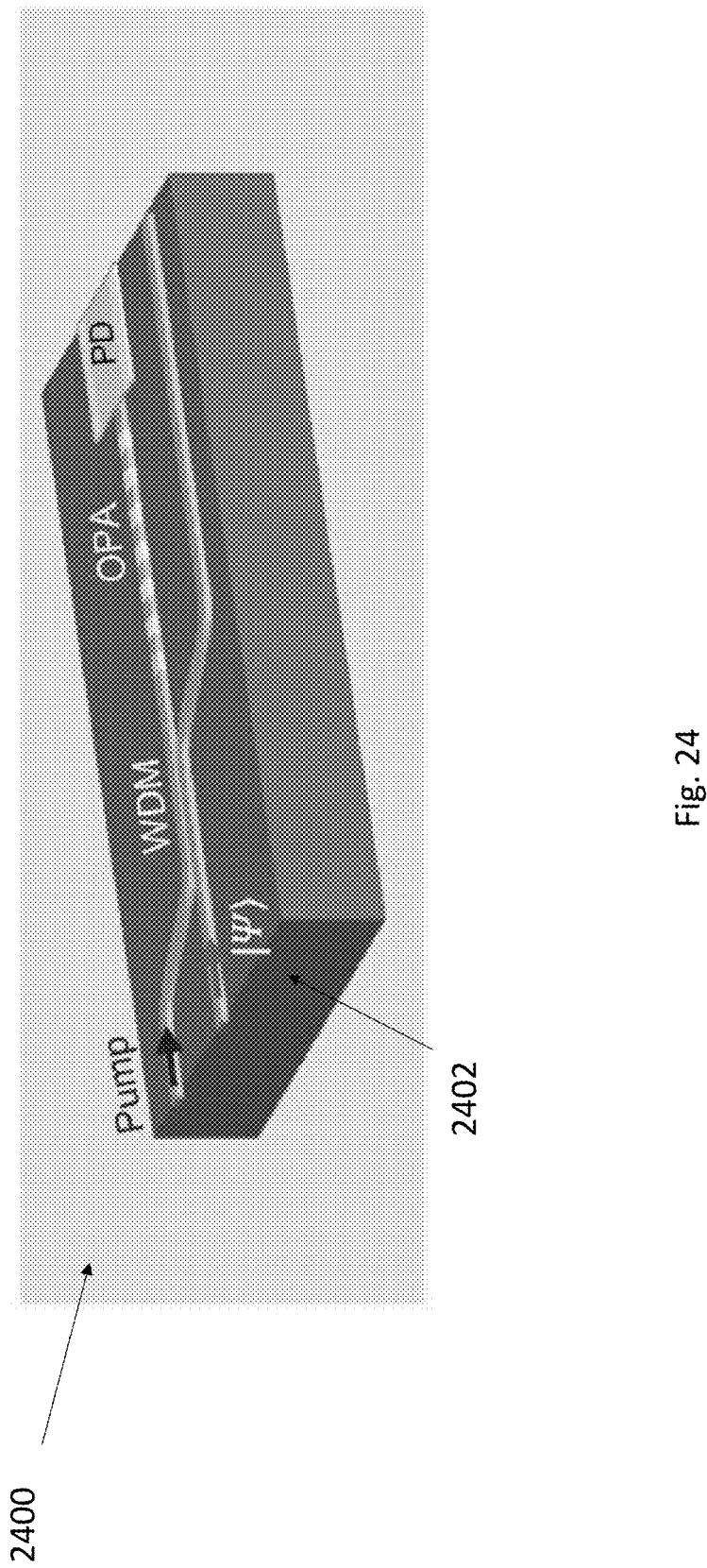
FIG. 24: Illustration of the experimental scheme for sign-free quadrature measurement. The unknown quantum state, $\rho_{in}=|\psi\rangle\langle\Psi|$ is first amplified with a high gain OPA. A quadrature power measurement is performed on the amplified state with a photodiode (PD), thereby offering a direct detection of the squared value of the quadrature, rotated according to the phase of the pump.

FIGS. 23a and 24 illustrate OPA-assisted loss-tolerant quantum state tomography (QST) schemes suitable in nanophotonic platforms. The first scheme is displayed in FIG. 23A. The unknown quantum state p experiences a displacement operation implemented with a strong coherent state, $|\alpha\rangle\langle\alpha|$ and a highly unbalanced beamsplitter, i.e., $r \to 1$) followed by an amplification before coupling-out from the nanophotonic chip. The amplified state gets detected by a threshold detector, which registers a "no-click" event with a probability of $$P(\text{"no-click"})=Tr[\hat{U}_{OPA}\hat{D}(\alpha)\rho\hat{D}^\dagger(\alpha)\hat{U}_{OPA}^\dagger\Pi_0],$$

where $\Pi_0=|0\rangle\langle 0|$ is the positive-operator-valued measures (POVM) for the "no-click" detector outcome. By taking sufficient measurements for a set of coherent states and fixed OPA gain, Eq. S50 can be inverted using numerically efficient semi-definite programming under the physicality constraints. Note that the proposed scheme is particularly beneficial for on-chip platforms where accurate calibration of losses for loss-compensation in tomography method is usually challenging.

Figure 23B:
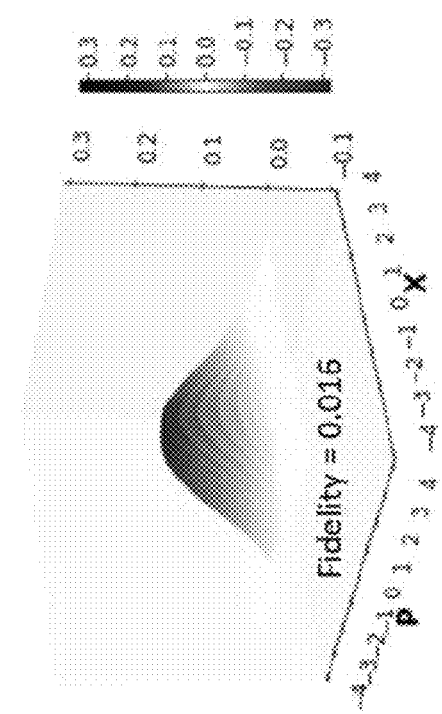
Figure 23D:
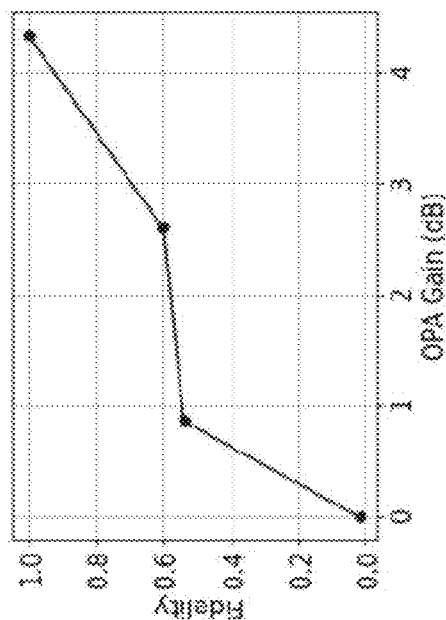

FIGS. 23b and c consider reconstructing a cat state using our proposed scheme with a "click" detector of quantum efficiency $\eta=0.10$. When the OPA gain, G=0, the reconstructed Wigner function does not retain its features, such as phase space interference fringes and negativity. The reconstruction fidelity is F=0.016. When the OPA gain is 5 dB, the fidelity is near unity, and the Wigner function retains all of its features. As a result, the proposed scheme is tolerant to losses as high as $L=1-\eta 9=0.90$.

FIG. 24 illustrates a second QST scheme through sign-free quadrature measurements acquired using high-gain OPA. The scheme consists of a WDM combining the pump and the unknown quantum state fields into the high-gain OPA. The pump and the unknown state modes are denoted by the photon annihilation operators $\hat{a}_s^{in}$ and $\hat{b}_p^{in}$, respectively.

In the Heisenberg picture, the evolution of the signal mode is given by the Bogoliubov transformation given as $$\hat{a} \to \hat{a}_s^{in} \cos h\, r + e^{i\phi}\hat{a}_s^{in\dagger} \sin h\, r,$$

where $\phi$ and r correspond to the amplification phase and OPA gain parameter with gain $G=e^{2r}$, respectively. Likewise, one can calculate the photon-number operator $$\hat{N}=\hat{a}^{\dagger\hat{a}=c}{}_1(\hat{a}^2 e^{-i\phi}+\hat{a}^{\dagger 2}e^{i\phi})+c_2\hat{a}^\dagger\hat{a}+c_3,$$

where we define $c_1=\sin h\, r \cos h\, r$, $c_2=\cos h^2\, r+\sin h^2\, r$, and $c_3=\sinh^2 r$.

In the high-gain regime, we have $\hat{N} \to e^r \hat{x}_\phi^2$. As a result, a quadrature power measurement with a photodiode performed on the amplified state allows one to directly measure the squaredquadrature operators, which is equivalent to measuring the absolute value or the squared value of a quadrature $\hat{x}_\phi$ up to efficient classical post-processing of the measurement outcomes. The measurement POVM is $$\hat{\Pi}_\phi = \frac{1}{2}[|x_\phi\rangle\langle x_\phi| + |-x_\phi\rangle\langle -x_\phi|].$$

The probability of a certain quadrature value is given by the Born rule $$P(|x_\phi|)=Tr[\hat{\Pi}_\phi \rho],$$

Rewriting the unknown quantum state in Eq. (S54) in the photon-number basis, we get $$P(|x_\phi|) = Tr\left[\hat{\Pi}_\phi \sum_{l,l'}^{l_{max}} c_{l,l'}|l\rangle\langle l'|\right],$$

where $l_{max}$ is the finite-size truncation of the Fock space.

Further simplification leads to $$P(|x_\phi|) = Tr\left[\frac{1}{2}[(|x_\phi\rangle\langle x_\phi| + |-x_\phi\rangle\langle -x_\phi|)\sum_{l,l'}^{l_{max}} c_{l,l'}|l\rangle\langle l'|]\right]$$

$$= \frac{1}{2}\sum_{l,l'}^{l_{max}} c_{l,l'}(\langle l'|x_\phi\rangle\langle x_\phi|l\rangle + \langle l'|-x_\phi\rangle\langle -x_\phi|l\rangle)$$

$$= \frac{1}{2}\sum_{l,l'}^{l_{max}} c_{l,l'}[H_l(x_\phi)H_{l'}^*(x_\phi) + H_l(-x_\phi)H_{l'}^*(-x_\phi)]$$

$$= \sum_{l,l'}^{l_{max}} c_{l,l'}\Pi^{l',l}(x_\phi)$$

where we define $\Pi^{l',l}(x_\phi):=H_l(x_\phi)H_{l'}^*(x_\phi)+H_l(-x_\phi)H_{l'}^*(-x_\phi)$. We have used the Fock space representation of the generalized quadrature eigenstate given as $$|x_\varphi\rangle = \frac{e^{-x_\varphi^2}}{\pi^{1/4}} \sum_{n=0} c_{n,\varphi} |n\rangle,$$

where $c_{n,\varphi} = e^{in\varphi} H_n(x_\varphi)/\sqrt{2^n n!}$ and $H_n(x_\varphi)$ is the Hermite polynomial of degree n. We then set the following SDP to invert Eq. S56 for reconstructing the unknown quantum state, ρ.

$$\underset{M}{\text{Minimize}} \|P - \Pi M\|_2$$

Figure 25B:
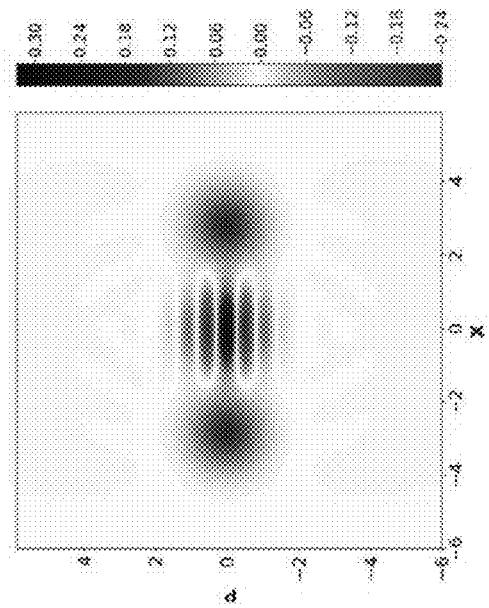
FIGS. 25A-25B: Tomographic reconstruction of the parity-symmetric states.
Figure 25A:
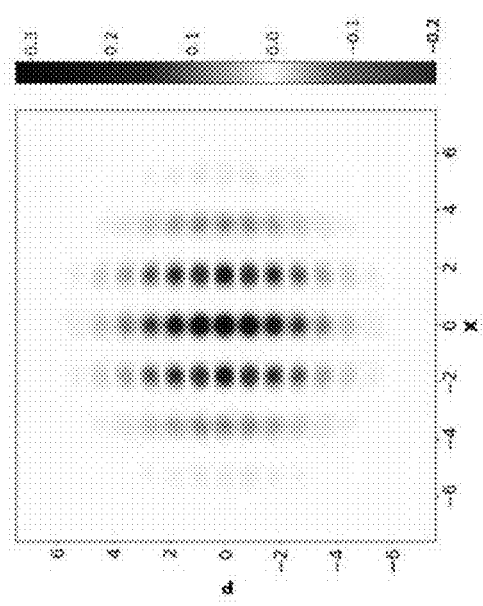

Subject to ρ≥0 and Tr [ρ]=1,
where M corresponds to the Liouville vector representation of the unknown quantum state ρ, and $\|\Psi\|_2$ denotes the $l_2$ norm defined as $\|V\|_2 = \sqrt{\Sigma_i |v_i|^2}$. The (mixed) quantum states that our method allows reconstructing are parity-symmetric, i.e., those states satisfying $\hat{\Pi} \rho \hat{\Pi}^\dagger = \rho$, where $\hat{\Pi} = (-1)^{\hat{N}}$ is the photon-number parity operator. Equivalently, these are the states satisfying $\rho = \Sigma_{k=l \bmod 2} \rho_{kl} |k\rangle\langle l|$, i.e., $\langle k|\rho|l\rangle = 0$ if k and l have different parities. To test the efficacy of our scheme, we perform the QST of Gottesman-Kitaev-Preskill state and cat statesboth of which are the leading candidates for bosonic quantum error correction. We uniformly sample the quadratures phases $\phi \in [0, \pi]$ in 60 steps. In FIG. 25, we show the reconstructed Wigner functions with fidelity ~1 with the ideal states.

Process Steps
a. Method of Fabrications and Device

Figure 26:
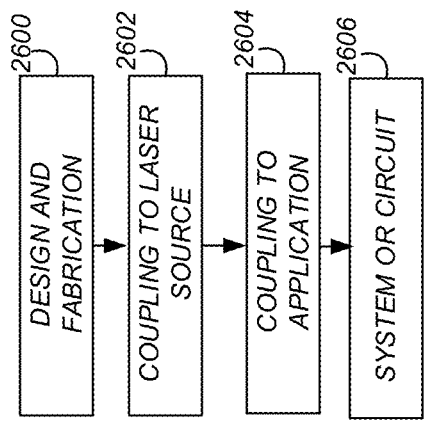
FIG. 26 is a flowchart illustrating a method of making a photonic integrated circuit and/or a system including the photonic integrated circuit.

FIG. 26 is a flowchart illustrating a method of fabricating a photonic integrated circuit, comprising the following steps.

Block 2600 represents designing and fabricating (e.g., photolithographically patterning) one or more waveguides comprising a second order non-linearity (e.g., $\chi^{(2)}$) configured to operate on classical and/or quantum optical pulses each having a pulse length shorter than 1000 optical cycles, as measured at their full width at half maximum of their classical field values or their quantum wave functions. The waveguides are designed to generate one or more quantum states carried by one or more of the optical pulses, manipulate one or more of the quantum states, or measure one or more of the quantum states.

In one or more examples, the waveguides each have a width and height of less than 5 micrometers. In one or more examples, the design and fabrication comprised phase matching and/or dispersion engineering the waveguides for nonlinear interactions of the optical pulses having a bandwidth in a range of 0.1-100 Terahertz.

In typical examples, the waveguides comprise a waveguide converting an input pump pulse into a signal pulse and/or idler pulse according to a second order parametric interaction/amplification process using the second order nonlinearity. In these examples, the dispersion engineering comprises selecting dimensions such as a length of the waveguide minimizing group velocity mismatch (GVM) between pump and signal pulses so as to provide temporal overlap of the pump and signal pulses. In one or more examples, the, waveguides have the length in a range of 10 microns to 1 mm so that GVM difference is less than 1%.

Example materials having the second order nonlinearity include, but are not limited to, lithium niobate, lithium tantalate, Potassium Titanyl Phosphate (KTP), aluminum nitride, gallium arsenide, indium phosphide, aluminum gallium arsenide, GaP, or InGaP.

In one or more examples, the (e.g., nonlinear) material is patterned on a substrate to form a waveguides configured in the photonic integrated circuit. In one or more examples, the substrate comprises lithium niobate on silicon dioxide, and the waveguides are patterned in the lithium niobate (e.g., monolithic integration of the waveguides).

Block 2602 represents optionally coupling one or more sources of electromagnetic radiation (e.g., a laser, optical parametric generator, amplifier or oscillator, or laser system) outputting/providing the optical pulses comprising input optical pulses to the photonic integrated circuit.

Block 2604 represents optionally coupling, or configuring, the circuit to/for an application (e.g., as a processor, or sensor) in e.g., a quantum computing or sensing application.

Block 2606 represents the end result, a photonic integrated circuit or system or chip comprising the photonic integrated circuit. Examples include, but are not limited to, the following.

1. FIGS. 1, 17, 18, 19, 23, and 24 illustrate an photonic integrated circuit 100, 1700, 1800, 1900, 2300, 2400 comprising:

one or more waveguides 102, 1801, 1702 comprising a second order non-linearity (e.g., $\chi^{(2)}$)configured to operate on classical and/or quantum optical pulses 1802 each having a pulse length 1804 shorter than 1000 optical cycles, as measured at their full width at half maximum of their classical field values (e.g., electric field, magnetic field, or electromagnetic field values) or their quantum wave functions, so as to at least:

generate one or more quantum states 104, 104a, 104b, 1804 carried by one or more of the optical pulses,
manipulate one or more of the quantum states, or
measure one or more of the quantum states.

2. The circuit of example 1, wherein the waveguides each have a width W and height H of less than 5 micrometers and/or the waveguides have a phase matching and/or dispersion engineering for nonlinear interactions of the optical pulses having a bandwidth in a range of 0.1-100 Terahertz (e.g., as illustrated in FIG. 7)

3. FIGS. 1D, 17, 18, 19, 23, and 24 illustrates examples of the circuit of example 1 or 2, wherein:

the one or more waveguides comprise an optical parametric amplifier and/or
the circuit comprises an optical parametric oscillator comprising one of the waveguides,
and the OPAs or OPOs generate the quantum states comprising signal and/or idler pulses in response to a pump pulse using a second order parametric process.

4. FIG. 1D illustrates an example of the circuit of any of the examples 1-3, wherein the quantum states comprise Gaussian states 104 comprising one or more squeezed vacuum states having one or more modes.

5. FIG. 1D illustrates an example of the circuit of example 4, wherein the waveguides comprise at least:

an optical parametric amplifier (squeezer OPA in FIG. 1D) comprising a phase-matching and a dispersion engineering for a second order parametric amplification process involving a first pump pulse (pump 1 in FIG. 1D) and a signal vacuum field, wherein the second order parametric amplification process amplifies the signal vacuum field in a first quadrature 105 and attenuates the signal vacuum field in a second quadrature orthogonal to the first quadrature, thereby generating one or more signal pulses carrying a first one of the quantum states comprising a squeezed vacuum state 104a.

6. FIG. 1D further illustrates an example of the circuit of example 5, wherein at least one of an intensity of the first pump pulse (pump 1), the phase matching, the dispersion engineering, or a length L of the optical parametric amplifier are tailored for the second order parametric amplification process comprising non-degenerate parametric amplification so that the signal pulses, carrying the squeezed vacuum state 104a, comprise at least two modes.

7. FIG. 1D further illustrates an example of the circuit of example 5 or 6, wherein the circuit further comprises a second OPA (measurement OPA in FIG. 1D) having at least one of a second phase matching, a second dispersion engineering, or a second length L tailored for an additional second order nonlinear interaction involving a second pump pulse (pump 2 in FIG. 1D) and the signal pulses comprising the first one of the quantum states, wherein the second pump pulse can have a phase difference relative to the first pump pulse and an intensity so that the additional second order nonlinear interaction comprises the parametric amplification (e.g., in a linear (non-saturated) regime) amplifying one of the quadratures 105 of the first one of the quantum states 104a, so as to form a second quantum state 104b in the macroscopic regime, in which the average number of photons for the state is larger than 10 but less than 10^9, and e.g., thereby enabling a loss-tolerant (de-coherence tolerant) quantum measurement of the first one of the quantum states. In one or more examples, a coupler 106 (as illustrated in FIG. 1D) may be provided between the first OPA and the second OPA for coupling the first one of the quantum states 104a to the second OPA.

8. FIG. 18 illustrates an example of the circuit of any of the examples 1-3, wherein the quantum states comprise 1804 non-Gaussian states comprising one or more cat states, one or more Gottesman-Kitaev-Preskill (GKP) states, or one or more photon pair states.

9. FIG. 18 illustrates an example of the circuit of any of the examples 1-8, wherein the circuit comprises a modulator (e.g., EOM in FIG. 18) driven by a driving signal allowing control of a phase or an intensity of the optical pulses comprising one or more pump pulses or one or more quantum state pulses.

10. FIG. 18 illustrates an example of the circuit of any of the examples 1-3 or 9, wherein:
the circuit 1800 comprises one or more optical parametric amplifiers (e.g., SOPA in FIG. 18) having a phase matching, dispersion engineering, and length L tailored for a second order parametric interaction involving a pump pulse 1803, having the pulse length 1804, and a vacuum field, and
the second order nonlinear interaction comprises a parametric amplification in a saturated regime characterized by the pump energy of the pump pulse 1803 being suppressed by more than 10% through the parametric amplification, and
so as to form a signal pulse carrying at least one of the quantum states comprising negativity in its Wigner function.

11. FIG. 18 further illustrates an example of the circuit of any of the examples 1-3, 4, 8 or 10, wherein the circuit comprises one or more components for manipulating the one or more quantum states, the one or more components comprising at least one of:

one or more modulators (e.g. EOM in FIG. 18) for manipulating an intensity or phase of the quantum states,
one or more couplers (e.g., BS1, BS2 in FIG. 18) for combining a plurality of the quantum states, or
one or more spectral filters, one or more spectral-dependent splitters, one or more polarization rotators, one or more wavelength convertors, or one or more Mach-Zehnder interferometers (e.g., 1806 in FIG. 18).

12. FIG. 18 illustrates an example of the circuit of any of the examples 1-3, 4, 8, or 10, wherein the circuit further comprises one or more detectors 1808 one or more single-photon detectors, one or more photon number resolving detectors, and/or one or more homodyne detectors configured to at least:
engineer or detect the quantum states 1804, or
enable quantum computing tasks using the quantum states 1804. Example
quantum computing tasks include, but are not limited to, performing quantum logic gates such as, but not limited to, a squeezing gate, a rotation gate, a phase space displacement.

In one or more examples, OPAs operating in linear (non-saturated) regime along with linear circuits (MZIs, EOMs) enable all-Gaussian logic gates (squeezing gates, rotation gate, phase space displacements). In one or more examples, to perform universal quantum computation with error correction, such OPAs can be used in highly saturated regime.

13. FIG. 17 illustrates an example of the circuit 1700 of any of the examples 1-12, further comprising:
one or more inputs 1702 connected to the waveguides 1704, and
one or more outputs 1706 connected to the waveguides 1704, wherein the optical pulses comprise the one or more input pulses and one or more output pulses outputted at the outputs in response to the input pulses received at the inputs, and
the waveguides are configured to at least generate, manipulate, or measure one or more of the optical pulses carrying a different one of the quantum states 104, 1804 representing a different bit of information according to a time division multiplexing scheme wherein:
the optical pulses are distributed among different equally spaced time bins,
the different equally spaced time bins can be routed to different ones of the waveguides 1704 using one or more first modulators (e.g., EOM in FIG. 17) and one or more first couplers 1708 connected to each other via one or more first delay lines 1710 (e.g., proper or appropriately configured delay lines), the one or more first modulators configured to modulate the optical pulses, and optionally
the different equally spaced time bins can be combined using one or more second couplers 1708 and one or more second delay lines 1710 (e.g., proper or appropriately configured delay lines) so that the quantum states in the different time bins can be combined.

In one or more examples, the time bins are routed using a time division multiplexing circuit.

14. The circuit of any of the examples 1-13, wherein the pulse lengths 1804 are in a range of 1-1000 femtoseconds, e.g., so that the optical pulses can be routed into the different equally spaced time bins of longer than 1-1000 femtosecond duration and containing the different bits.

15. The circuit of any of the examples 1-14, configured:
as a processor 1712 for performing one or more quantum computations (e.g., quantum logic gates) on the one or more quantum states (e.g., as illustrated in FIG. 17), or
as a quantum sensor 1902 for performing quantum sensing by a measurement of the one or more quantum states (e.g., as illustrated in FIG. 19), or
to perform quantum state tomography of the quantum states 2302, 2402 that is robust against detection losses (e.g., as illustrated in FIG. 23 and FIG. 24), or
to perform all-optical continuous-variable quantum error correction with Binomial and squeezed Cat codes using the quantum states 1804 (e.g., as illustrated in FIG. 18), or
to perform quantum teleportation using the quantum states, or
perform boson sampling in time/frequency domain using the quantum states, or
to protect the quantum coherence of the quantum states (e.g., as illustrated in FIG. 1D).

16. The circuit of any of the examples 1-16, wherein the waveguides 102 comprise an optical parametric amplifier having phase matching and dispersion engineering such that parametric gain is in a non-linear saturated regime, thereby allowing at least: F
all—optical nonlinear quantum measurement of the quantum states (e.g., FIG. 1D, FIG. 18, FIG. 23, FIG. 24), or
nonlinear or non-Gaussian operations on the quantum states (e.g FIG. 18).

17. The circuit of any of the examples 1-16, further comprising a wavelength converter converting a wavelength of the optical pulses, carrying the quantum states, into a different frequency range.

18. The circuit of any of the examples 1-17, wherein the optical pulses each comprise a pulse of electromagnetic radiation having a central wavelength in a range of 200 nm-10 microns, and the pulse length of 1000 cycles or less corresponds to 1000 wavelengths or less of the classical field or quantum mechanical wavefunction.

19. The circuit of any of the examples 1-18, wherein the waveguide comprises/consists of, or consists essentially of a material having the second order nonlinearity, and the material is/comprises/consists of/or consists essentially of at least one of lithium niobate, lithium tantalate, Potassium Titanyl Phosphate (KTP), aluminum nitride, gallium arsenide, indium phosphide, aluminum gallium arsenide, GaP, or InGaP.

20. The circuit of any of the examples 1-19, wherein the width and/or height of the waveguides is in a range of 50 nanometers-5 micrometers.

21. The circuit of any of the examples 1-20, wherein the waveguides confine and waveguide the optical pulses comprising a pump electromagnetic wave or field (pump pulse), a signal electromagnetic wave or field (signal pulse), and/or an idler electromagnetic wave or field (idler pulse), wherein the pump electromagnetic wave is converted into the signal electromagnetic wave and/or the idler electromagnetic wave according to a second order parametric interaction/amplification using the second order nonlinearity.

22. The circuit of any of the examples 1-21, wherein the waveguides each have dimensions including a length, the width, and the length minimizing group velocity mismatch (GVM) between pump and signal pulses and/or idler pulses so as to provide temporal overlap of the pump and signal pulses and/or idler pulses.

23. The circuit of any of the examples 1-22, wherein the waveguides have the length in a range of 10 microns to 1 mm, e.g., so that the GVM difference is less than 1%.

24. FIG. 2A illustrates an example system 200 comprising the circuit of any of the examples 1-23, further comprising:
one or more sources 202 of the optical pulses coupled to the circuit (e.g., a laser, optical parametric generator, amplifier or oscillator, or laser system), wherein the circuit comprises:
one or more inputs 204 for receiving the optical pulses comprising pump signals pumping the waveguides, and
one or more outputs 206 for outputting the optical pulses carrying the quantum states. In one or more examples, the waveguides comprise a measurement optical parametric amplifier amplifying the quantum states to a detectable level.

25. The circuit of any of the examples 1-24, wherein the phase matching comprises periodic poling of the waveguide (or of the material of the waveguide having the second order nonlinearity, e.g., of a ferromagnetic material).

26. FIG. 19 illustrates an example quantum sensor system comprising the circuit 1900 of any one of the compatible examples 1-25, wherein the circuit comprises a waveguide comprising a squeezer optical parametric amplifier outputting the one or more quantum state comprising a squeezed state to one or more first linear optical components (e.g., one or more splitters and/or one or more couplers or one or more interferometers) outputting the quantum states to a sample/environment for interaction; to form output one or more quantum states one or more second linear optical components (e.g., one or more splitters and/or couplers or interferometer(s)) receiving the output quantum states and transmitting/and or manipulating the output quantum states to a measurement optical parametric amplifier.

27. FIG. 17 illustrates an example circuit comprising a pair of state generating (e.g., squeezer) optical parametric amplifiers 1704 outputting the quantum states comprising a first (e.g., squeezed) quantum state and a second (e.g., squeezed) quantum state, a first coupler/splitter 1708 coupling the pair of (e.g., squeezer) OPAs and coupling/interacting the first (e.g., squeezed) quantum state and the second (e.g., squeezed) quantum state; a modulator (e.g., electrooptic modulator EOM) coupled to at least one of the (e.g., squeezer) optical parametric amplifiers 1704 for modulating a phase or amplitude of the first or second quantum states; one or more optical delay lines 1710 coupled to one or more outputs of the first coupler 1708; a second coupler 1712 coupled to the first coupler via the one or more optical delay lines 1710; and a pair of measurement optical parametric amplifiers 1714 coupled to the second coupler, each of the measurement optical parametric amplifiers coupled to a different one of the outputs of the second coupler and amplifying one of the quadratures 105 of one of the quantum states generated or manipulated in the circuit, so as to form an output quantum state in the macroscopic regime.

28. FIG. 18 illustrates an example circuit comprising first and second state generating optical parametric amplifiers 1801 generating first and second quantum states respectively (e.g., amplitude and phase squeezed states, respectively); a modulator (e.g., EOM) coupled to at least one of the state generating optical parametric amplifiers so as to modulate a phase and/or amplitude of the quantum states; a coupler or splitter BS1 interacting the first and second quantum states; an interferometer 1806 interfering the outputs of the coupler or splitter BS1; and a plurality of measurement optical parametric amplifiers (MOPA) coupled to the outputs of the interferometer for amplifying one of the quadratures 105 of one of the quantum states generated or manipulated in the circuit, so as to form one or more output quantum states, e.g., in the macroscopic regime. By tuning the interferometer and post-selecting on specific photon number resolving measurement outcomes, one can probabilistically produce the output quantum states comprising non-Gaussian states.

29. FIG. 23 illustrates an example circuit comprising a quantum tomography circuit 2300 comprising a first input receiving a quantum state p; a second input receiving a coherent state, $|\alpha\rangle\langle\alpha|$ and a highly unbalanced splitter, i.e., r→1, implementing a displacement operation on the quantum state with the coherent state to form an output quantum state; and the waveguide comprising an optical parametric amplifier coupled to an output of the splitter/coupler for amplifying the output quantum state outputted from the splitter/coupler.

30. FIG. 24 illustrates an example circuit comprising a quantum tomography circuit 2400 comprising a first input receiving a quantum state psi; a second input receiving a pump, a wavelength division multiplexer WDM combining the pump and the quantum state in a high gain optical parametric amplifier comprising one of the waveguides, and a photodetector performing a quadrature power measurement on the amplified state.

31. The circuit of any of the examples, coupled to linear optical components (e.g., beamsplitter, splitter, mirror, phase shifter, lens, interferometer), e.g., performing a linear operation on the optical pulse (i.e., obeying superposition principle and not a non-linear interaction changing the frequency)

32. The circuit of any of the examples, wherein the quantum states comprise a squeezed amplitude state and a squeezed phase state.

33. A single chip or multiple chips comprising the circuit of any of the examples 1-32.

34. A processor 1712 or processing circuit comprising the photonic integrated circuit 1700 of any of the examples 1-34, e.g., wherein the circuit performs, or is configured to perform quantum computation using the quantum states.

35. A quantum sensor 1902 or sensing circuit comprising the photonic integrated circuit 1900 of any of the examples 1-33, e.g., wherein the circuit senses or is configured to sense an environment or sample using the quantum states.

36. An error correction circuit comprising the photonic integrated circuit of any of the examples, wherein the circuit performs or is configured to perform error correction using the quantum states.

37. A quantum tomography circuit 2300, 2400 comprising the photonic integrated circuit of any of the examples, wherein the circuit performs or is configured to perform quantum tomography of one or more of the quantum states.

38. FIG. 17 illustrates a processor 1712 or processing circuit 1700 comprising the photonic integrated circuit of example 1 or any compatible one of the examples 1-33, comprising:
one or more of the waveguides 1704 generating the one or more quantum states; and
one or more quantum logic gates comprising one or more of the waveguides performing one or more logic operations on one or more of the quantum states.

39. FIG. 19 illustrates a quantum sensor 1902 or sensing circuit comprising the photonic integrated circuit of example 1 or any compatible one of the examples 2-33, wherein:
one or more of the waveguides (squeezer OPA) generating one or more of the quantum states used to sense an environment (e.g. sample interaction); and
one or more of the waveguides (e.g., measurement OPA) measuring one or more of the quantum states after interaction with the environment.

40. An error correction circuit comprising or coupled to the photonic integrated circuit of example 1 or any compatible one of the examples 2-33, wherein:
one or more of the waveguides (e.g., SOPA) generate the quantum states 1804 useful for performing quantum error correction of quantum noise (see e.g., FIG. 18); and
the circuit performs or is configured to perform the quantum error correction using the quantum states.

41. FIGS. 23A and 24 illustrate a quantum tomography circuit 2300, 2400 comprising the photonic integrated circuit of example 1 or any of the compatible examples 2-33, wherein the circuit performs quantum tomography of one or more of the quantum states.

42. The circuit of any of the examples 1-41, wherein one or more of the waveguides comprise an optical parametric amplifier, and/or further comprising one or more optical parametric oscillators each comprising one or more of the waveguides.

43. The circuit of example 42 comprising a network of the waveguides.

44. The circuit 1700 of any of the examples 1-43, coupled to or comprising a time division multiplexing circuit 1716, e.g. wherein the time division multiplexing circuit (e.g., comprising coupler(s) and/or delay line(s) and/or modulator (s)) routes the time bins to different ones of the waveguides 1714 and/or combines different ones of the time bins (e.g., as illustrated in FIG. 17). Example time division multiplexing architectures that can be used include those in [52]

45. The circuit of any of the examples 1-44, wherein the waveguide dimensions also minimize group velocity dispersion (GVD) of interacting pulses, leading to high nonlinear efficiency.

46. The circuit of any of the examples 1-45, wherein the couplers or splitters comprise a pair of waveguides separated by a gap. In one or more examples, the couplers or splitters have the wavelength selectivity or coupling sensitivity tuned by the gap size between two waveguides [54]

47. The circuit of any of the examples, wherein linear optics comprise splitter, coupler, or interferometer, delay line.

b. Method of Operating

Figure 27:
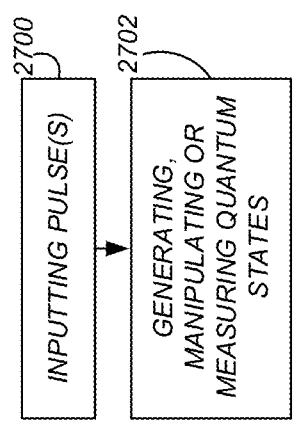
FIG. 27 illustrates a method of generating, manipulating, and/or measuring quantum states.

FIG. 27 illustrates a method of processing one or more quantum states.

Block 2700 represents inputting one or more input optical pulses into one or more waveguides comprising a second order non-linearity configured to operate on optical pulses, including the input optical pulses, wherein the waveguides each have a width and height of less than 5 micrometers and/or the waveguides have a phase matching and dispersion engineering for the optical pulses having a bandwidth in a range of 0.1-100 Terahertz.

Block 2702 represents generating, manipulating, or measuring one or more quantum states using the one or more waveguides. In one or more examples, the generating, manipulating, or measuring is implemented a time division multiplexing scheme, comprising:
distributing the optical pulses among equally spaced time bins;
routing each of the time bins to different ones of the waveguides using one or more modulators and one or more first couplers connected to each other via one or more first delay lines; and combining the different time bins using one or more second couplers and one or more second delay lines so that the quantum states in the different time bins are combined.

The method can be implemented using the device of any of the examples described herein including examples 1-47 discussed above in relation to FIG. 26.

Advantages and Improvements

The data presented herein demonstrates few-cycle vacuum squeezing and its all-optical measurements in the LN nanophotonic platform. The on-chip all-optical loss-tolerant broadband measurements through high-gain phase-sensitive amplification enabled squeezing measurements over more than 25 THz of bandwidth while providing measurement purification against the detection losses as high as $L_{overall}^{off-chip} \sim 7$ dB. Combined with the recent advances such as high-speed electro-optic modulators and integrated single-photon detectors (23), these results may enable scalable ultrafast all-optical quantum information processors in nanophotonic platforms with second order nonlinear susceptibilities.

REFERENCES

The following references are incorporated by reference herein
1 T. D. Ladd et al., Nature 464, 45-53 (2010).
2 J. L. O'Brien, A. Furusawa, J. Vučković, Nat. Photonics 3 687-695 (2009).
3 H. Yu et al., Nature 583,43-47(2020).
4 C. A. Casacio et al., Nature 594, 201-206 (2021).
5 A. Furusawa et al., Science 282, 706-709 (1998).
6 W. Asavanant et al., Science 366, 373-376 (2019). 7. M. V. Larsen, X. Guo, C. R. Breum, J. S. Neergaard-Nielsen, U. L. Andersen, Science 366, 369-372 (2019).
7 M. Chen, N. C. Menicucci, O. Pfister, Phys. Rev. Lett. 112, 120505 (2014).
8 G. Kanter et al., Opt. Express 10, 177-182 (2002).
9 J. Roslund, R. M. De Araujo, S. Jiang, C. Fabre, N. Treps, Nat. Photonics 8,109-112 (2014).
10 V. D. Vaidya et al., Sci. Adv. 6, eaba9186 (2020).
11 C. Vigliar et al., Nat. Phys. 17, 1137-1143 (2021).
12 J. M. Arrazola et al., Nature 591, 54-60 (2021).
13 J. F. Tasker et al., Nat. Photonics 15, 11-15 (2021).
14 U. A. Javid et al., Phys. Rev. Lett. 127, 183601 (2021).
15 P.-K. Chen, I. Briggs, S. Hou, L. Fan, Opt. Lett. 47, 1506-1509 (2022)
16 D. Peace et al., arXiv:2204.05694 [quant-ph] (2022)
17 C. M. Caves, Phys. Rev. D 26, 1817-1839 (1982)
18 Y. Shaked et al., Nat. Commun. 9, 609 (2018).
19 N. Takanashi et al., Opt. Express 28, 34916-34926 (2020).
20 G. Frascella, S. Agne, F. Y. Khalili, M. V. Chekhova, NPJ Quantum Inf. 7, 72 (2021).
21 Z. Ye et al., Sci. Adv. 7, eabi8150 (2021).
22 D. Zhu et al., Adv. Opt. Photonics 13,242 (2021).
23 L. Ledezma et al., Optica 9, 303 (2022).
24 M. Jankowski et al., Optica 7, 40 (2020). Y. Hu et al., Nature 599, 587-593 (2021).
26 M. J. Werner, M. G. Raymer, M. Beck, P. D. Drummond, Phys. Rev. A 52, 4202-4213 (1995).
27 J. E. Bourassa et al., Quantum 5, 392 (2021).
28 D. Horoshko, M. Kolobov, Phys. Rev. A 88, 033806 (2013).
29 M. Kizmann et al., Nat. Phys. 15, 960-966 (2019).
30 R. Nehra, Few-cycle vacuum squeezing in nanophotonics, Figshare (2022); https://doi.org/10.6084/m9.figshare.20100140.v1.
31 31. R. Nehra, Few-cycle vacuum squeezing in nanophotonics, Figshare (2022); https://doi.org/10.6084/m9.figshare.20100140.v1.
32 32. M. Jankowski, A. Marandi, C. R. Phillips, R. Hamerly, K. A. Ingold, R. L. Byer, M. M. Fejer, Temporal simultons in optical parametric oscillators. Phys. Rev. Lett. 120, 053904 (2018). doi:10.1103/PhysRevLett.120.053904 Medline
33 A. Marandi, N. C. Leindecker, V. Pervak, R. L. Byer, K. L. Vodopyanov, Coherence properties of a broadband femtosecond mid-IR optical parametric oscillator operating at degeneracy. Opt. Express 20, 7255-7262 (2012). doi-10.1364/OE 20.007255 Medline
34 34. M. A. Luda, M. Drechsler, C. T. Schmiegelow, J. Codnia, Compact embedded device for lock-in measurements and experiment active control. Rev. Sci. Instrum. 90, 023106 (2019). doi.10.1063/1.5080345 Medline
35. C. R. Phillips, C. Langrock, J. S. Pelc, M. M. Fejer, I. Hartd, M. E. Fermann, Supercontinuum generation in quasi-phasematched waveguides. Opt. Express 19, 18754-18773 (2011). doi10.1364/OE 19.018754 Medline
36. X. Guo, C. L. Zou, C. Schuck, H. Jung, R. Cheng, H. X. Tang, Parametric down-conversion photon-pair source on a nanophotonic chip. Light Sci. Appi. 6, e16249 (2017). doi; 10.1038/isa.2016.249 Medline
37. W. Wasilewski, A. I. Lvovsky, K. Banaszek, C. Radzewicz, Pulsed squeezed light: Simultaneous squeezing of multiple modes. Phys. Rev. A 73, 063819 (2006). doi:10.1103/PhysRevA.73.063819
38. C. M. Caves, B. L. Schumaker, New formalism for two-photon quantum optics. I.Quadrature phases and squeezed states. Phys. Rev. A 31, 3068-3092 (1985). doi:10 1103/PhysRevA.31.3068 Medline
39. A. Christ, K. Laiho, A. Eckstein, K. N. Cassemiro, C. Silberhorn, Probing multimode squeezing with correlation functions. New J. Phys. 13, 033027 (2011). doi: 10.1088/1367-2630/13/3/033027
40. P. van Loock, A. Furusawa, Detecting genuine multipartite continuous-variable entanglement. Phys. Rev. A 67, 052315 (2003).
doi:10.1 103/PhysRevA.67.052315
41. L. Bello, Y. Michael, M. Rosenbluh, E. Cohen, A. Pe'er, Broadband complex two-mode quadratures for quantum optics. Opt. Express 29, 41282 (2021).
doi:10.1364/OE.432054
42. G. H. Y. Li, R. Sekine, R. Nehra, R. M. Gray, L. Ledezma, Q. Guo, A. Marandi, All-optical ultrafast ReLU function for energy-efficient nanophotonic deep learning. Nanophotonics 10.1515/nanoph-2022-0137 (2022). doi: 10.1515/nanoph-2022-0137
43. A. Inoue, T. Kashiwazaki, T. Yamashima, N. Takanashi, T. Kazama, K. Enbutsu, K. Watanabe, T. Umeki, M. Endo, A. Furusawa, 43-GHz bandwidth real-time amplitude measurement of 5-dB squeezed light using modularized optical parametric amplifier with 5G technology. arXiv: 2205.14061 [quant-ph] (2022).
44. Q. Guo, R. Sekine, L. Ledezma, R. Nehra, D. J. Dean, A. Roy, R. M. Gray, S. Jahani, A. Marandi, Femtojoule femtosecond all-optical switching in lithium niobate nanophotonics. Nat. Photonics 16, 625-631 (2022). doi: 10.1038/s41566-022-01044-5

45. A. Dutt, K. Luke, S. Manipatruni, A. L. Gaeta, P. Nussenzveig, M. Lipson, On-chip optical squeezing. *Phys. Rev. Appi.* 3, 044005 (2015). doi:10.1103/PhysRevApplied 3.044005
46. Y. Zhao, Y. Okawachi, J. K. Jang, X. Ji, M. Lipson, A. L. Gaeta, Near-degenerate
35 quadrature-squeezed vacuum generation on a silicon-nitride chip. *Phys. Rev. Lett* 124, 193601 (2020). doi: 10.1103/PhvsRevLett.124.193601 Medline
47. Y. Zhang, M. Menotti, K. Tan, V. D. Vaidya, D. H. Mahler, L. G. Helt, L. Zatti, M. Liscidini, B. Morrison, Z. Vernon, Squeezed light from a nanophotonic molecule. *Nat. Commun.* 12, 2233 (2021). doi.10.1038/s41467-021-22540-2 Medline
48. R. Cernansky, A. Politi, Nanophotonic source of quadrature squeezing vi self-phase modulation. *APL Photonics* 5, 101303 (2020). doi:10.1063/5.0024341
49. Z. Yang, M. Jahanbozorgi, D. Jeong, S. Sun, O. Pfister, H. Lee, X. Yi, A squeezed quantum microcomb on a chip. *Nat. Commun.* 12, 4781 (2021). doi: 10.1038/s41467-021-25054-z Medline
50. T. C. Ralph, All-optical quantum teleportation. *Opt. Lett.* 24, 348-350 (1999). doi:10 1364/OL.24 000348 Medline
51. Further information on one or more embodiments of the present invention can be found in "Few-cycle vacuum squeezing in nanophotonics by Rajveer Nehra et. al., HTTPS://ORCID.ORG/:000-0002-0470-0050 *SCIENCE* September 222 Vol 377, Issue 6612 pp. 1333-1337 DOI: 10.1126/science.abo6213, and supplementary information.
52. Optical time division multiplexing: systems and networks D. M. Spirit; A. D. Ellis; P.E. Barnsley, Journals & Magazines>IEEE Communications Magazine >Volume: 32 issue: 12 DOI 10.1109/35.336012
53. Intense optical parametric amplification in dispersion-engineered nanophotonic lithium niobate waveguides LUIS LEDEZMA, RYOTO SEKINE, QIUSHI GUO, RAJVEER NEHRA, SAMAN JAHANI, AND ALIREZA MARANDI. https://arxiv.org/pdf/2104.08262.pdf, Optica 9(3) 303-308 (2022) https://doi.org/10.48550/arXiv.2104.08262
54. U.S. Pat. No. 11,226,538 issued Jan. 18, 2022, by Alireza Marandi et. al.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A photonic integrated circuit, comprising:
one or more waveguides comprising a second order non-linearity configured to operate on classical and/or quantum optical pulses each having a pulse length shorter than 1000 optical cycles, as measured at their full width at half maximum of their classical field values or their quantum wave functions, so as to at least:
generate one or more quantum states carried by one or more of the optical pulses,
manipulate one or more of the quantum states, or
measure one or more of the quantum states; and
wherein the waveguides comprise at least an optical parametric amplifier (OPA) comprising a phase-matching and/or a dispersion engineering for a second order parametric amplification process involving a signal vacuum field and at least one of the optical pulses comprising a first pump pulse.

2. The circuit of claim 1, wherein the waveguides each have a width and height of less than 5 micrometers and/or the waveguides have the phase matching and/or the dispersion engineering for nonlinear interactions of the optical pulses having a bandwidth in a range of 0.1-100 Terahertz.

3. The circuit of claim 2, wherein:
the circuit comprises at least one an optical parametric oscillator (OPO) comprising one of the waveguides,
and the at least one OPAs and/or the at least one OPO generate the quantum states comprising signal and/or idler pulses in response to the first pump pulse using a second order parametric process, and
the waveguides each have dimensions including the height, the width, and the length minimizing group velocity mismatch (GVM) between the optical pulses comprising pump pulses, comprising the first pump pulse, and signal pulses and/or idler pulses so as to provide temporal overlap of the pump and signal pulses and/or idler pulses, and
the pump pulses, signal pulses, and/or idler pulses each comprise an electromagnetic wave confined in and waveguided by the waveguides.

4. The circuit of claim 1, wherein the quantum states comprise Gaussian states comprising one or more squeezed vacuum states having one or more modes.

5. The circuit of claim 4, wherein the second order parametric amplification process amplifies the signal vacuum field in a first quadrature and attenuates the signal vacuum field in a second quadrature orthogonal to the first quadrature, thereby generating one or more of the optical pulses comprising one or more signal pulses carrying a first one of the quantum states comprising the one or more a squeezed vacuum states.

6. The circuit of claim 5 or claim 1, wherein at least one of an intensity of the first pump pulse, the phase matching, the dispersion engineering, or a length of the optical parametric amplifier are tailored for the second order parametric amplification process comprising non-degenerate parametric amplification so that the signal pulses, carrying the one or more squeezed vacuum states, comprise at least two modes.

7. The circuit of claim 5, wherein the circuit further comprises a second OPA having at least one of a second phase matching, a second dispersion engineering, or a second length tailored for an additional second order nonlinear interaction involving the optical pulses comprising a second pump pulse and the signal pulses comprising the first one of the quantum states, wherein the second pump pulse can have a phase difference relative to the first pump pulse and an intensity so that the additional second order nonlinear interaction comprises the parametric amplification in a linear (non-saturated) regime amplifying one of the quadratures of the first one of the quantum states, so as to form a second quantum state in the macroscopic regime, in which the average number of photons for the second quantum state is larger than 10 but less than $10^{\wedge}9$, and thereby enabling a loss-tolerant (de-coherence tolerant) quantum measurement of the first one of the quantum states.

8. The circuit of claim 1, wherein the quantum states comprise non-Gaussian states comprising one or more cat states, one or more binomial code states, one or more Gottesnan-Kitaev-Preskill (GKP) states, or one or more photon pair states.

9. The circuit of claim 1, wherein the circuit comprises a modulator driven by a driving signal allowing control of a phase or an intensity of the optical pulses comprising one or more pump pulses comprising the first pump pulse or one or more quantum state pulses.

10. The circuit of claim 1, wherein:
the circuit comprises the optical parametric amplifier having the phase matching, the dispersion engineering, and length tailored for a second order parametric interaction involving the first pump pulse, having the pulse length, and the signal vacuum field, and
the second order nonlinear interaction comprises a parametric amplification in a saturated regime characterized by the pump energy of the first pump pulse being suppressed by more than 10% through the parametric amplification process, and
so as to form at least one of the optical pulses comprising a signal pulse carrying at least one of the quantum states comprising negativity in its Wigner function.

11. The circuit of claim 1, wherein the circuit comprises one or more components for manipulating the one or more quantum states, the one or more components comprising at least one of:
one or more modulators for manipulating an intensity or phase of the quantum states,
one or more couplers for combining a plurality of the quantum states, or
one or more spectral filters, one or more spectral-dependent splitters, one or more polarization rotators, one or more wavelength convertors, or one or more Mach-Zehnder interferometers.

12. The circuit of claim 1, wherein the circuit further comprises one or more single-photon detectors, one or more photon number resolving detectors, and/or one or more homodyne detectors configured to at least:
engineer or detect the quantum states, or
enable quantum computing tasks using the quantum states.

13. The circuit of claim 1, further comprising:
one or more inputs connected to the waveguides, and
one or more outputs connected to the waveguides, wherein the optical pulses comprise one or more input pulses and one or more output pulses outputted at the outputs in response to the input pulses received at the inputs, and
the waveguides are configured to at least generate, manipulate, or measure one or more of the optical pulses carrying a different one of the quantum states representing a different bit of information according to a time division multiplexing scheme wherein:
the optical pulses are distributed among different equally spaced time bins,
the different equally spaced time bins can be routed to different ones of the waveguides using one or more first modulators and one or more first couplers connected to each other via one or more first delay lines, the one or more first modulators configured to modulate the optical pulses, and
the different equally spaced time bins can be combined using one or more second couplers and one or more second delay lines so that the quantum states in the different time bins can be combined.

14. The circuit of claim 13, wherein the pulse lengths are in a range of 1-1000 femtoseconds so that the optical pulses can be routed into the different equally spaced time bins of longer than 1-1000 femtosecond duration and containing the different bits.

15. The circuit of claim 1, configured:
as a processor for performing one or more quantum computations on the one or more quantum states, or
as a quantum sensor for performing quantum sensing by a measurement of the one or more quantum states, or
to perform quantum state tomography of the quantum states that is robust against detection losses, or
to perform all-optical continuous-variable quantum error correction with Binomial and squeezed Cat codes using the quantum states, or
to perform quantum teleportation using the quantum states, or
perform boson sampling in time/frequency domain using the quantum states, or
to protect the quantum coherence of the quantum states.

16. The circuit of claim 1, wherein the waveguides comprise the optical parametric amplifier having the phase matching and the dispersion engineering such that parametric gain is in a non-linear saturated regime, thereby allowing at least:
all—optical linear or nonlinear quantum measurement of the quantum states, or Gaussian or non-Gaussian operations on the quantum states.

17. The circuit of claim 1, further comprising a wavelength converter converting a wavelength of the optical pulses, carrying the quantum states, into a different frequency range.

18. A method of processing one or more quantum states, comprising:
inputting one or more input optical pulses to one or more waveguides; and
generating, manipulating, or measuring one or more quantum states using one or more of the waveguides comprising a second order non-linearity configured to operate on optical pulses including the input optical pulses, wherein the waveguides each have a width and height of less than 5 micrometers and/or the waveguides have a phase matching and dispersion engineering for the optical pulses having a bandwidth in a range of 0.1-100 Terahertz,
wherein the waveguides comprise at least one optical parametric amplifier (OPA) comprising a phase-matching and/or a dispersion engineering for a second order parametric amplification process involving a signal vacuum field and the optical pulses comprising a first pump pulse.

19. The method of claim 18, wherein the generating, manipulating, or measuring is implemented using a time division multiplexing scheme, comprising:
distributing the optical pulses among equally spaced time bins;
routing each of the time bins to different ones of the waveguides using one or more modulators and one or more first couplers connected to each other via one or more first delay lines; and
combining the different time bins using one or more second couplers and one or more second delay lines so that the quantum states in the different time bins are combined; and
wherein the waveguides comprise one or more of the optical parametric amplifiers and/or the waveguides are disposed in one or more optical parametric oscillators comprising one or more of the optical parametric amplifiers.

20. The method of claim 18, wherein the generating, manipulating, and/or measuring comprises at least one of:
- performing one or more quantum computations on the one or more quantum states, or
- quantum sensing by a measurement of the one or more quantum states, or
- performing quantum state tomography of the quantum states that is robust against detection losses, or
- performing all-optical continuous-variable quantum error correction with Binomial and squeezed Cat codes using the quantum states, or
- performing quantum teleportation using the quantum states, or
- performing boson sampling in time/frequency domain using the quantum states, or
- protecting a quantum coherence of the quantum states.

21. The method of claim 18, wherein at least one of an intensity of the first pump pulse, the phase matching, the dispersion engineering, or a length of the optical parametric amplifier are tailored for the second order parametric amplification process comprising non-degenerate parametric amplification.

22. The circuit of claim 1, wherein at least one of an intensity of the first pump pulse, the phase matching, the dispersion engineering, or a length of the optical parametric amplifier are tailored for the second order parametric amplification process comprising non-degenerate parametric amplification.

* * * * *